US010939613B2

(12) United States Patent
Ma et al.

(10) Patent No.: US 10,939,613 B2
(45) Date of Patent: Mar. 9, 2021

(54) GRASS TRIMMER AND CORD DELIVERING METHOD OF GRASS TRIMMER

(71) Applicant: Positec Power Tools (Suzhou) Co., Ltd., Suzhou (CN)

(72) Inventors: Yichun Ma, Suzhou (CN); Shisong Zhang, Suzhou (CN); Guoliang Mou, Suzhou (CN); Hongfeng Zhong, Suzhou (CN); Fangshi Liu, Suzhou (CN); Xiaoli Pang, Suzhou (CN); Robert Baker, Suzhou (CN); Brandon Martin, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 120 days.

(21) Appl. No.: 16/408,991

(22) Filed: May 10, 2019

(65) Prior Publication Data
US 2019/0261557 A1    Aug. 29, 2019

Related U.S. Application Data

(63) Continuation of application No. 15/154,644, filed on May 13, 2016, now Pat. No. 10,314,228, which is a
(Continued)

(30) Foreign Application Priority Data

May 16, 2014   (CN) .......................... 201410208957.5
May 30, 2014   (CN) .......................... 201410240439.1
(Continued)

(51) Int. Cl.
*A01D 34/416*       (2006.01)
(52) U.S. Cl.
CPC ....... *A01D 34/4161* (2013.01); *A01D 34/416* (2013.01)

(58) Field of Classification Search
CPC ................ A01D 34/412; A01D 34/416; A01D 34/4161–4168
(Continued)

(56) References Cited

U.S. PATENT DOCUMENTS 3,693,254 A   9/1972  Salonen
4,006,528 A   2/1977  Katsuya
(Continued)

FOREIGN PATENT DOCUMENTS

CA   2068192 A1   11/1992
CN   2476930       2/2002
(Continued)

OTHER PUBLICATIONS

European Search Report for European Application No. 15 19 6369.1 dated Apr. 11, 2016; 9 pages.
(Continued)

*Primary Examiner* — Andrea L Wellington
*Assistant Examiner* — Richard D Crosby, Jr.
(74) *Attorney, Agent, or Firm* — Middleton Reutlinger

(57) ABSTRACT

The invention provides a grass trimmer and a cord delivering method for a grass trimmer, the grass trimmer includes an extending rod, an housing, a grass trimming head, a handle, a main motor and a main switch, wherein the grass trimming head includes a base, a cap and a spool having a first state relative static with the base, and the grass trimmer further includes a cord delivering mechanism; the cord delivering mechanism includes a cord delivering electronic switch independent of the main switch and a control device; and the cord delivering electronic switch operably electrically controls the control device to enable the spool to be in a second state capable of generating a rotary speed difference with the base. An operator does not need to interrupt
(Continued)

work of the grass trimmer and can timely pay off required and the cord delivering operation is simple and convenient.

22 Claims, 34 Drawing Sheets

Related U.S. Application Data continuation of application No. PCT/CN2015/079128, filed on May 16, 2015.

(30) Foreign Application Priority Data

| Jan. 4, 2015 | (CN) | 201510000621.4 |
| Jan. 4, 2015 | (CN) | 201510000624.8 |
| Feb. 4, 2015 | (CN) | 201510059049.9 |

(58) Field of Classification Search
USPC .......................................... 30/273; 56/12.7
See application file for complete search history.

(56) References Cited

U.S. PATENT DOCUMENTS

| 4,052,789 | A | | 10/1977 | Ballas, Sr. |
| 4,091,536 | A | | 5/1978 | Bartholomew |
| 4,095,338 | A | | 6/1978 | Naohiko et al. |
| 4,107,901 | A | | 8/1978 | Moore |
| 4,134,204 | A | | 1/1979 | Perdue |
| 4,136,446 | A | | 1/1979 | Tripp |
| 4,209,902 | A | | 7/1980 | Moore et al. |
| 4,211,004 | A | | 7/1980 | Woods |
| 4,211,005 | A | | 7/1980 | Woods |
| 4,245,454 | A | | 1/1981 | Zien |
| 4,285,128 | A | * | 8/1981 | Schnell .............. A01D 34/4161 30/276 |
| 4,369,577 | A | | 1/1983 | Gise et al. |
| 4,411,069 | A | * | 10/1983 | Close ................. A01D 34/4161 30/276 |
| 4,426,780 | A | | 1/1984 | Foster |
| 4,483,069 | A | * | 11/1984 | Moore ............... A01D 34/4162 30/276 |
| 4,578,863 | A | | 4/1986 | Laverick |
| 4,584,771 | A | | 4/1986 | Tillotson |
| 4,607,431 | A | | 8/1986 | Gay et al. |
| 4,897,923 | A | * | 2/1990 | Collins .............. A01D 34/4162 29/898.07 |
| 5,020,224 | A | | 6/1991 | Haupt |
| 5,048,187 | A | | 9/1991 | Ryan |
| 5,063,673 | A | | 11/1991 | Webster |
| 5,196,731 | A | | 3/1993 | Abe et al. |
| 5,446,964 | A | | 9/1995 | Woods et al. |
| 5,544,417 | A | * | 8/1996 | Atos ................. A01D 34/4165 30/276 |
| 5,623,765 | A | | 4/1997 | Ner-Gaon |
| 5,675,897 | A | | 10/1997 | Berfield |
| 5,743,019 | A | | 4/1998 | Berfield |
| 5,867,909 | A | | 2/1999 | Jeltsch et al. |
| 5,881,464 | A | | 3/1999 | Collins et al. |
| 5,933,966 | A | * | 8/1999 | Yates .................... A01D 34/90 30/276 |
| 6,263,580 | B1 | | 7/2001 | Stark et al. |
| 6,401,344 | B1 | | 6/2002 | Moore |
| 6,474,053 | B1 | | 11/2002 | Lund |
| 6,594,907 | B2 | | 7/2003 | Wilson et al. |
| 6,684,614 | B2 | | 2/2004 | Greenwell |
| 6,754,964 | B2 | | 6/2004 | Sugihara et al. |
| 6,862,811 | B2 | | 3/2005 | Mitchell |
| 7,017,272 | B2 | | 3/2006 | Grace |
| 7,134,208 | B2 | | 11/2006 | Wilkinson et al. |
| 7,165,382 | B2 | | 1/2007 | Mitchell, Jr. |
| 7,165,383 | B1 | | 1/2007 | Luton, Jr. |
| 7,480,998 | B2 | | 1/2009 | Suzuki et al. |
| 7,538,503 | B2 | | 5/2009 | Machens et al. |
| 7,823,291 | B2 | | 11/2010 | Shibasaki et al. |
| 8,076,873 | B1 | | 12/2011 | Lucas et al. |
| 8,230,602 | B2 | | 7/2012 | Arnetoli |
| 8,464,431 | B2 | | 6/2013 | Reynolds et al. |
| 8,677,632 | B2 | * | 3/2014 | Yamaoka ........... A01D 34/4166 30/276 |
| 8,720,071 | B2 | | 5/2014 | Galinski |
| D753,969 | S | * | 4/2016 | Jiang .................................. D8/8 |
| 9,379,596 | B2 | * | 6/2016 | Kraetzig .................. H02K 9/28 |
| 9,603,301 | B2 | | 3/2017 | Jerez |
| 9,750,181 | B2 | * | 9/2017 | Cigarini ............. A01D 34/4166 |
| 9,872,429 | B2 | * | 1/2018 | Ma ..................... A01D 34/4161 |
| 10,517,209 | B2 | * | 12/2019 | Kullberg ........... A01D 34/4165 |
| 10,631,457 | B2 | * | 4/2020 | Legrand ........... A01D 34/4168 |
| 2002/0100266 | A1 | | 8/2002 | Greenwell |
| 2002/0170183 | A1 | | 11/2002 | Sugihara et al. |
| 2003/0188435 | A1 | | 10/2003 | Ellson et al. |
| 2004/0148784 | A1 | | 8/2004 | Grace |
| 2006/0005520 | A1 | * | 1/2006 | Weidman ............... A01D 69/00 56/12.7 |
| 2006/0218797 | A1 | | 10/2006 | Mitchell |
| 2007/0251101 | A1 | | 11/2007 | Sibasaki et al. |
| 2008/0163496 | A1 | | 7/2008 | Huseman |
| 2008/0190085 | A1 | | 8/2008 | Hoffman et al. |
| 2008/0244914 | A1 | | 10/2008 | Harris et al. |
| 2008/0282554 | A1 | | 11/2008 | Grace |
| 2011/0007436 | A1 | | 1/2011 | Single et al. |
| 2011/0078910 | A1 | | 4/2011 | Tomita et al. |
| 2011/0239468 | A1 | | 10/2011 | Conlon |
| 2012/0066913 | A1 | | 3/2012 | Aliss et al. |
| 2012/0073145 | A1 | | 3/2012 | Gehrki |
| 2012/0102755 | A1 | * | 5/2012 | Racov ................. A01D 34/4167 30/142 |
| 2013/0186051 | A1 | | 7/2013 | Ran et al. |
| 2014/0325850 | A1 | | 11/2014 | Bone |
| 2016/0143218 | A1 | * | 5/2016 | Sergyeyenko ..... A01D 34/4163 30/276 |
| 2016/0345493 | A1 | | 12/2016 | Ma et al. |
| 2018/0116106 | A1 | * | 5/2018 | Kullberg ........... A01D 34/4163 |

FOREIGN PATENT DOCUMENTS

| CN | 102396320 A | 4/2005 |
| CN | 2862661 | 1/2007 |
| CN | 101011014 | 8/2007 |
| CN | 201123243 | 10/2008 |
| CN | 101433146 | 5/2009 |
| CN | 101061775 B | 7/2010 |
| CN | 201797740 U | 4/2011 |
| CN | 102282961 A | 12/2011 |
| CN | 202455824 U | 10/2012 |
| CN | 102860169 A | 1/2013 |
| CN | 102860170 A | 1/2013 |
| CN | 102907208 | 2/2013 |
| CN | 103125199 | 6/2013 |
| CN | 103210739 A | 7/2013 |
| CN | 203934334 | 11/2014 |
| CN | 204069756 U | 1/2015 |
| CN | 204539943 U | 8/2015 |
| CN | 105075493 A | 11/2015 |
| DE | 3005968 A1 | 8/1981 |
| EP | 237774 | 9/1987 |
| EP | 417967 | 3/1991 |
| EP | 0512784 A1 | 11/1992 |
| EP | 0417966 B1 | 3/1994 |
| EP | 0583737 B1 | 12/1996 |
| EP | 1183932 | 3/2002 |
| FR | 2357162 A1 | 1/1978 |
| JP | 2002291315 A | 10/2002 |
| JP | 2011125292 A | 6/2011 |
| WO | WO 2008 066901 A2 | 6/2008 |
| WO | 2009108916 | 9/2009 |
| WO | WO 2011005156 A1 | 1/2011 |
| WO | WO 2015172744 A1 | 11/2015 |

OTHER PUBLICATIONS

Supplementary European Search Report for European Application No. EP 15 79 3059 dated Nov. 7, 2017; 8 pages.

(56) References Cited

OTHER PUBLICATIONS

English language abstract and computer-generated translation for JP2011125292 extracted from espacenet.com database Apr. 21, 2017, 8 pages.

English language abstract and computer-generated translation for CN102282961 extracted from espacenet.com database Apr. 21, 2017, 15 pages.

English language abstract and computer-generated translation for CN102396320 extracted from espacenet.com database Apr. 21, 2017, 7 pages.

English language abstract and computer-generated translation for CN102860170 extracted from espacenet.com database Apr. 21, 2017, 6 pages.

English language abstract and computer-generated translation for CN102860169 extracted from espacenet.com database Apr. 21, 2017, 6 pages.

Translated International Search Report for International Application No. PCT/CN2015/079128 dated Jul. 10, 2015, 2 pages.

English language abstract for FR2357162 extracted from espacenet.com database on Sep. 6, 2016, 1 page.

English language abstract for DE3005968 extracted from espacenet.com database on Sep. 6, 2016, 1 page.

English language abstract and computer-generated English translation for CN201797740 extracted from espacenet.com database Sep. 6, 2016, 8 pages.

English language abstract and computer-generated English translation for CN202455824 extracted from espacenet.com database Aug. 30, 2016, 7 pages.

English language abstract and computer-generated English translation for CN204069756 extracted from espacenet.com database Sep. 6, 2016, 22 pages.

English language abstract and computer-generated English translation for CN204539943 extracted from espacenet.com database Sep. 6, 2016, 27 pages.

English language abstract and computer-generated English translation for WO2015172744 extracted from espacenet.com database Sep. 6, 2016, 38 pages.

English language abstract and computer-generated English translation for CN105075493 extracted from espacenet.com database Sep. 6, 2016, 24 pages.

\* cited by examiner

GRASS TRIMMER AND CORD DELIVERING METHOD OF GRASS TRIMMER

CROSS REFERENCE TO RELATED APPLICATION

This application is a continuation of U.S. application Ser. No. 15/154,644, filed May 13, 2016, which is a continuation of PCT Application No. PCT/CN2015/079128, filed May 16, 2015, which claims priority to Chinese Application No. CN201510059049.9 filed Feb. 4, 2015, Chinese Application No. CN201510000621.4 filed Jan. 4, 2015, Chinese Application No. CN201510000624.8 filed Jan. 4, 2015, Chinese Application No. CN201410240439.1 filed May 30, 2014, Chinese Application No. CN201410208957.5 filed May 16, 2014, the disclosure(s) of which are hereby incorporated by reference.

BACKGROUND

Technical Field

The present invention relates to a garden tool, in particular to a grass trimmer.

Related Art

Green vegetation is a necessary environment key factor of human being, and a greening concept is more and more poplar. No matter a golf course, a football field, a manor, a yard of a villa, or a common residential quarter, a green turf is everywhere, and brings vitality and energy to people's life. Bu without managing, these turfs will become fluctuated and disordered.

As a garden tool for managing the turf, a grass trimmer is more and more popular among users. Usually, the grass trimmer drives a grass trimming line to rotate to trim grass, and generally comprises an extending rod extending longitudinally, a grass trimming head at one end of the extending rod, a handle arranged at the extending rod and spaced from the grass trimming head by certain distance and a motor driving the grass trimming head to rotate, the grass trimming head includes a base, a cap matched with the base and a spool arranged between the base and the cap, and the grass trimming line winds the spool and extends from the base. During working, the grass trimming head is driven to rotate to drive the grass trimming line to synchronously rotate so as to trim the grass.

The grass trimmer generally has two use states, one state is a conventional grass trimming state, in which a plane formed by rotating of the grass trimming line is parallel with the ground to manage large pieces of lawn fast; and the other state is an edge trimming state, in which a plane formed by rotating of the grass trimming line is vertical to the ground to manage the lawn at the edge of a road.

Since the grass trimming line rotates to trim the grass, the tail end of the grass trimming line is very easy to wear, the worn grass trimming line cannot reach a required grass trimming radius, and a grass trimming efficiency is greatly reduced. Therefore, a cord delivering mechanism is required on the grass trimmer so as to adjust the length of the grass trimming line extending out of the base at proper time.

Usually, there are two types of cord delivering mechanisms, one kind cord delivering mechanisms is an startup and shutdown automatic cord delivering mechanism, just as the name implies, the startup and shutdown automatic cord delivering mechanism will automatically pay off during startup and shutdown every time without extra operation, but exactly due to the cord delivering during startup and shutdown every time, the wear of the grass trimming line is very severe, the other kind of cord delivering mechanisms is a knocking cord delivering mechanism, having a triggering part protruding out of the cap, during use, the cap knocks on the ground to trigger cord delivering, its main disadvantage is that when the grass trimmer performs edge trimming operation, the grass trimmer needs to be reversed to enable the cap to knock the ground so as to pay off, which results in not only interruption of the grass trimming work but also complex operation.

In the other cord delivering mechanism, an operation part independent of a main switch is arranged at a holding part, movement of the operation part is transmitted to the spool by a transmission connector, so as to cause the spool to generate a speed difference relative to the base to pay off. But the movement of the manual operation part cannot be transmitted to the spool unless such kind of manual cord delivering mechanism is equipped with a transmission part basically penetrating through the extending rod longitudinally extending. Therefore, relative to the extending rod longitudinally extending, the transmission part is set to be telescopic or detachable, but the transmission part is complex in setting structure and not guaranteed in reliability.

The other cord delivering mechanism comprises an operation part allowing an operator to operate, the operation part controls and moves a steel rope arranged on the extending rod, the steel rope is driven to drive the spool to release a driving device of the grass trimming line. The operator can realize manual cord delivering of the spool by operating the operation part, but in order to meet an operation comfort demand, the extending rod is usually made very long, causing great increase of a packaging size of the grass trimmer, inconvenience in transportation and increase in transportation cost.

SUMMARY

In order to overcome defects of the prior art, the invention aims to solve the problem about providing a grass trimmer which reduces wear of a grass trimming line and is convenient to operate.

In order to solve above problems, technical solution of the invention is a grass trimmer, comprising an extending rod extending longitudinally, an housing arranged at one end of the extending rod, a handle arranged on the extending rod and spaced from the housing by a certain distance, a grass trimming head connected with the housing, a main motor driving the grass trimming head to rotate around an axis, and a main switch controlling the main motor; the grass trimming head comprises a base, a cap matched and connected with the base, and a spool arranged between the base and the cap; the spool has a first state static relative to the base and the grass trimmer is characterized by further comprising a cord delivering mechanism, wherein the cord delivering mechanism comprises a cord delivering electronic switch independent of the main switch and a control device, the cord delivering electronic switch operably electrically controls the control device to enable the spool to be in a second state capable of generating a rotary speed difference relative to the base.

Preferably, the main motor is unchanged in operation speed in a work process.

Preferably, the control device comprises an electric driver independent of the main motor, the cord delivering mechanism comprises a transmission device driven by the electric driver, and the electric driver drives the spool to move between a first state and a second state by the transmission device.

The electric driver comprises a secondary motor independent of the main motor. The transmission device comprises a moving converting mechanism arranged between the secondary motor and the spool, and the moving converting mechanism converts a rotary movement of the secondary motor into the rotary movement of the spool capable of generating a speed difference relative to the base. The moving converting mechanism comprises a transmission part fixedly matched and connected with an output shaft of the secondary motor, a pivoting part driven by the transmission part and a middle part driven by the pivoting part, and the middle part drives the spool to move relative to the base.

Preferably, the transmission part is set to be an eccentric cam fixedly matched and connected with an output shaft, the pivoting part is set to be a lever rotating by taking a pivoting shaft as a rotary center, wherein the pivoting shaft fixedly connects a first end of the lever to an housing, and a second end of the lever abuts against a peripheral surface of the eccentric cam.

In another optional solution, the transmission part is set to be an end surface cam fixedly matched and connected with an output shaft, the pivoting part is set to be a lever rotating by taking a pivoting shaft as a rotary center, wherein the pivoting shaft fixedly connects a first end of the lever to an housing, and a second end of the lever abuts against a cam surface of the end surface cam.

Further, an elastic part is arranged between the pivoting part and the housing.

Preferably, the transmission device further comprises a speed reduction mechanism arranged between the secondary motor and the transmission part. The speed reduction mechanism is set to be a planet wheel mechanism.

The control device further comprises an arresting device controlling the secondary motor to stop rotation. The arresting device comprises a sensing unit and a control unit receiving a signal of the sensing unit to control the secondary motor to be stopped.

Preferably, the sensing element comprises a hall sensor arranged in the housing, and a magnetic part arranged at the transmission device, and the hall sensor is next to the magnetic part.

In one solution, a motor shaft of the secondary motor is vertical to a motor shaft of the main motor.

In another optional solution, a motor shaft of the secondary motor is parallel with the motor shaft of the main motor.

Preferably, the electric driver comprises an electromagnet. The electromagnet has an output end performing linear movement, and the transmission device comprises a third transmission system arranged between the output end and the spool.

Preferably, the third transmission system comprises a rotary part connected to the housing by a pivoting shaft and a sliding part driven by the rotary part, wherein the sliding part drives the spool to move relative to the base. The rotary part is set to be a lever taking the pivoting shaft as a rotary center, the pivoting shaft is arranged in the middle of the lever, a first end of the lever is connected with the output end and a second end of the lever abuts against the sliding part.

Preferably, the cord delivering electric switch controls power on and off of the electromagnet.

Preferably, the control device comprises a control circuit electrically connected with the main motor, and the control circuit is used for controlling the main motor to be converted between a working speed and a cord delivering speed that is different than the working speed.

Preferably, the control circuit is a PWM control circuit.

Preferably, the cord delivering speed is smaller than the working speed.

Preferably, the control circuit is a brake switch circuit.

Preferably, the cord delivering speed is larger than the working speed.

Preferably, when the main switch is started up, the spool is in a first state and when the cord delivering electronic switch is started up, the spool is in a second state.

Preferably, a sliding block is arranged between the base and the spool, the sliding block is circumferentially fixed with the base to be radially movably matched and connected, and the cord delivering mechanism further comprises a stopping device movably arranged at the base, wherein the stopping device has a first position and a second position, when the stopping device is in the first position, the stopping device limits the sliding block from radially moving relative to the base, and when the topping device is in the second position, the sliding bock can radially move relative to the base.

Preferably, the stopping device comprises a stopping part arranged at the base in a pivoting manner, when in the first position, the stopping part stops the sliding block, and when in the second position, the stopping part is separated from the sliding block.

Preferably, when the cord delivering electronic switch is started, the stopping part pivots to the second position from the first position relative to the base under the action of an inertia force.

Preferably, when the cord delivering electronic switch is released, the stopping part pivots to the first position from the second position.

Preferably, the stopping device comprises a reset device arranged between the stopping part and the base and prompts the stopping part to recover to the first position from the second position.

Preferably, that a pivoting axis of the stopping part and a rotary axis of the base are overlapped.

Preferably, when the main switch is started up, the stopping part is in a first position limiting the sliding block from radially moving to the base.

Preferably, the spool is provided with a toothed slot extending circumferentially, the toothed slot comprises a first toothed edge and a second toothed edge opposite to each other, the first toothed edge and the second toothed edge have the same number of teeth which are staggered circumferentially, the tooth comprises a radial surface extending radially, the sliding block is provided with a protruding tooth capable of radially moving in the toothed slot, and when the protruding tooth abuts against the radial surface, the spool is in the first state; and when the protruding tooth does not abut against the radial surface, the spool is in the second state.

Preferably, the tooth comprises a circumferential surface circumferentially extending obliquely, and when the protruding tooth abuts against the circumferential surface, the spool is in the second state.

Preferably, a bias press part is arranged between the base and the sliding block, and the bias press part exerts a force to the sliding block to keep the protruding tooth abutting against the radial surface.

Preferably, the spool moves along a circumferential direction of an axis.

In another solution, the spool moves along an axial direction of the axis.

Preferably, the main switch is electrically connected with the control device.

Preferably, the cord delivering electronic switch is arranged in a holding part of the handle or a vicinity position of the holding part. The handle comprises a main handle and an auxiliary handle which are spaced for a certain distance, a main switch is arranged on the main handle and a cord delivering electronic switch is arranged on the auxiliary handle.

Preferably, the cord delivering electronic switch is a single-pole double-throw switch, the single-pole double-throw switch can be optionally in a first switching on position and a second switching on position, the main switch is started up, the spool and the base synchronously rotate, and then the single-pole double-throw switch is in the first switching on position; the single-pole double-throw switch is started up and is converted to the second switching on position from the first switching on position to generate a speed difference between the spool and the base; and the single-pole double-throw switch is released and recovers to the first switching on position from the second switching on position to generate a speed difference between the spool and the base, and after preset time, the spool and base recover synchronous rotating.

In order to solve above problems, another technical solution of the invention is a cord delivering method for a grass trimmer, the cord delivering method comprises a following operation step: starting up a cord delivering electronic switch to generate a speed difference between a spool and a base.

Preferably, the operation step further comprises releasing the cord delivering electronic switch.

Preferably, before starting the cord delivering electronic switch, starting up a main switch to drive a main motor to drive the base and the spool to synchronously rotate.

In order to solve above problems, another technical solution of the invention is a cord delivering method for a grass trimmer, the cord delivering method comprises following operation steps: starting up a main switch to enable a spool and a base to synchronously rotate; and starting up a cord delivering electronic switch to generate a speed difference between the spool and the base, wherein after preset time, the spool and the base recover synchronous rotating In order to solve above problems, another technical solution of the invention is a grass trimmer, comprising an extending rod extending longitudinally, an housing arranged at one end of the extending rod, a handle arranged on the extending rod and spaced from the housing by a certain distance, a grass trimming head connected with the housing, a main motor driving the grass trimming head to rotate around an axis, and a main switch controlling the main motor; the grass trimming head comprises a base, a cap matched and connected with the base, and a spool arranged between the base and the cap; the spool has a first state static relative to the base and the grass trimmer is characterized by further comprising a cord delivering mechanism, wherein the cord delivering mechanism comprises a cord delivering electronic switch independent of the main switch and a control device, the cord delivering electronic switch operably electrically controls the control device to enable the spool to be in a second state capable of generating a rotary speed difference relative to the base, and the main motor is unchanged in operation speed in a work process.

Preferably, the main motor is unchanged in operation speed in a work process.

Preferably, the control device comprises an electric driver independent of the main motor, the cord delivering mechanism comprises a transmission device driven by the electric driver, and the electric driver drives the spool to move between a first state and a second state by the transmission device.

The electric driver comprises a secondary motor independent of the main motor. The transmission device comprises a moving converting mechanism arranged between the secondary motor and the spool, and the moving converting mechanism converts a rotary movement of the secondary motor into the rotary movement of the spool capable of generating a speed difference relative to the base. The moving converting mechanism comprises a transmission part fixedly matched and connected with an output shaft of the secondary motor, a pivoting part driven by the transmission part and a middle part driven by the pivoting part, and the middle part drives the spool to move relative to the base.

Preferably, the transmission part is set to be an eccentric cam fixedly matched and connected with an output shaft, the pivoting part is set to be a lever rotating by taking a pivoting shaft as a rotary center, wherein the pivoting shaft fixedly connects a first end of the lever to an housing, and a second end of the lever abuts against a peripheral surface of the eccentric cam.

In another optional solution, the transmission part is set to be an end surface cam fixedly matched and connected with an output shaft, the pivoting part is set to be a lever rotating by taking a pivoting shaft as a rotary center, wherein the pivoting shaft fixedly connects a first end of the lever to an housing, and a second end of the lever abuts against a cam surface of the end surface cam.

Further, an elastic part is arranged between the pivoting part and the housing.

Preferably, the transmission device further comprises a speed reduction mechanism arranged between the secondary motor and the transmission part. The speed reduction mechanism is set to be a planet wheel mechanism.

The control device further comprises an arresting device controlling the secondary motor to stop rotation. The arresting device comprises a sensing unit and a control unit receiving a signal of the sensing unit to control the secondary motor to be stopped.

Preferably, the sensing element comprises a hall sensor arranged in the housing, and a magnetic part arranged at the transmission device, and the hall sensor is next to the magnetic part.

In one solution, a motor shaft of the secondary motor is vertical to a motor shaft of the main motor.

In another optional solution, a motor shaft of the secondary motor is parallel with the motor shaft of the main motor.

Preferably, the electric driver comprises an electromagnet. The electromagnet has an output end performing linear movement, and the transmission device comprises a third transmission system arranged between the output end and the spool.

Preferably, the third transmission system comprises a rotary part connected to the housing by a pivoting shaft and a sliding part driven by the rotary part, wherein the sliding part drives the spool to move relative to the base. The rotary part is set to be a lever taking the pivoting shaft as a rotary center, the pivoting shaft is arranged in the middle of the lever, a first end of the lever is connected with the output end and a second end of the lever abuts against the sliding part.

Preferably, the cord delivering electric switch controls power on and off of the electromagnet.

In order to solve above problems, another technical solution of the invention is a grass trimmer, comprising an extending rod extending longitudinally, an housing arranged at one end of the extending rod, a handle arranged on the extending rod and spaced from the housing by a certain distance, a grass trimming head connected with the housing, a main motor driving the grass trimming head to rotate around an axis, and a main switch controlling the main motor; the grass trimming head comprises a base, a cap matched and connected with the base, and a spool arranged between the base and the cap; the spool has a first state static relative to the base; the grass trimmer further comprises a cord delivering mechanism, wherein the cord delivering mechanism comprises a control switch and a control device, and the control switch operably electrically controls the control device to enable the spool to be in a second state capable of generating a rotary speed difference relative to the base.

In one of embodiments, the control device comprises a control circuit electrically connected with the main motor, and the control circuit is used for controlling the main motor to be switched between a working speed and a cord delivering speed that is different than the working speed.

In one of embodiments, the control circuit is a PWM modulating circuit.

In one of embodiments, the cord delivering speed is smaller than the working speed.

In one of embodiments, the control circuit is a brake switch circuit.

In one of embodiments, the control switch is the main switch or a cord delivering electronic switch independent of the main switch.

In order to solve above problems, another technical solution of the invention is a cord delivering method of a grass trimmer, the cord delivering method comprises a following operation step: starting up a control switch to generate a speed difference between a spool and a base.

In one of embodiments, the operation step further comprises releasing the control switch.

In one of embodiments, before starting the control switch, the main motor drives the base to synchronously rotate along with the spool.

In order to solve above problems, another technical solution of the invention is a cord delivering method of a grass trimmer, the cord delivering method comprises following operation steps: starting up a main switch to enable the spool and the base to synchronously rotate; and starting up the control switch to generate a speed difference between the spool and the base, wherein after preset time, the spool and the base recover synchronous rotation.

In order to solve above problems, another technical solution of the invention is a cord delivering method of a grass trimmer, the control switch is a cord delivering electronic switch independent of the main switch, the cord delivering electronic switch is a single-pole double-throw switch, the single-pole double-throw switch can be optionally in a first switching on position and a second switching on position, the cord delivering method comprises following operation steps: starting up the cord delivering electronic switch to covert the single-pole double-throw switch to the second switching on position from the first switching on position, and generate a speed difference between the spool and the base; and releasing the cord delivering electronic switch to recover the single-pole double-throw switch to the first switching on position from the second switching on position, wherein the spool and the base recover synchronous rotation.

In order to solve above problems, another technical solution of the invention is a cord delivering method of a grass trimmer, the control switch is a main switch, the main switch is a single-pole double-throw switch, the single-pole double-throw switch can be optionally in a first switching on position and a second switching on position, the cord delivering method comprises following operation steps: starting up the main switch to synchronously rotate the spool and the base, wherein at the moment, the single-pole double-throw switch is in a first switching on position; converting the single-pole double-throw switch to a second switching on position from the first switching on position to generate a speed difference between the spool and the base; restarting up the main switch to recover the single-pole double-throw switch to the first on position from the second switching on position, wherein the spool and the base recover synchronous rotation.

Compared with prior art, a grass trimmer in the invention comprises a cord delivering mechanism, the cord delivering mechanism is controlled by a cord delivering electronic switch independent of the main switch, thus avoiding cord delivering waste during startup and shutdown every time and reducing the wear of the grass trimmer; and the cord delivering electronic switch is arranged in a holding part of the handle or a vicinity position of the holding part, and an operator can control the cord delivering electronic switch to pay off while holding the handle without interrupting the work of the grass trimmer, and the operation is convenient.

In order to solve defects of the prior art, a first technical problem to be solved by the invention is to provide a grass trimmer which not only reduce the wear of a grass trimming line but also is smaller in packaging size.

In order to solve above problems, a first technical solution of the invention is a grass trimmer, comprising an extending rod assembly, a grass trimming head arranged at one end of the extending rod assembly, a handle arranged on the extending rod assembly and spaced from the grass trimming head by a certain distance, a motor driving the grass trimming head to rotate around an axis and a switch controlling the motor. The grass trimming head comprises a spool for setting a grass trimming line, and further comprises a manual cord delivering mechanism, the manual cord delivering mechanism comprises an operation part independent of the switch, a transmission part controlled by the operation part and a drive device driven by the transmission part to drive the spool to release the grass trimming line, the extending rod assembly comprises a first extending rod extending longitudinally and a second extending rod movably connected with the first extending rod, the handle is arranged at the first extending rod, the grass trimming head is arranged at the second extending rod, both the first extending rod and the second extending rod are provided with an inner cavity, and the transmission part is basically arranged in the inner cavities of the first extending rod and the second extending rod.

Compared with prior art, the grass trimmer in the invention comprises a manual cord delivering mechanism, the manual cord delivering mechanism is controlled by an operator independent of the main switch, thus avoiding cord delivering waste during startup and shutdown every time and reducing the wear of the grass trimmer; and the extending rod assembly is set to the first extending rod and the second extending rod connected with each other, and when the grass trimmer is transported or stored, relative movement is generated between the first extending rod and the second extending rod, thus greatly reducing a packaging size of the grass trimmer.

Preferably, the first extending rod and the second extending rod have first positions matched and connected with each other and second positions separated from each other.

Preferably, the first extending rod and the second extending rod are connected by threads.

Preferably, the first extending rod is provided with an electrode slice, the second extending rod is provided with a wire, and when the first extending rod and the second extending rod are matched and connected, the electrode slice and the wire are electrically connected.

Preferably, the transmission part comprises a first transmission portion connected with the operation part and a second transmission portion movably arranged relative to the first transmission portion, and the second transmission portion is connected with the drive device.

Preferably, when the first extending rod and the second extending rod are matched and connected with each other, the first transmission portion and the second transmission portion are matched and connected with each other, and when the first extending rod and the second extending rod are separated from each other, the first transmission portion and the second transmission portion are separated from each other.

Preferably, the manual cord delivering mechanism further comprises an adaptive device, the adaptive device comprises an adapter arranged in the first extending rod and connected with the first transmission portion, and a sliding part arranged in the second extending rod and connected with the second transmission portion, and the sliding part can be matched with or separated from the adapter.

Preferably, the adaptive device further comprises an actuating device arranged in the first extending rod and used for prompting the adapter to be matched with the sliding part, so as to connect the first transmission portion and the second transmission portion together, and the operator is operated to drive the second transmission portion to move to a direction close to the operation by the first transmission portion, so as to drive the drive device to drive the spool to release the grass trimming line.

Preferably, the actuating device comprises an annular seat body fixedly arranged in the first extending rod, the annular seat body comprises a first portion and a second portion smaller than the first portion in inner diameter, the adapter is operably moved to the second position from the first position to a direction close to the operation part along an extending direction of the first inner diameter, when in the first position, the adapter is separated from the sliding part, and when in the second position, the second portion prompts the adapter to match with the sliding part.

Preferably, the adaptive device further comprises a first elastic part arranged between the adapter and the first extending rod and used for prompting the adapter to separate from the sliding part.

Preferably, the adaptive device further comprises a sliding block movably arranged at the annular seat body, the first transmission portion is connected with the sliding block, the adapter is arranged at the sliding block in a pivoting manner, and the first elastic part is arranged between the adapter and the sliding block.

Preferably, the adaptive device further comprises a tension device arranged between the sliding block and the annular seat body and used for prompting the sliding block to move to a direction away from the operation part.

Preferably, the tension device comprises a second elastic part arranged between the annular seat body and the sliding block.

Preferably, the actuating device comprises an actuator arranged at the first extending rod and abutting against the adapter and a pusher arranged at the second extending rod, and when the first extending rod and the second are matched and connected, the pusher pushes the actuator to move, and the actuator prompts the adapter to be matched and connected with the sliding part.

Preferably, the actuator is connected with the first extending rod and the enables the first extending rod ad the second extending rod to be matched and connected with each other.

Preferably, the actuator is movably matched and connected with the first extending rod.

Preferably, a moving direction of the actuator is vertical to that of the first extending rod.

Preferably, the adaptive device further comprises a retaining device arranged between the adapter and the first extending rod and used for prompting the adapter to be separated from the sliding part.

Preferably, the retaining device comprises an elastic unit.

Preferably, the elastic unit is a torsional spring.

Preferably, the adaptive device further comprises a tension device arranged between the adapter and the first extending rod and used for prompting the adapter to move to a direction away from the operation part.

Preferably, the tension device comprises an elastic element.

Preferably, the elastic element is a pressure spring, and the pressure spring is arranged along a longitudinal extending direction of the first extending rod.

Preferably, the adapter can be pivoted relative to the first extending rod.

Preferably, the manual cord delivering mechanism further comprises a pulley assembly arranged in the extending rod assembly, and the transmission part is arranged at the pulley assembly.

Preferably, the pulley assembly comprises a fixed pulley fixedly arranged at the first extending rod, and a movable pulley connected with the operation part and capable of operably moving along an extending direction of the first extending rod, the movable pulley is closer to the operation part than the fixed pulley, the transmission part sleeves outer edges of the fixed pulley and the movable pulley, the transmission part comprises a fixed end fixedly connected with the second extending rod and a movable end connected with the drive device, and the fixed end is positioned between the fixed pulley and the movable pulley.

Preferably, the fixed pulley is smaller than the movable pulley in diameter.

Preferably, one of outer edge tangential lines between the fixed pulley and the movable pulley is parallel with an extending direction of the first extending rod.

Preferably, the manual cord delivering mechanism further comprises a reset device arranged between the movable pulley and the first extending rod and used for resetting the movable pulley.

Preferably, the reset device comprises a second pressure spring.

Preferably, the transmission part is a flexible transmission shaft.

A second technical problem to be solved by the invention is to provide a simple and convenient use method for a grass trimmer.

In order to solve above technical problems, a second technical solution of the invention is a use method of a grass trimmer, the grass trimmer comprises a first extending rod longitudinally extending, a second extending rod movably connected with the first extending rod, a handle arranged at the first extending rod, a grass trimming head arranged at one end of the second extending rod away from the first extending rod, a motor driving the grass trimming head to rotate around an axis, and a switch controlling the motor, wherein the grass trimming head comprises a spool for setting a grass trimming line, the grass trimmer further comprises a manual cord delivering mechanism, the manual cord delivering mechanism comprises an operation part independent of the switch, a transmission part controlled by the operation part and arranged in inner cavities of the first extending rod and the second extending rod, and a drive device driven by the transmission part to drive the spool to release the grass trimming line, and the use method comprises following steps: matching and connecting the first extending rod and the second extending rod, and operating the operation part, wherein the transmission part drives the drive device to drive the spool to release the grass trimming line.

Compared with the prior art, according to the grass trimmer in the invention, the operation part can be operated by matching and connecting the first extending rod and the second extending rod, so that the transmission part drives the drive device to drive the spool to release the grass trimming line. Therefore, operation is very simple and convenient.

Preferably, the transmission part comprises a first transmission portion and a second transmission portion, and the use method further comprises following steps: after matching and connecting the first extending rod and the second extending rod, then operating the operation part to pull the first transmission portion to connect the first transmission portion and the second transmission portion together.

Preferably, the transmission part comprises a first transmission portion and a second transmission portion movably connected with the first transmission portion, and the use method further comprises following steps: after matching and connecting the first extending rod and the second extending rod, connecting the first transmission portion and the second transmission portion together.

Preferably, the first extending rod is provided with an electrode slice, the second extending rod is provided with a wire, and when the first extending rod and the second extending rod are matched and connected, the electrode slice and the wire are electrically connected.

BRIEF DESCRIPTION OF THE DRAWINGS

The invention is further described in combination with drawings and embodiments.

Figure 1:
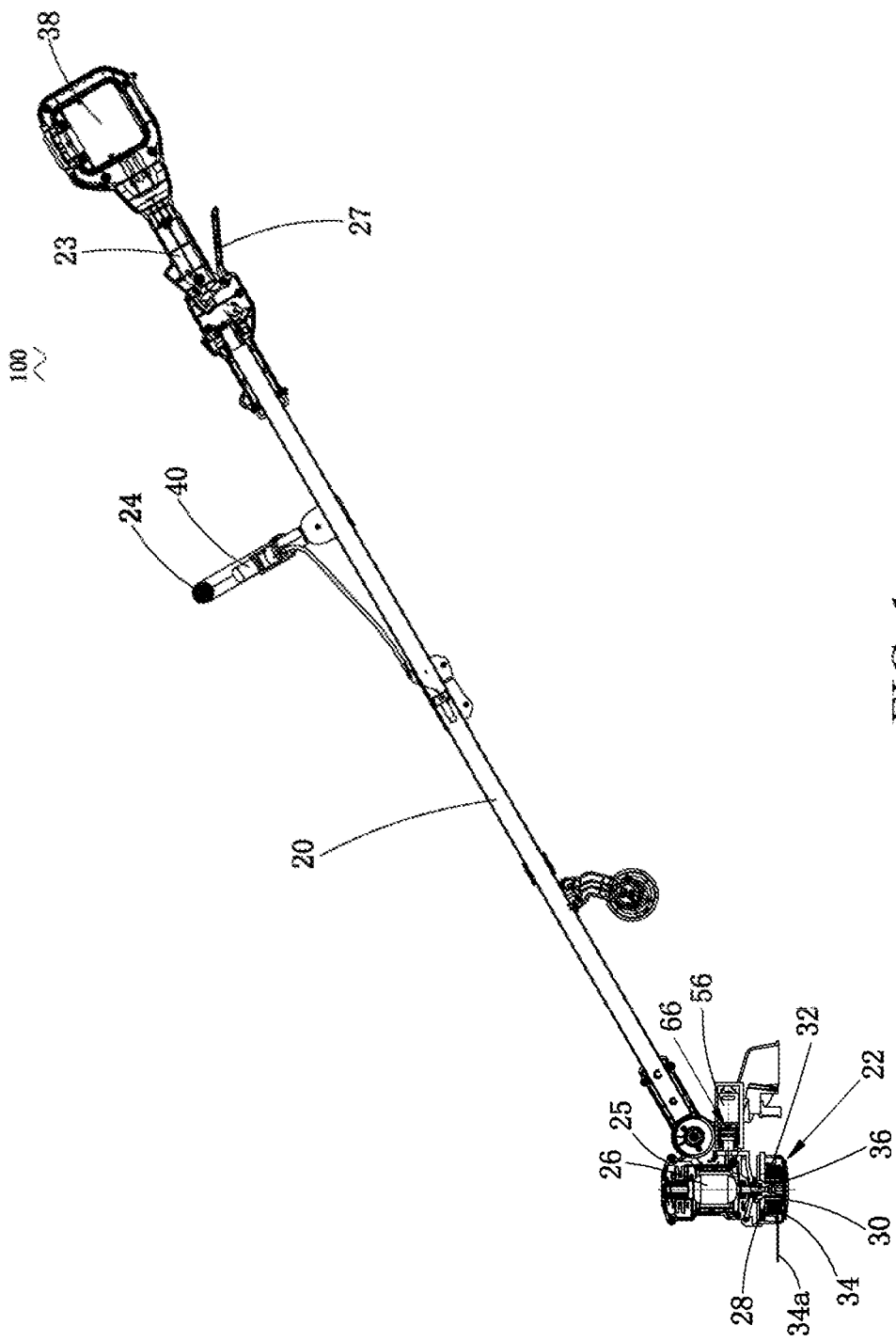
FIG. 1 is a sectional schematic diagram of a whole grass trimmer according to a first embodiment of the invention.

wherein,

| | | |
|---|---|---|
| 100 Grass trimmer | 28 Base | 37 Toothed slot |
| 20 Extending rod | 30 Cap | 38 Battery pack |
| 22 Grass trimming head | 32 Spool | 39 First toothed edge |
| 23 Main handle | 33 Sliding block | 40 Cord delivering electronic switch |
| 24 Auxiliary handle | 34 Grass trimming line | |
| 25 Housing | 34a Free tail end | 41 Second toothed edge |
| 26 Main motor | 35 Strip hole | 42 Lever |
| 27 Main switch | 36 Rotary shaft | 44 First end of lever |
| 46 Second end of the lever | 65 Second tooth | 45 Radial surface |
| 47 Peripheral surface | 66 Planet wheel mechanism | 174 Sliding part |
| 48 Middle arm of the lever | 67 Third tooth | 176 Bearing |
| 49 Protruding tooth | 68 Hall sensor | 178 Limiting part |
| 50 Pivoting shaft | 69 Fourth tooth | 180 First limiting surface |
| 52 Elastic part | 70 Electromagnet | 182 Second limiting surface |
| 53 First slope | 70a Output end | 184 Bulge |
| 54 Bias press part | 72 Magnetic part | 186 Stopping part |
| 55 Second slope | 74 Middle part | 190 Protrusion |
| 56 Secondary motor | 74a Center hole | 192 Arresting part |
| 56a Motor shaft | 75 Through hole | 200 Gras trimmer |
| 57 Rolling friction part | 142 Lever | 300 Grass trimmer |
| 60 Eccentric cam | 144 First end of lever | 401 Stopping device |
| 60' End surface cam | 146 Second end of lever | 403 Stopping part |
| 61 Elastic element | 150 Pivoting shaft | 405 Reset device |
| 63 First tooth | 154 Bias press part | 1116 Opened end |
| 1015 Extending rod assembly | 1064 First end | 1118 Middle part |
| 1022 Grass trimming head | 1066 Second end | 1120 Internal threads |
| 1023 Main handle | 1068 First bulged part | 1124 Oblique opening |
| 1024 Auxiliary handle | 1070 First stop part | 1126 Elastic part |
| 1026 Motor | 1072 First annular seat body | 1127 Second raised column |
| 1027 Switch | 1074 First portion | 1128 Second annular seat body |
| 1028 Base | 1076 Second portion | 1129 Elastic part |

-continued

| | | |
|---|---|---|
| 1030 Cap | 1080 First elastic part | 1130 First extending rod |
| 1032 Spool | 1082 First sliding block | 1132 Second extending rod |
| 1034 Grass trimming line | 1084 Raised column | 1133 Transmission part |
| 1036 Rotary shaft | 1086 First adaptive part | 1134 Fixed pulley |
| 1038 Battery pack | 1088 Second adaptive part | 1136 Movable pulley |
| 1040 Operation part | 1090 Second elastic part | 1140 Fixed end |
| 1041 Transmission part | 1092 Inner cavity | 1142 Movable end |
| 1042 Drive device | 1094 Limiting part | 1146 Outer edge tangential line |
| 1043 Lever | 1098 First extending rod | 1148 Reset device |
| 1046 First extending rod | 1098 Second extending rod | 150 Movable pulley bracket |
| 1047 Electrode slice | 1100 First transmission portion | 152 Limiting part |
| 1048 Second extending rod | 1102 Second transmission portion | 154 Control part |
| 1049 Wire | 1104 Second adapter | 156 Elastic part |
| 1050 External threads | 1105 Second sliding block | 158 Mounting seat |
| 1052 Internal threads | 1106 Second sliding part | 160 Cavity |
| 1054 First sleeve | 1108 Actuator | 162 Abutting part |
| 1056 Second sleeve | 1110 Third sleeve | 200 Grass trimmer |
| 1057 First transmission portion | 1111 External threads | |
| 1058 Second transmission portion | 1112 Pusher | |
| 1060 First adapter | 1114 Connecting end | |
| 1062 First sliding part | | |

DETAILED DESCRIPTION

FIG. 1 to FIG. 12 show a grass trimmer 100 provided according to a first embodiment of the invention.

Referring to FIG. 1, the grass trimmer 100 in the embodiment comprises an extending rod 20 longitudinally extending and a machine head arranged at one end of the extending rod 20, wherein the machine head comprises an housing 25, a main motor 26 arranged in the housing 25 and a grass trimming head 22 driven by the main motor 26 to rotate around an axis; the grass trimmer 100 further comprises a handle arranged on the extending rod 20 and spaced from the housing 25 by certain distance, and a main switch 27 controlling the main motor. The grass trimming head 22 comprises a base 28, a cap 30 matched with the base 28 and a spool 32 arranged in an inner cavity formed by the base 28 and the cap 30. The spool 32 has a first state static relative to the base 28. When the main switch 27 controls the main motor 26 to rotate, the spool 32 in the first state synchronously rotates with the base 28.

When the grass trimmer 100 works, the grass trimming line 34 is wound on the spool 32 and extends from the base 28, and when the grass trimming head 22 is driven by the main motor 26 to rotate, a free tail end 34a of the grass trimming line 34 extending out of the inner cavity formed by the base 28 and the cap 30 rotates to form a cutting surface. A user lifts the grass trimmer 100 by the handle to enable the grass trimming line to trim grass along the cutting surface formed by rotating. The grass trimmer 100 can be converted between a horizontal rotary grass trimming state and a vertical rotary edge trimming state of the free tail end 34a of the grass trimming line 34 to meet different cutting use requirements.

For the sake of description, the axial direction and circumferential direction and other direction-related descriptions in the specification refer to a rotary axis of the grass trimming head 22. For example, the axial direction is an extending direction along the rotary axis of the grass trimming head 22; and the circumferential direction is a direction around the rotary axis of the grass trimming head 22.

In the embodiment, the main motor 26 driving the grass trimming head 22 and the grass trimming head 22 are coaxially arranged, preferably, an output shaft of the main motor 26 directly drives the grass trimming head 22, that is, a rotary shaft 36 of the grass trimming head 22 is a motor shaft, namely the output shaft, of the main motor 26, and the structure is simple and compact. The skilled in the art can conceive that the main motor 26 can be arranged in any other place of the extending rod 20 and drives the grass trimming head 22 to rotate by a specific transmission mechanism.

In the embodiment, a power source, specifically a DC power source is arranged at one end of the extending rod 20 away from the grass trimming head 22, and the DC power source adopts a battery pack 38, preferably a lithium battery pack. Thereby, the DC power source and the grass trimming head 22 are respectively arranged at two ends of the extending rod 20, and the handle is arranged in the position relative closer to the electric driver on the extending rod 20, therefore the whole grass trimmer 100 is reasonable in gravity center configuration, and the operator can save more labor when lifting the grass trimmer 100 to work by the handle.

The grass trimmer 100 further comprises a cord delivering mechanism, the cord delivering mechanism comprises a cord delivering electronic switch independent of the main switch 27, and a control device, and the cord delivering electronic switch operably electrically controls the control device to enable the spool to be in a second state capable of generating a speed difference with the base. In the embodiment, the rotary speed of the main motor in working is unchanged; the control device comprises an electric driver, the cord delivering mechanism comprises a transmission device driven by the electric driver, and the electric driver drives the spool to move between a first state and a second state by the transmission device. Particularly, the electric driver is a secondary motor 56 arranged in the housing 25, and the secondary motor 56 is controlled by the cord delivering electronic switch 40 to start up. When the main switch 40 controls the main motor 26 to rotate, the cord delivering electronic switch 40 starts up the secondary motor 56 to drive the spool 32 to move to a second state capable of generating a speed difference with the base 28. The cord delivering electronic switch 40 is arranged in a holding part of the handle or a vicinity position of the holding part. In the embodiment, the secondary motor 56 is vertical to the main motor 26, that is, a motor shaft 56a of the secondary motor 56 is vertical to a motor shaft 36 of the main motor 26, and the "vertical to" in the embodiment comprises a vertical relation in one plane or a vertical relation in different planes.

Figure 2:
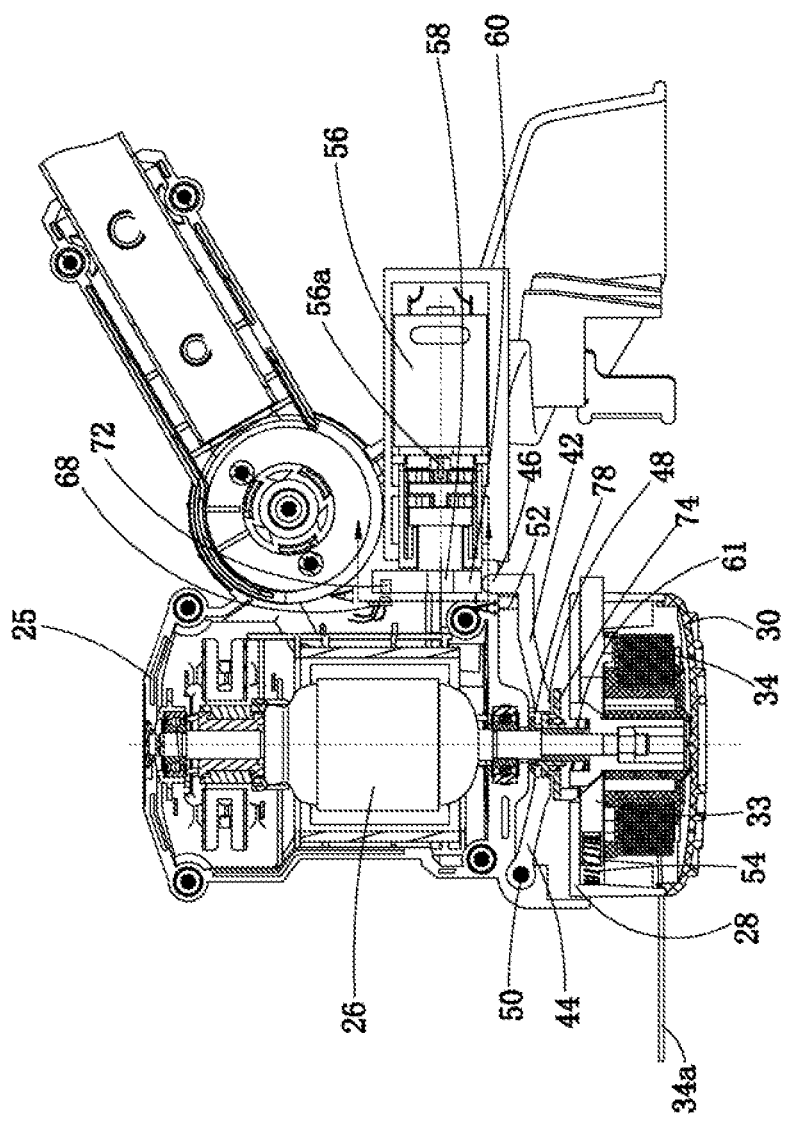
FIG. 2 is an amplified sectional view of a head of the grass trimmer as shown in FIG. 1, and at the moment, a lever is in a stop position.
Figure 3:
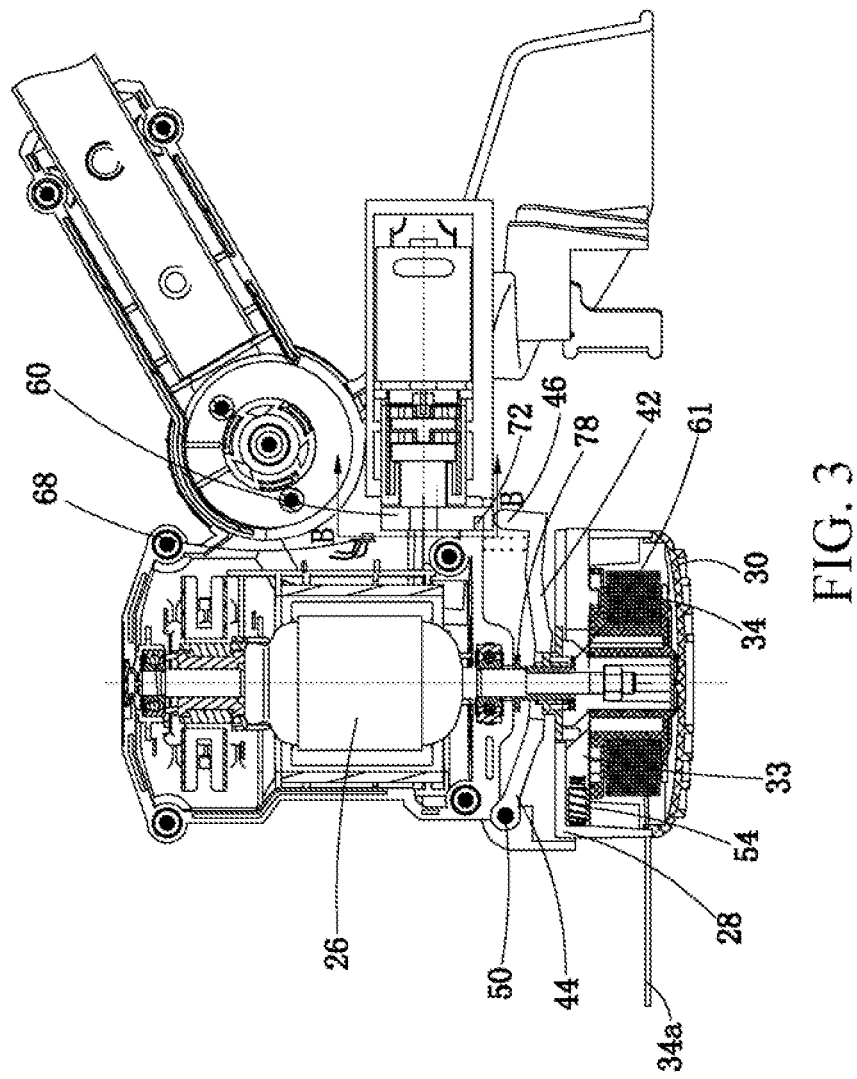
FIG. 3 is an amplified sectional view of a head of the grass trimmer as shown in FIG. 1, and at the moment, a lever drives a spool to move.

Referring to FIG. 2 and FIG. 3, in the first state, the coil 32 and the base 28 synchronously rotate, the grass trimming line 34 wound on the spool 32 and the base 28 synchronously rotate, the part of the grass trimming line 34 extending out of the base 28 can trim grass, that is, trim a lawn. In the second state, the spool 32 and the base are separated, a rotary centrifugal force of the grass trimming line 34 drives the spool 32 to generate relative movement with the base 28, thereby generating a speed difference, further the centrifugal force of the grass trimming line 34 pulls itself to throw a part outwards to realize pay off, that is, the longer the free tail end 34a of the grass trimming line 34 extends out of the base 28, the larger a grass trimming radius of the grass trimmer 100 is.

The holding part of the handle is a portion held on the handle by an operator. The cord delivering electronic switch is in the vicinity of the holding part of the handle, can be arranged on the handle and can also be arranged in other positions of the grass trimmer. Referring to FIG. 1, in the embodiment, the handle comprises a main handle 23 and an auxiliary handle 24 which are spaced for a certain distance, the main switch 27 is arranged on the main handle 23 and the cord delivering electronic switch 40 is arranged on the auxiliary handle 24. Due to such arrangement, the operator can more reliably lift and control the grass trimmer to work by the main handle 23 and the auxiliary handle 24.

In the embodiment, the main switch 27 and the cord delivering electronic switch 40 are arranged on the main handle 23 and the auxiliary handle 24 respectively, and operations of the main switch 27 and the cord delivering electronic switch 40 do not interfere each other. When the operator controls the grass trimmer 100 to work by the auxiliary handle 24 and wants to perform cord delivering on the spool 32, the operator only needs to controls the cord delivering electronic switch 40 on the auxiliary handle 24 along with a trend without changing a working state of the grass trimmer 100 and interrupting a grass trimming work of the grass trimmer 100, operation is convenient, and such advantage is more obvious when the grass trimmer is in an edge trimming state.

Of course, the cord delivering electronic switch 40 can be arranged in other positions of the grass trimmer, for example, arranged in a position on the extending rod 20 close to the main handle or the auxiliary handle, or arranged on the main handle and spaced from the main switch by a certain distance as long as the operator can control the cord delivering electronic switch while lifting the grass trimmer to trim grass by the handle. All technical solutions similar to the embodiment should fall within a protective scope of the invention.

Since the cord delivering mechanism is controlled by the cord delivering electronic switch independent of the main switch, thus avoiding cord delivering waste during startup and shutdown every time and reducing the wear of the grass trimmer; and the cord delivering electronic switch is arranged in a holding part of the handle or a vicinity position of the holding part, and the operator can trigger the cord delivering electronic switch while holding a handle triggering switch without interrupting the work of the grass trimmer, and the cord delivering operation is convenient. Therefore, no matter the main motor 26 works or not, the cord delivering electronic switch 40 is controlled to enable the secondary motor 56 to drive the spool 32, so that the spool 32 and the base 28 generate a relative movement to generate a rotary speed difference, and realize cord delivering.

Further referring to FIG. 2 and FIG. 3, the second motor 56 is provided with an output shaft 58, and the transmission device comprises a first transmission system arranged between the output shaft 58 and the spool 32. The first transmission system is a movement converting mechanism, converting a rotary movement of the secondary motor 56 into the rotary movement of the spool capable of generating a speed difference relative to the base. The first transmission system comprises a transmission part fixedly matched and connected with an output shaft 58, a pivoting part driven by the transmission part and a middle part 74 driven by the pivoting part.

In the embodiment, the transmission part is set to be an eccentric cam 60 fixedly matched and connected with the output shaft 58, the pivoting part is set to be a lever 42 rotating by taking a pivoting shaft 50 as a rotary center, wherein the pivoting shaft 50 fixedly connects a first end of the lever 42 to the housing 25, and a second end 46 of the lever abuts against a peripheral surface of the eccentric cam 60. An elastic part 52 is arranged between a part on the lever 42 close to the second end 46 and the housing 25, the elastic part 52 in the embodiment adopts a tension spring, which can be replaced with other elastic elements with similar functions. The elastic part 52 acts to enable the second end 46 of the lever to always abut against a cam peripheral surface of the eccentric cam. When the secondary motor 56 rotates, the output shaft 58 drives the eccentric cam 60 to rotate, due to a cam peripheral surface configuration of the eccentric cam 60, an action force of the eccentric cam 60 rotates around the pivoting shaft 50 at the second end 46 overcoming an action force of the elastic part 52 to drive the lever 42. In addition, The grass trimmer 100 is provided with a limiting part 78, when the lever 42 moves to abut against the limiting part 78 along a direction away from the base 28, the lever 42 moves to an extreme position along such direction, and the spool 32 cannot be driven to move to pay off unless the cord delivering electronic switch is started up to rotate the secondary motor 56, and the lever 42 overcomes the action force of the elastic part 52, thus reducing waste of the grass trimming line.

The lever 42 can directly or indirectly drive the spool 32 to circumferentially move. Movement of the lever 42 drives the circumferential movement of the spool 32 around its rotary axis, so as to be converted between the first state and the second state.

The secondary motor 56 has a motor shaft 56a, preferably, the transmission device further comprises a second transmission system arranged between the motor shaft 56a and the output shaft 5. The second transmission system is set to be a speed reduction mechanism, and the speed reduction mechanism in the embodiment adopts a planet wheel mechanism 66. Of course, the skilled in the art can conceive to replace with other speed reduction transmission mechanisms, for example, other gear transmission manners, belt wheel transmission, etc.

Figure 4:
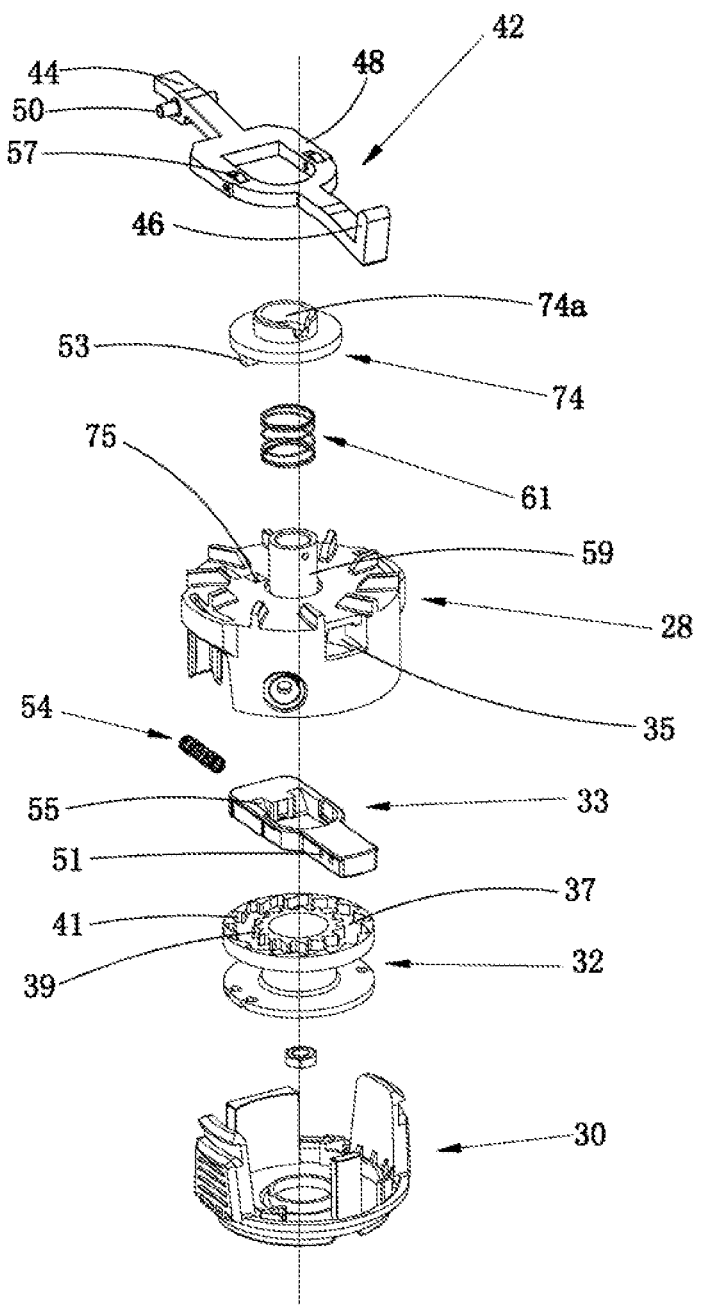
FIG. 4 is a stereoscopic disintegrated schematic diagram of a cord delivering mechanism in the head of the grass trimmer as shown in FIG. 1.
Figure 5:
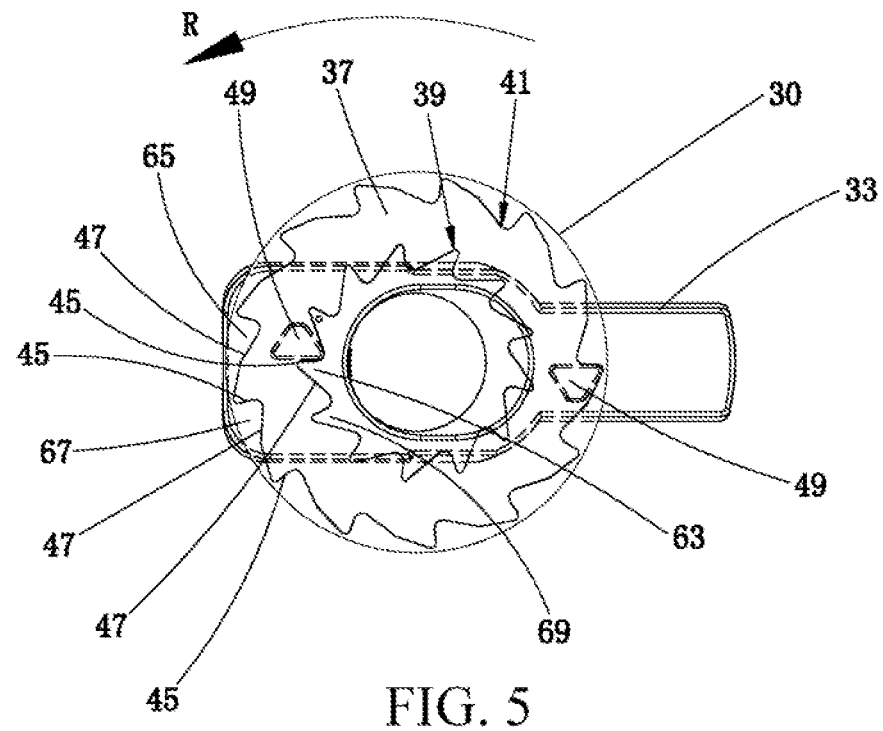
FIG. 5-FIG. 9 are schematic diagrams of a state change process of a sliding block and a spool of a grass trimmer as shown in FIG. 1 in a cord delivering process controlled by the paying mechanism.

Further referring to FIG. 4 and FIG. 5, in the embodiment, the lever 42 indirectly drives the spool 32 to circumferentially move. Preferably, a sliding block 33 circumferentially fixed with the base 28 to be radially movably matched and connected is arranged between the lever 42 and the spool 32. Particularly, the base 28 is provided with a strip hole 35 radially extending, and the sliding block 33 penetrates through the strip hole 35 and is circumferentially fixed with the base 28 to be radially movably matched and connected.

The sliding block 33 radially moves, so that the spool 32 can circumferentially move to generate a rotary speed difference with the base 28. The spool 32 is provided with a toothed slot 37 extending circumferentially, the toothed slot 37 comprises a first toothed edge 39 and a second toothed edge 41 opposite to each other, the first toothed edge 39 and the second toothed edge 41 have the same number of teeth which are staggered circumferentially, each tooth on the first toothed edge 39 comprises a radial surface 45 extending radially and a circumferential surface 47 circumferentially extending obliquely, and each tooth on the second toothed edge 41 comprises a radial surface 45 extending radially and a circumferential surface 47 circumferentially extending obliquely; the sliding block 33 is provided with a protruding tooth 49 capable of radially moving in the toothed slot 37, and when the protruding tooth 49 abuts against the radial surface 45, the sliding block 33 drives the spool 32 and the base 28 to synchronously rotate; and when the protruding tooth 49 abuts against the circumferential surface, the sliding block 33 drives the spool 32 to move relative to the base 28, so as to generate a speed difference.

A bias press part 54 is arranged between the base 28 and the sliding block 33, and the bias press part 54 exerts a force to the sliding block 33 to keep the sliding block 33 to drive the spool 32 and the base 28 to synchronously rotate. Thereby, the circumferential movement of the spool 32 can be driven to generate a rotary speed difference by only overcoming the action force of the bias press part 54 to drive the sliding block to slide. The bias press part 54 in the embodiment is a spiral spring, and the skilled in the art should conceive that other bias press parts for example a pull spring can also achieve the same effect.

A middle part 74 circumferentially fixed with the base 28 to be axially movably matched and connected is arranged between the lever 42 and the sliding block 33. Particularly, a middle arm 48 of the lever is provided with an opening, the middle part 74 is provided with a center hole 74a, and the lever 42 and the middle part 74 are mounted on a rotary shaft together by the opening and the center hole 74a respectively; and the lever 42 abuts against the middle part 74 by a middle arm 48 of the lever so as to drive the middle part 74. The base 28 is provided with a thorough hole 75 axially extending, the middle part 74 partially penetrates through the through hole 75 to be circumferentially fixed with the base 28 to be axially movably matched and connected.

The lever 42 drives the middle part 74 to axially move so as to drive the sliding block to radially move. Particularly, the middle part 74 is provided with a first slope 53 arranged obliquely relative to an axial direction, the sliding block 33 is provided with a second slope 55 extending obliquely relative to an axial direction, when the middle part 74 axially moves to the spool 32, the first slope 53 abuts against the second slope 55 to enable the sliding block 33 to generate radial movement, so that the protruding tooth 49 and the toothed slot 37 are matched to drive the spool 32 to circumferentially move. The skilled in the art can conceive only one obliquely arranged slope in the axial direction is needed to be arranged between the middle part 74 and the sliding block 33, and all technical solutions similar to the embodiment should fall within a protective scope of the invention.

In order to reduce friction between the lever 42 and the middle part 74, the second end 46 of the lever 42 is provided with a rolling friction part 57, specifically being a rolling bearing, the rolling bearing enables friction between the lever 42 and the middle part 74 to be rolling friction, thus greatly reducing the wear of the lever 42 and the middle part 74 and prolonging the service life of the grass trimmer 100. Of course, the rolling friction part 57 can be in other manners such as a ball, a rolling column and an end surface bearing.

In the embodiment, the grass trimmer 100 is also provided with an elastic element 61 exerting a force to the middle part 74 to keep the middle part 74 to abut against the lever 42, the middle part 74 axially moves to the spool 32 and drives the sliding block 33 to radially move by only overcoming the action force of the elastic element 61, and finally the spool 32 is driven to circumferentially move.

Thereby, in the embodiment, the lever 42 drives the try 32 to move among three positions, in the first position, the spool 32 is in a first state, in the second position, the spool 32 is in a second state, and in the third position, the spool 32 is in the first state again.

Specifically, as shown in FIG. 5, in the first position, the protruding tooth 49 on the sliding block 33 abuts against a radial surface 45 of the first toothed edge 39, and the sliding block 33 can drive the spool 32 and the base 28 to synchronously rotate.

Figure 6:
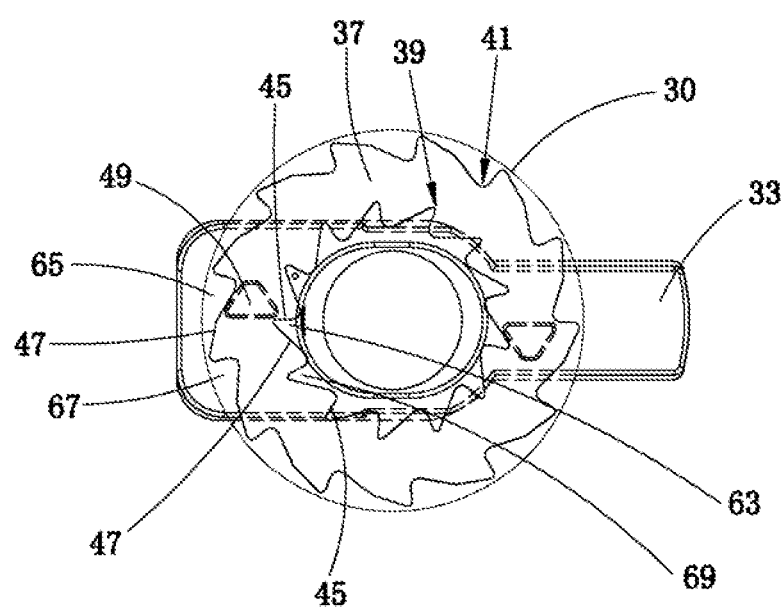

As shown in FIG. 6, in the second position, the protruding tooth 49 on the sliding block 33 does not abut against the radial surface 45 of any tooth on any toothed edge, the second position comprises two conditions, the first condition is that the protruding tooth 49 abuts against the circumferential surface 47 on the second toothed edge 41, and the sliding block 33 linearly moves to drive the spool 32 to rotate relative to the base 28; and the other condition is that the protruding tooth 49 does not abut against the circumferential surface, the spool 32 rotates to drive the grass trimming line 34 to rotate, and a centrifugal force generated by the free tail end 34a of the grass trimming line drives the spool 32 to rotate relative to the base 28.

Figure 7:
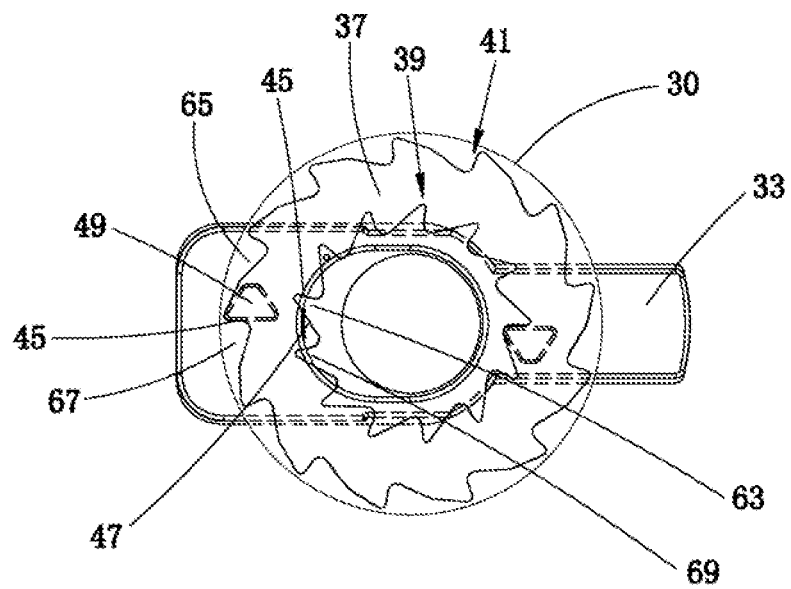

As shown in FIG. 7, in the third position, the protruding tooth 49 on the sliding block 33 abuts against the radial surface 45 on the second toothed edge 41, and the sliding block 33 can drive the spool 32 and the base 28 to synchronously rotate. A force exerting direction of the bias press part 54 to the lever 42 is opposite to that of the lever 42 to the spool 32. Particularly, the force exerting direction of the bias press part 54 to the sliding block 33 is opposite to that of the lever 42 to the sliding block 33, and more particularly, the force exerting direction of the bias press part 54 to the sliding block 33 is opposite to that of the middle part 74 the sliding block 33.

The bias press part 54 drives the spool 32 to move to a fourth position and a fifth position from the third position, in the fourth position, the spool 32 is in the second state, and in the fifth position, the spool 32 is in the first state.

Figure 8:
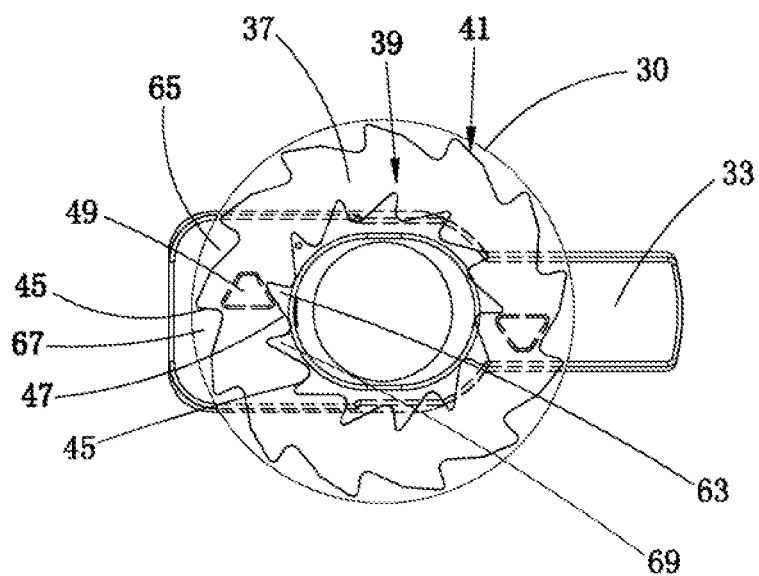

Specifically, as shown in FIG. 8, in the fourth position, the protruding tooth 49 on the sliding block 33 does not abut against with the radial surface 45 of any tooth on any toothed edge, the fourth position has tow conditions: one condition is that the protruding tooth 49 abuts against the circumferential surface 47 of the first toothed edge 39, the sliding block 33 drives the spool 32 to move relative to the base 28, the other condition is that the protruding tooth does not abut against the circumferential surface 47, the spool 32 rotates to drive the grass trimming line to rotate, and centrifugal force generated at the free tail end 34a of the grass trimming line also drives the spool 32 to rotate relative to the base 28.

Figure 9:
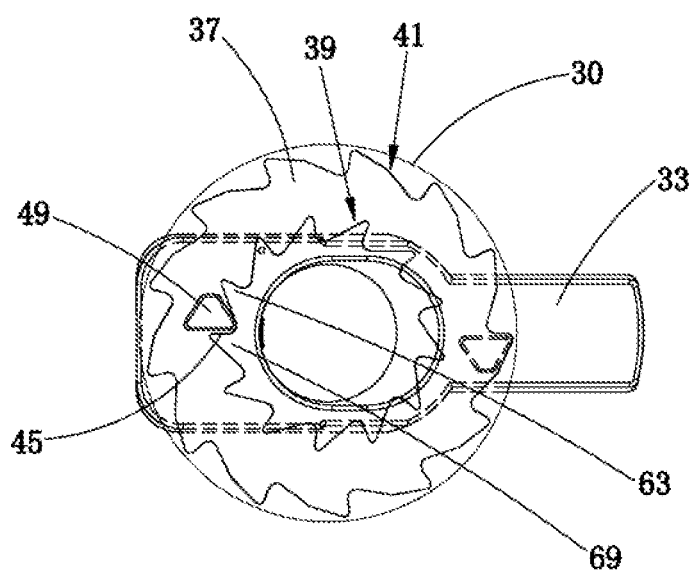

As shown in FIG. 9, in the fifth position, the protruding tooth on the sliding block 33 abuts against the radial surface 45 of the first toothed edge 39, and the sliding block drives the spool 32 and the base 28 to synchronously rotate.

Back to FIG. 4, the sliding block 33 is provided with a clump weight 51, and in the embodiment, a centrifugal force direction generated to the sliding block 33 by the clump weight 51 along with rotating of the sliding block 33 is same as a force exerting direction of the bias press part 54 to the sliding block 33. While in a conventional startup and shutdown cord delivering mechanism, a centrifugal force direction generated to the sliding block by the clump weight along with rotating of the sliding block is opposite to a force exerting direction of the bias press part to the sliding block. Therefore, the sliding block 33 cannot drive the spool 32 to rotate to pay off during startup and shutdown of the grass trimmer 100 in the embodiment, and only when the cord delivering electronic switch 40 is started and under drive of the secondary motor 56, the sliding block 33 can drive the spool 32 to rotate to pay off, thus reducing loss of the grass trimmer. Of course, the sliding block 33 is not provided with a unique clump weight, and an eccentric mass is arranged on the sliding block, and at the moment, it is equivalent to arrange the clump weight on a heavier part of the sliding block.

Since a centrifugal force direction generated by rotating of the clump weight 51 is same as a force exerting direction of the bias press part 54 to the sliding block 33, the skilled in art can conceive that the bias press part may not be arranged, and only a centrifugal force generated by rotating of the clump weight 51 drives the spool 32 to move to the fourth and fifth positions from the third position.

In the embodiment, two protruding teeth 49 are arranged, and the two protruding teeth 49 are spaced by a certain distance on an extending direction of the sliding block 33, the distance is a diameter of a center circle of the toothed slot 37, so when the first protruding tooth 49 is meshed with the tooth at the first toothed edge 39, the second protruding tooth can be meshed with the second toothed edge 41 at the other radial end of the toothed slot 37, so that a stress of the spool 232 is more uniform. Those skilled in the art can conceive that only one protruding tooth may also be arranged.

The control device comprises a stopping device controlling the secondary motor to stop rotating. The stopping device comprises a sensing unit and a control unit receiving a signal of the sensing unit and controlling the secondary motor. In the embodiment, the control unit is electrically connected with the main switch 27.

Referring to FIG. 2, FIG. 3, FIG. 10 and FIG. 11, the sensing element comprises a hall sensor 68 arranged in the housing, and a magnetic part arranged at the transmission device, and the hall sensor 68 is next to the magnetic part 72. In the embodiment, the hall sensor 68 is fixedly arranged in the housing 25, the magnetic part 72 is arranged at the end surface of the eccentric cam 60 close to the hall sensor 68, and the magnetic part 72 adopts a magnet; and of course, the magnetic part can adopt a material having magnetism and can generation an action with the hall sensor 68.

When the cord delivering electronic switch 40 is started, the secondary motor 56 rotates to drive the eccentric cam 60 to rotate around an output shaft of the secondary motor, and the magnetic part 72 arranged at the eccentric cam 60 has a first state opposite to a hall sensor 68, and a second state staggered with the hall sensor 68. When the magnetic part 72 is in the first state with the hall sensor 68, the sensing unit generates a sensing signal; when the magnetic part 72 is in the second state with the hall sensor 68, the sensing signal disappears. In the embodiment, the control unit is set to be a PCB (printed circuit board), and once receiving the sensing signal generated by the sensing unit, the PCB controls the secondary motor 56 to stop.

Figure 12:
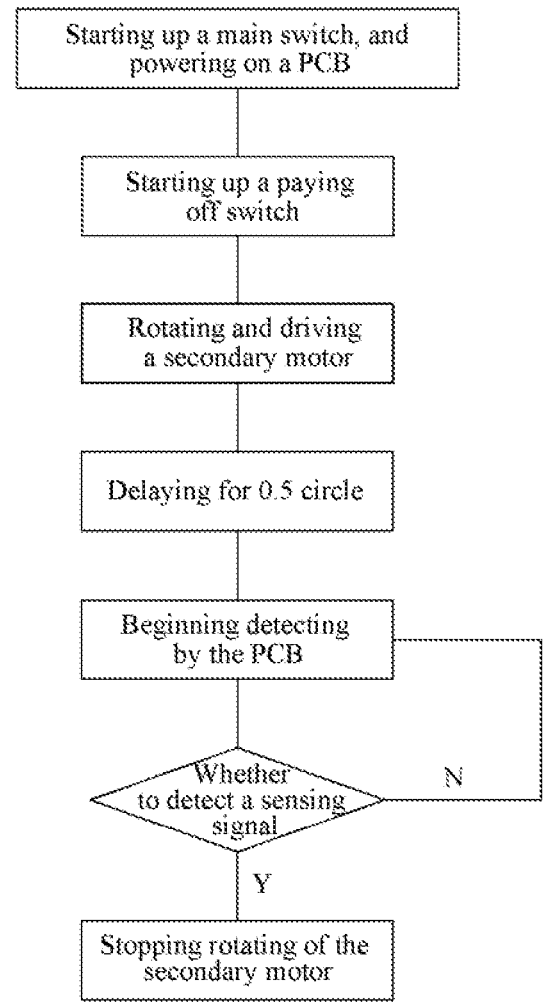
FIG. 12 is a schematic diagram of a cord delivering flow of a spool controlled by a cord delivering mechanism in FIG. 1.

Referring to FIG. 12, an operation process of a cord delivering mechanism of the grass trimmer 100 in the embodiment in a working process is described as follows: The main switch 27 is started to enable the spool 32 and the base 28 to synchronously rotate, and the PCB is powered on; the cord delivering electronic switch is started up, the secondary motor 56 rotates to drive the spool 32 to move and generate a speed difference with the base 28, when the eccentric cam 60 driven by the secondary motor 56 rotates to 0.5 circle, that is, from the moment that the secondary motor 56 rotates, time that the eccentric cam 60 rotates by 0.5 circle is delayed, and the PCB starts to detect a sensing signal. If the control unit does not receive the sensing signal, namely the magnetic part 72 and the hall sensor 68 are still in a mutual staggered second state, the control unit does not control the secondary motor to stop, and the secondary motor continues to keep rotating. Once the PCB receives the sensing signal, namely the magnetic part 72 has the first state opposite to the hall sensor, the control unit automatically controls the secondary motor 56 to stop rotating.

As mentioned earlier, whether the main switch 27 is started up or not and whether the grass trimmer 100 is in a working state and non-working state, the spool 32 can pay off. Therefore, in the embodiment, in an operation process of the cord delivering mechanism of the grass trimmer 100, the cord delivering electronic switch 40 can be selected to start up, to generate a speed difference between the spool 32 and the base 28; and the cord delivering electronic switch 40 is manually released, the spool 32 and the base 28 recover relative rest, thus realizing cord delivering of the spool 32.

Figure 13:
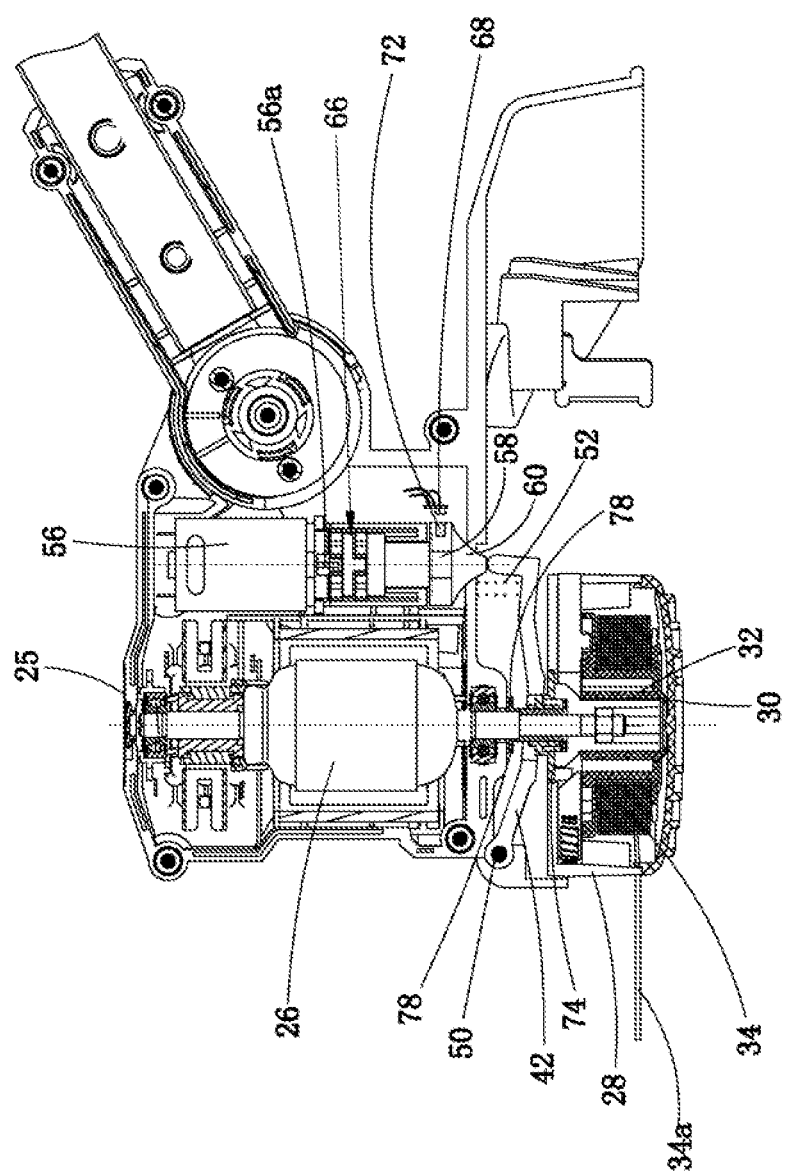
FIG. 13 is an amplified sectional schematic diagram of the head of the grass trimmer in a second embodiment of the invention.

FIG. 13 illustrates a grass trimmer 200 provided by a second embodiment of the invention.

The grass trimmer 200 has a structure similar to that of the first embodiment 100, a difference is described in detail as follows, and for the purpose of convenience, same numbers denote same structures and are not repeated.

In the embodiment, the main motor 26 and the secondary motor 56 are arranged in the housing 25 in parallel, that is, a motor shaft 36 of the main motor 26 is parallel with a motor shaft 56*a* of the secondary motor 56. Of course, positions of the main motor 26 and the secondary motor 56 are not limited to listed manners, and those skilled in the art can consider oblique arrangement.

A second transmission system between the motor shaft 56*a* and the output shaft 58 of the secondary motor 56 is a speed reduction mechanism, the speed reduction mechanism comprises a planet wheel mechanism 66. The second transmission system between the spool 32 and the output shaft 58 of the secondary motor comprises a transmission part connected to the output shaft 58, a pivoting part driven by the transmission part and a middle part 74 driven by the pivoting part. In the embodiment, the transmission part is set to be an end surface 60' fixedly and matched with the output shaft 58, the pivoting part is set to be a lever 42 rotating by taking a pivoting shaft 50 as a rotary center, wherein the pivoting shaft 50 fixedly connects a first end 44 of the lever to the housing 25, and a second end 46 of the lever abuts against a cam surface of the end surface cam 60'. An elastic part 52 is arranged between part on the lever 42 close to the second end 46 and the housing 25. The elastic part 52 acts to enables the second end 46 of the lever to abut against the cam surface of the end surface can 60' always. When the secondary motor 56 rotates, the output shaft 58 drives the end surface cam 60' to rotate together, due to the configuration of a cam surface of the end surface cam 60', the end surface cam drives the second end 46 of the lever 42 to rotate around the pivoting shaft by overcoming an action force of the elastic part 52. In addition, the grass trimmer 100 is provided with a limiting part 78, and when the lever 42 moves to abut against the limiting part 78 along a direction away from the base 78, the lever 42 moves to an extreme position along such direction. The spool 32 can be drive to pay off by only starting up the cord delivering electronic switch 40 to enable the secondary motor 56 to rotate and the lever 42 overcomes the action force of the elastic part 52, thus reducing the waste of the grass trimming line.

In the embodiment, the lever 42 indirectly drives the spool 32 to circumferentially move. Specific movement and configuration driving the spool 32 as well as cord delivering control and operation of the cord delivering mechanism to the spool 32 refer to the first embodiment.

FIG. 14-FIG. 21 illustrate a grass trimmer 300 according to a third embodiment of the invention.

The grass trimmer 300 has a structure same as that of the first embodiment 100, a difference is described in detail as follows, and for the purpose of convenience, same numbers denote same structures and are not repeated.

Figure 14:
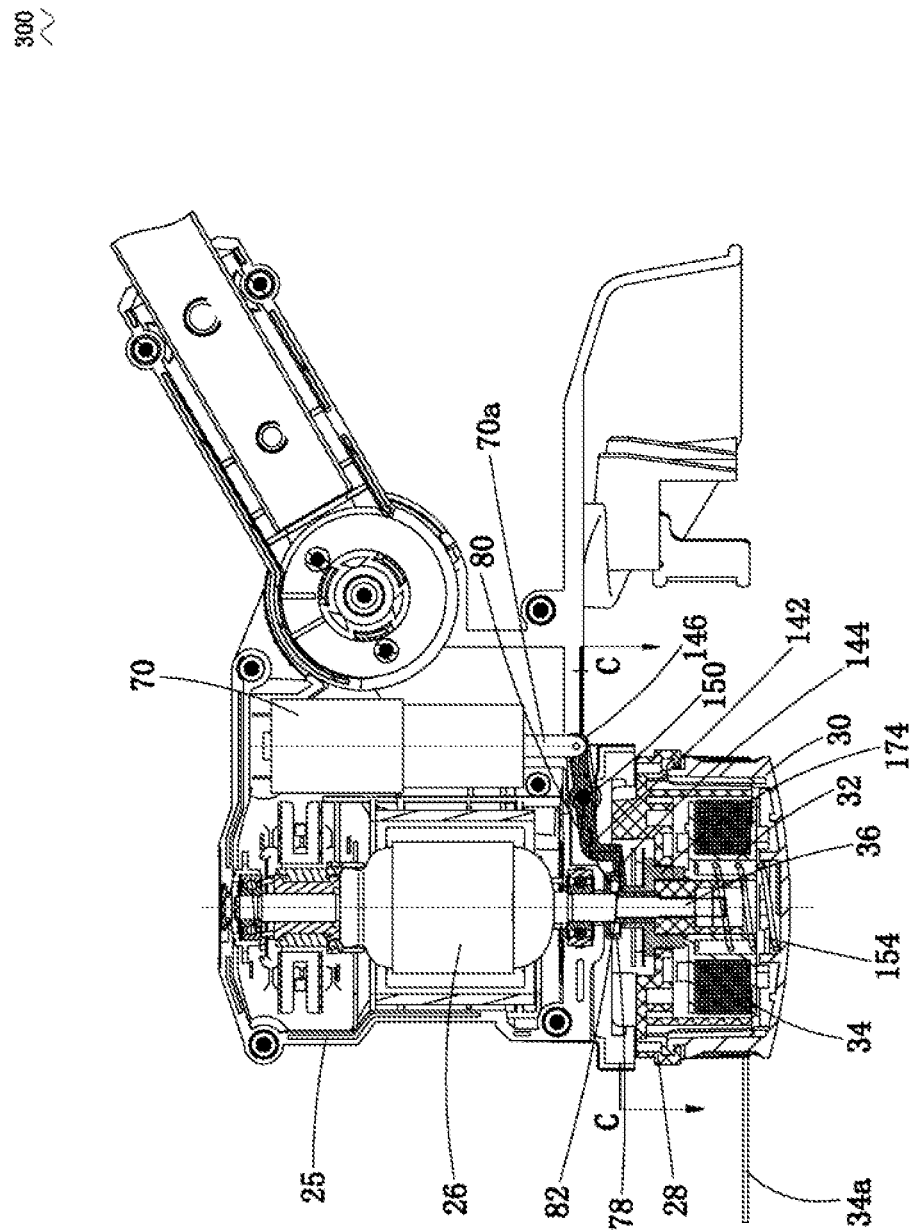
FIG. 14 is an amplified sectional schematic diagram of the head of the grass trimmer in a third embodiment of the invention.

Referring to FIG. 14, an electric driver is an electromagnet 70 arranged in the housing 25, and the electromagnet 70 is controlled by the cord delivering electronic switch 40 to start up. The electromagnet 70 has an output end 70a extending in parallel with a motor shaft 36 of the main motor, when the cord delivering electronic switch 40 is switched on, the electromagnet 70 is powered on to enable an output shaft 70a to generate an axial movement in a direction as shown by an arrow M in FIG. 14. When the cord delivering electronic switch is switched off, the electromagnet 70 is powered off to enable the output shaft 70a to generate an axial movement opposite to a direction as shown by an arrow M in FIG. 14.

A third transmission system is arranged between the output end 70a and the spool 32. By the third transmission system, when powered on, the electromagnet 70 drives the spool 32 to move between the first state and the second state. In the first state, the spool 32 and the base 28 synchronously rotate; and in the second state, a rotary speed difference is generated between the spool 32 and the base 28.

In the embodiment, the spool 32 axially moves along a rotary axis of the grass trimming head 22 to be converted between the first state and the second state.

The third transmission system comprises a rotary part connected to the housing 25 by a pivoting shaft, and a sliding part 174 driven by the rotary part drives the spool 32 to move opposite to the base 28 along the axial direction. In the embodiment, the rotary part is set to be a lever 42 taking the pivoting shaft 150 as a rotary center, wherein the pivoting shaft 150 is positioned in the middle of the lever 142, a first end of the lever 142 is matched and connected with the sliding part, a second end 146 of the lever is movably connected with an output end 70a of the electromagnet, in the embodiment, the lever is in a bent strip shape, the pivoting shaft 50 is vertical to a rotary shaft 36 of the grass trimming head 22, and a structural configuration is reasonable.

Particularly, the base 28 is provided with a through hole 175 axially extending, the sliding part 174 partially penetrates through the through hole 175 and abuts against the spool 32, so that axial movement of the sliding part 174 can drive the spool 32 to axially move. In the embodiment, the sliding part 174 is positioned between the lever 142 and the grass trimming head 22, therefore, the cap 30 is not required to knock the ground, when the grass trimmer is in an edge trimming working state, work of the grass trimmer is not interrupted and the operation is convenient. The sliding part 174 and the base 28 are circumferentially fixed but are axially movably matched and connected.

Compared with a manner of directly driving the spool 32 between the base 28 and the cap 30, a structure of indirectly driving the spool 32 by the lever 142 through the sliding part 174 is simpler, and there is no need of arranging other matching structures on the spool 32, therefore, the base 28 of the grass trimming head 22 in the embodiment can adapt to lots of separately sold spool accessories, particularly adapt to the spool 32 knocked to pay off, and a consumer can conveniently replace the spool 32.

Figure 15:
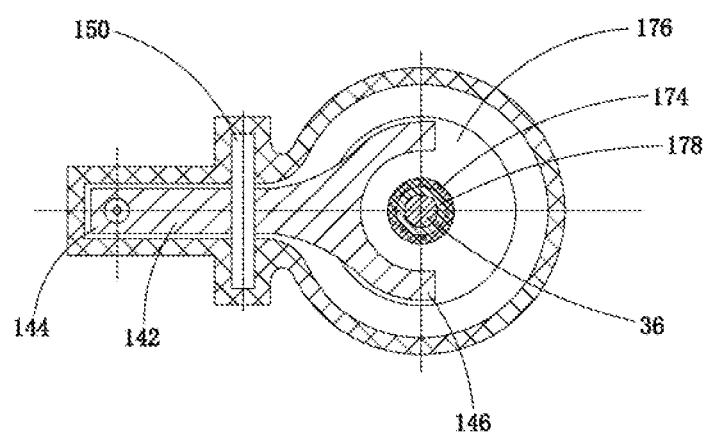
FIG. 15 is a matching and connection relation schematic diagram of a lever and a sliding part as shown along a hatching line C-C in FIG. 14.

Referring to FIG. 15, in a working process of the grass trimmer 300, the sliding part 174 is driven by the base 28 to rotate synchronously with the base 28, if the lever 142 directly abuts against the sliding part 174 and drives the sliding part 174 to axially move, wear caused by friction between the lever 142 and the sliding part 174 is very large, which greatly reduces the service life of the grass trimmer 300. In order to reduce the wear between the lever 142 and the sliding part 174, in the embodiment, a rotary friction part is arranged between the lever 42 and the sliding part 174. Particularly, the sliding part 174 is provided with a support surface, the rotary friction part is a bearing 176 supporting on the support surface, the lever 142 abuts against the end surface of the bearing 176 to drive the bearing 176 to move along an axial direction so as to drive the sliding part 174 to move along the axial direction. Preferably, the bearing 176 is an end surface bearing, which can change direct contact sliding friction between the lever 142 and the sliding part 174 to rolling friction between the two, thus greatly reducing a friction force and reducing the wear.

In the embodiment, the bearing 176 sleeves the sliding part 174 and loosely matched with the sliding part 174, thereby, according to a loose matching degree, the bearing 176 can rotate along with the sliding part 174 or not, the friction between the lever 142 and the bearing 176 is smaller when the bearing 176 does not rotate, and the service life of the grass trimmer 300 is further prolonged.

In order to further reduce the friction, those skilled in the art can conceive that a rolling part such as a rolling ball and a rolling column can be arranged at the second end 146 abutting against the end surface of the bearing 176 at the lever 142, friction between the lever 142 and the end surface of the bearing 176 is reduced and the service life of the grass trimmer 300 is further prolonged.

According to the embodiment, preferably, the second end 146 of the lever 142 is in a shifting fork shape, two ends of the shifting fork are symmetrically arranged relative to the bearing 176, and the force exerting of the lever 142 to the bearing 176 is more uniform and reasonable.

Those skilled in the art can conceive that the second end 146 of the lever 142 can in other shapes, such as a simple strip shape; or no rolling parts are arranged at the second end 146 of the lever 142. All technical solutions similar to the embodiment should fall within a protective scope of the invention.

The lever 142 drives the spool 32 to overcome an action force of the bias press part 154 to be separated from the base 28 under an action of the cord delivering electronic switch 40. When the cord delivering electronic switch 40 is released, the electromagnet 70 is powered off, the output end 70a generates an axial movement opposite to a direction as shown in an arrow M, meanwhile the spool 32 recovers to be clamped with the base 28 under the action of the bias press part 154, and in a recovery process of the spool 32, the spool 32 drives the sliding part 174 to move to a direction away from the base 28. In order to limit a movement range of the sliding part 174 and prevent the sliding part 174 from being separated from the base 28, the grass trimmer 300 is provided with a limiting part 178 capable of abutting against one end of the sliding part 174 away from the base 28. In the embodiment, the limiting part 178 is tightly matched with a rotary shaft 36 of the grass trimming head 22 and has a first limiting surface 80 vertical to the rotary shaft 36, and the first limiting surface 80 can limit a movement range of the sliding part 174 to a direction away from the base 28, thus ensuring a connection between the sliding part 174 and the base 28. Preferably, the limiting part 178 is further provided with a second limiting surface 82 capable of abutting against an end surface of the bearing 176 away from the base 28, and the second limiting surface 82 can limit a movement range of the bearing 176 to a direction away from the base 28 when abutting against the bearing 176. In the embodiment, since one end of the sliding part 174 away from the base 28 is further away from the base 28 than one end of the bearing 176 from the base, the second limiting surface 82 is vertical to a rotary shaft 36 of the grass trimming head 22 and approaches to the base 28 relative to the first limiting surface 80. Thereby, in the embodiment, one limiting part 178 limits movement ranges of the sliding part 174 and the bearing 176 at the same time, structure is simple and configuration is reasonable.

Figure 16:
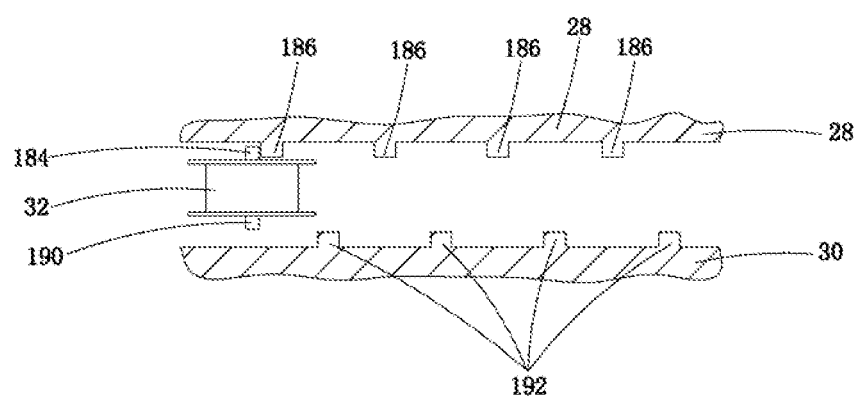
FIG. 16 to FIG. 20 are schematic diagrams of a state change process of a spool, a base and a cap of a grass trimmer as shown in FIG. 14 in a cord delivering process controlled by the paying mechanism.

As shown in FIG. 16, the end surface of the spool 32 close to the base 28 is provided with at least one bulge 184, the end surface of the spool 32 close to the cap 30 is provided with at least one protrusion 190, the at least one bulge 184 and the at least one protrusion 190 are oppositely arranged in an axial direction of the spool 32, the base 28 is provided with at least two stopping 186 distributed circumferentially, the cap 30 is provided with at least one arresting part 192 distributed circumferentially, the arresting part 192 and the stopping parts 186 are circumferentially arranged in a staggered manner, when the spool 32 is in the first state, the at least one bulge 184 is clamped with one of the at least two stopping parts 186, or the at least one protrusion 190 is clamped with the at least one arresting part 192. When the bulge 184 and the blocking parts 186 are clamped, the spool 32 and the base 28 synchronously rotate and are in the first state. The protrusion 190 and the arresting part 192 are clamped, the spool 32 and the cap 30 synchronously rotate, while the cap 30 and the base 28 synchronously rotate always, thereby, the spool 32 and the base 28 synchronously rotate and are in the first state. No matter how the amount of the bulge and the blocking parts changes, when in the first position, one bulge and one blocking part are clamped. Correspondingly, no matter how the amount of the protrusion and the stopping part changes, in the third position, one protrusion and one stopping part are clamped.

Thereby in an axial movement process of the spool 32, in a process that the bulge 184 on the spool 32 and two adjacent stopping parts 186 on the base 28 contact, the protrusion 190 on the spool 32 abuts against an arresting part 192 between the two stopping parts 186 on the cap 30, thus avoiding long separation between the spool 32 and the base 28 and the cap 30, realizing length controllable cord delivering and ensuring reliable work of the grass trimmer 300.

In normal work of the grass trimmer 300, the spool 32 keeps in the first state and the first position under the action of the bias press part 154, at the moment, the spool 32 is clamped with the base 28 and synchronously rotates with the base 28, and the grass trimming line wound on the spool 32 extends out of the base 28 to trim a lawn.

When the grass trimming line 34 is worn to certain degree and cannot realize a desired grass trimming radius, an operator can drive the spool 32 to pay off by the cord delivering mechanism. Particularly, the operator starts up the cord delivering electronic switch 40, the electromagnet 170 is powered on, the output end 70a axially moves to drive the lever 142 to rotate, a first end of the lever 142 pivots to a direction away from the base 28 around the pivoting shaft 150, a first end 144 pivots to drive a second end 146 of the lever 142 to pivot to a direction close to the base 28, the second end 146 moves to a direction close to the base 28 to press down the bearing 176, the sliding part 174 and the spool 32 to enable the spool 32 to approach to a second position as shown in FIG. 17 gradually, at the moment, the bulge 184 on the spool 32 is separated from the stopping part 186 on the base 28, and the protrusion 190 on the spool 32 does not abut against the arresting part 192 on the cap 30, a speed difference is generated between the spool 32 and the base 28, the spool 32 is in a second state, the grass trimming line 34 wound on the spool 32 pulls and throw a part of the grass trimming line out of the spool 32, that is, a longer free end of the grass trimming line 34 extends out of the base 34, to enable the grass trimmer to have a larger grass trimming radius.

Figure 17:
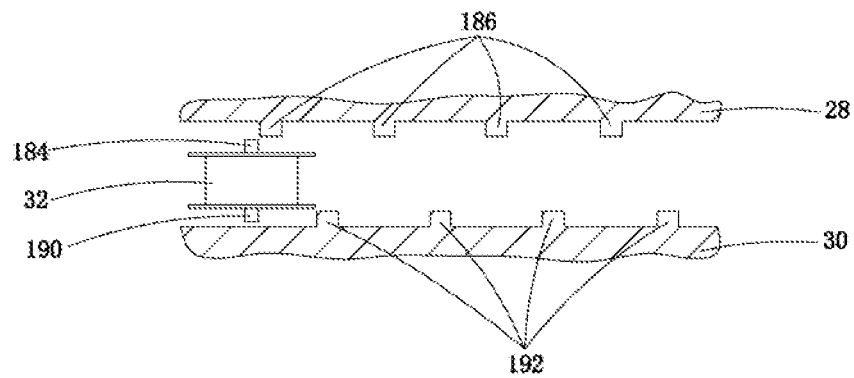
Figure 18:
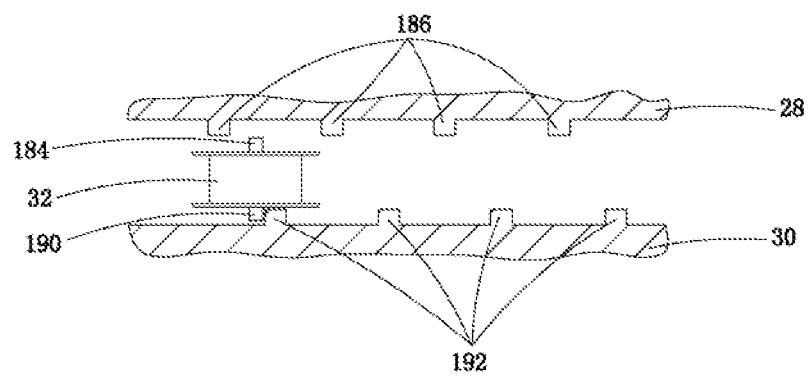

After approaching the second position as shown in FIG. 17, the spool 32 continues to move to a direction away from the base 28 under an action of the lever 142 till the spool 32 approaches to a third position as shown in FIG. 18, at the moment, the spool 32 is in the first state again, the protrusion 190 on the spool 32 abuts against the arresting part 192 on the cap 30, since the cap 30 is clamped with the base 28, the spool 32 and the base 28 synchronously rotate, and the grass trimming line wound on the spool 32 trims grass again at a normal speed.

Figure 19:
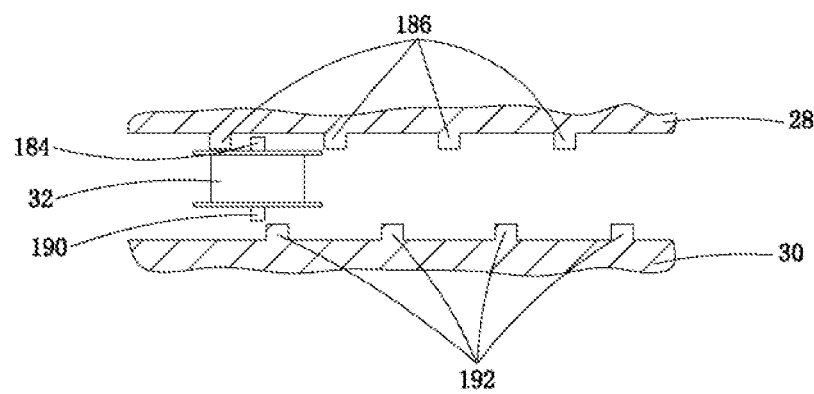

When approaching to the third position as shown in FIG. 18, the lever 142 presses down to an extreme position, the bias press part 154 is pressed to the extreme, at the moment, if the electronic cord delivering switch 40 is released, an opposite direction movement of the output end 70a of the electromagnet enables the lever 142 to not press down the spool 32 by the bearing 176 and the sliding part 174 any more, the spool 32 is separated from the cap 30 under the action of the bias press part 154 and moves to the base 28 and approaches a fourth position as shown in FIG. 19, at the moment, the protrusion 190 on the spool 32 is separated from the arresting part 192 on the cap 30, besides, the bulge 184 on the spool 32 does not abut against the stopping part 186 on the base 28, the spool 32 is in the second state again, a speed rotary speed difference is generated between the spool 32, the cap 30 and the base 28 again, and the grass trimming line 34 wound on the spool 32 is thrown by a certain distance again.

Figure 20:
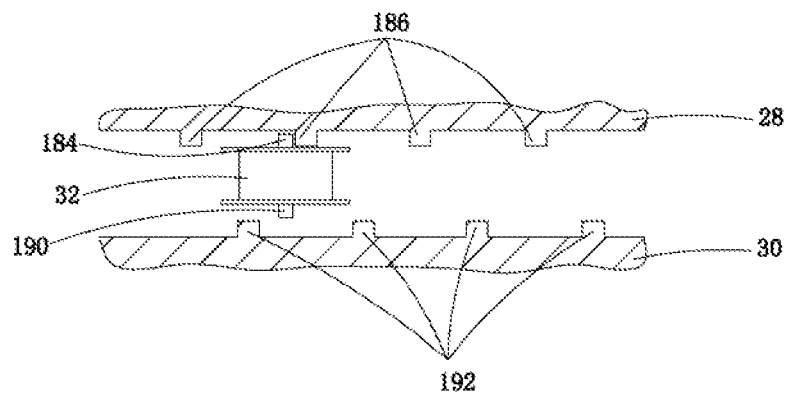

The spool 32 continues to move to a direction of the base 28 and gradually approaches to a fifth position as shown in FIG. 20, the spool 32 is in the first state again, at the moment, the bulge 184 abuts against the next stopping part 186, and the spool 32 and the base 28 are clamped to synchronously rotate again to as to trim grass at a normal speed.

An operation process of a cord delivering mechanism of the grass trimmer 300 in the embodiment is described as follows. The cord delivering electronic switch is started up to generate a speed difference between the spool 32 and the base 28; the cord delivering electronic switch 40 is manually released, the spool 32 and the base 28 recover to relative rest, thus realizing the cord delivering of the spool 32. The embodiment controls the power on and off of the electromagnet by only one element: the cord delivering switch 40, structure is simplified, operation is convenient and cost is further reduced.

Another cord delivering operation of the cord delivering mechanism is that the cord delivering electronic switch 40 is started up to enable the spool 32 and the base 28 to synchronously rotate; the cord delivering electronic switch 40 is started up to enable the electromagnet 70 to drive the spool 32 to move and generate a speed difference with the base 28; the cord delivering electronic switch 40 is released, and the spool 32 and the base 28 recover to synchronous rotating, thus realizing the cord delivering of the spool 32.

In a fourth embodiment of the grass trimmer of the invention, a structure of the grass trimmer adopts a structure similar to the first embodiment, the difference lies in that the grass trimmer omits an electric driver and a transmission device thereof driving the spool to move relative to the base. The clump weight is arranged at one end close to the bias press part, causing when a speed of the grass trimming head in a rotary direction is reduced, the sliding block is matched with the bias press part to drive the spool to generate a speed difference relative to the base. The spool rotates along a radial direction when in a second state generating a speed difference with the base.

Figure 21:
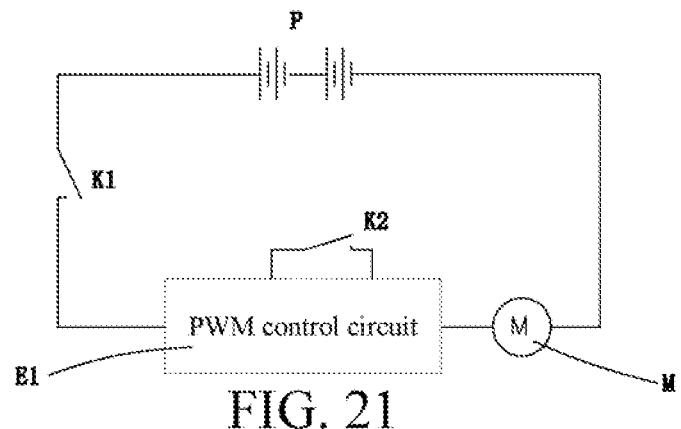
FIG. 21 to FIG. 23 are a working schematic diagram of a control circuit of a grass trimmer in a fourth embodiment and a fifth embodiment of the invention.
Figure 22:
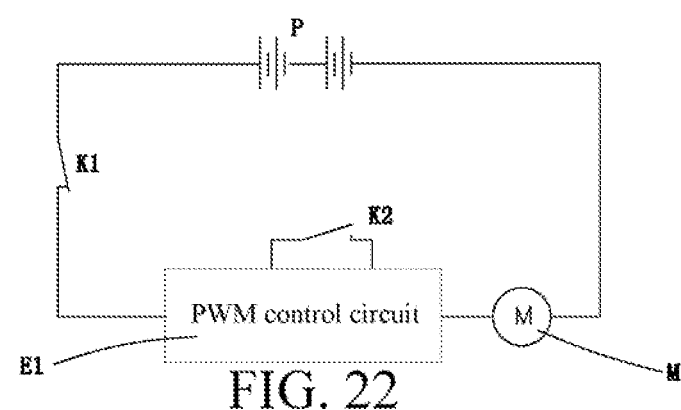
Figure 23:
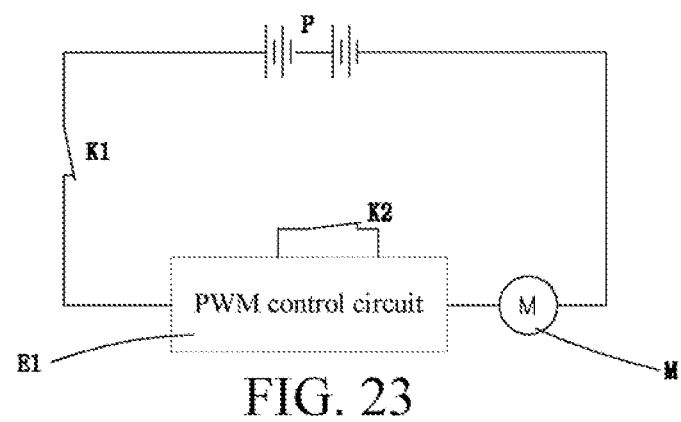

Referring to FIG. 21 to FIG. 23, a control device in the fourth embodiment comprises a control circuit electrically connected with the main motor 26, wherein the control circuit is used for conversion between a working speed and a cord delivering speed that is different than the working speed. The control circuit preferably adopts a PAM modulation circuit E1.

Referring to FIG. 21, a power source P powers a main switch K1 electrically connected with the main motor M. The PWM modulation circuit E1 comprises a cord delivering electronic switch K2. A PWM modulation circuit is a motor control technology well known in industry and is not repeated herein.

Referring to FIG. 22, under a normal cutting working state of the grass trimmer, the main switch K1 is switched on, the main motor M is started up to rotate and a rotary shaft of the main motor M drives the spool 32 and the base to synchronously rotate.

Referring to FIG. 23, when the grass trimmer requires cord delivering due to wear in a cutting process, the cord delivering electronic switch is switched on, at the moment, a rotary speed of the main motor M is controlled by the PWM modulation circuit E1, a rotary speed V of the main motor M changes, under the action of a centrifugal force, of the sliding block, a speed difference is generated between the spool 32 and the base 28 for rotating.

The operation speed V of the main motor M comprises a working rotary speed V0 and a cord delivering rotary speed V1. In the embodiment, the cord delivering rotary speed V1 is smaller than the working rotary speed V0.

Figure 24:
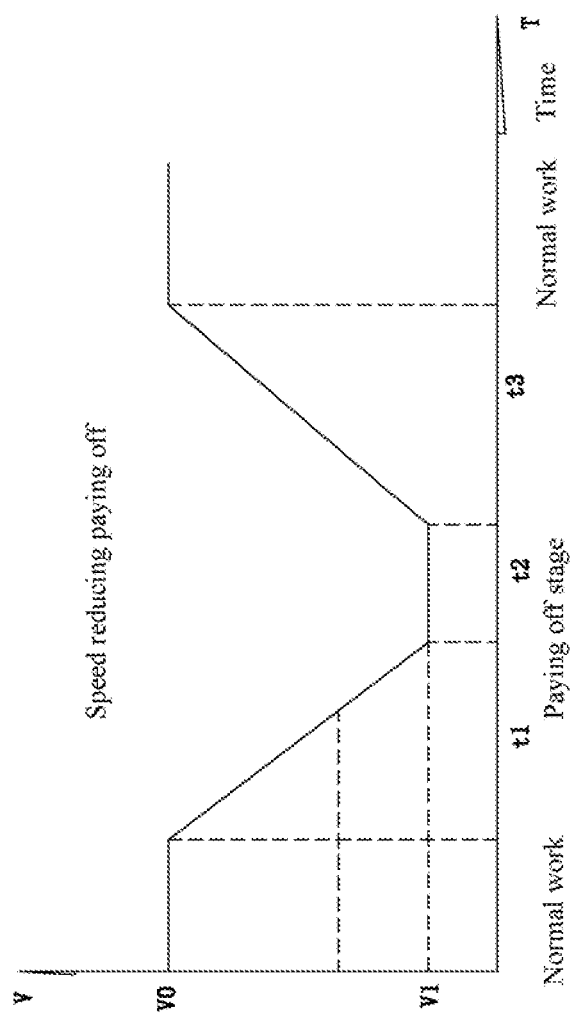
FIG. 24 is a schematic diagram of a rotary speed change of a main motor of a grass trimmer in the fourth embodiment of the invention.
Figure 25:
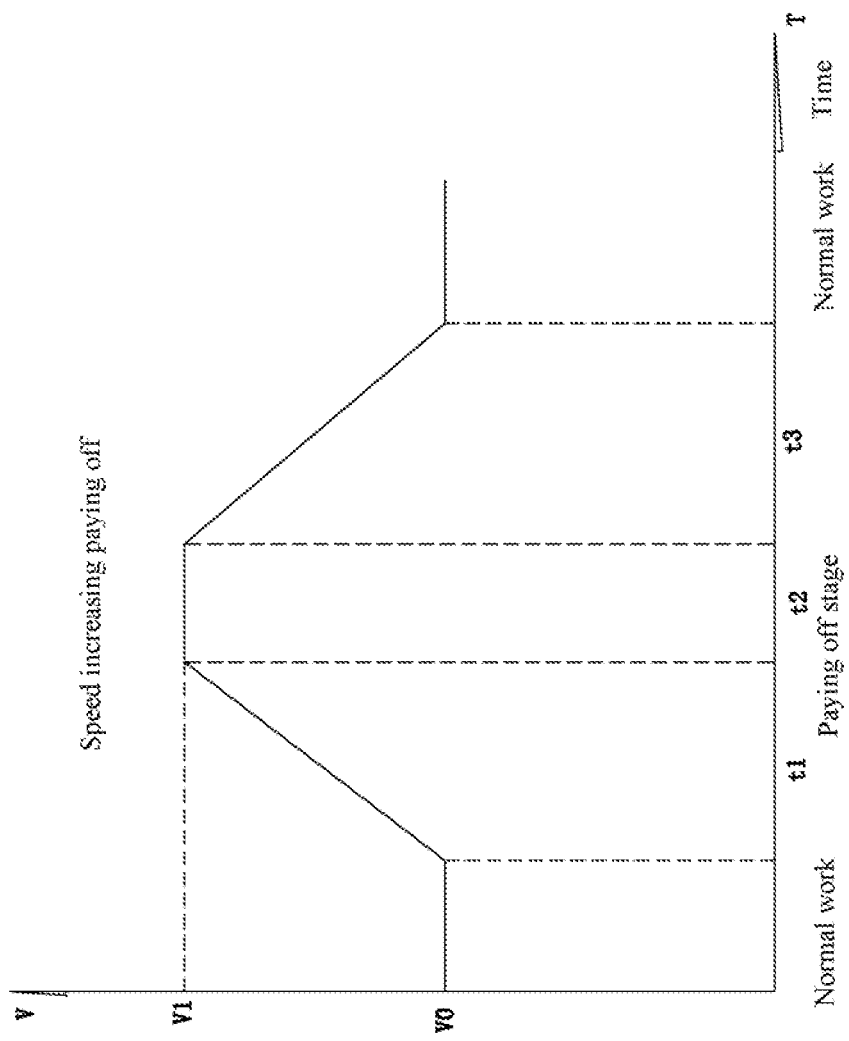
FIG. 25 is a schematic diagram of a rotary speed change of a main motor of a grass trimmer in the fifth embodiment of the invention.

FIG. 24 illustrates a change process of the operation speed V of the main motor M along with time T. Under a normal working condition, the working rotary speed V0 of the main motor M is between 5000-10000 revolutions per minute, and preferably the working rotary speed V0 is 8500 evolutions per minute. In the embodiment, the cord delivering rotary speed V1 is smaller than the working rotary speed V0, therefore the cord delivering rotary speed is set to be between 0-3500 revolutions per minute, and preferably, the cord delivering rotary speed is 3000 revolutions per minute. On a time axis T, in a t1 time period, the operation rotary speed of the main motor M is reduced to the cord delivering rotary speed V1 from the working rotary speed V0, and the t1 time period is smaller than 1 second; the cord delivering rotary speed V1 is kept for a t2 time period, the t2 time period is between 0.2-2 seconds; in a t3 time period, the operation speed of the main motor M recovers to the working rotary speed V0 from the cord delivering speed V1 and the t3 time period is also smaller than 1 second.

In a fifth embodiment of the grass trimmer of the embodiment, the structure of the grass trimming head adopts a structure similar to that of the first embodiment, and the difference lies in that the grass trimmer omits an electric driver and a transmission device thereof driving the spool to move relative to the base. The clump weight is arranged at one end away from the bias press part, causing when a speed of the grass trimming head in a rotary direction is increased, the sliding block is matched with the bias press part to drive the spool to generate a speed difference relative to the base. The spool rotates along a radial direction when in a second state generating a speed difference with the base.

Referring to FIG. 21-FIG. 23 and FIG. 25, the control device in the fifth embodiment comprises a control circuit electrically connected with the main motor 26, and the control circuit is used for controlling a rotary speed change during operation of the main motor 26. The control circuit adopts a PWM modulation circuit. A difference from the fourth embodiment is that the cord delivering rotary speed V1 is larger than the working rotary speed V0. In a change process of the operation speed V of the main motor M along with time T, wherein in a t1 time period, the operation speed of the main motor M is risen to the cord delivering rotary speed V1 from the working rotary speed V0, and the t1 time period is smaller than 1 second; the cord delivering rotary speed V1 is kept in a t2 time period, and the t2 time period is between 0.2-2 seconds; in a t3 time period, the operation speed of the main motor M recovers to the working rotary speed V0 from the cord delivering speed V1 and the t3 time period is also smaller than 1 second. Same as the fourth embodiment, the working rotary speed V0 of the main motor M is between 5000-10000 revolutions per minute, and preferably the working rotary speed V0 is 8500 evolutions per minute. In the embodiment, the cord delivering rotary speed V1 is larger than the working rotary speed V0, therefore the cord delivering rotary speed is set to be between 11000-15000 revolutions per minute, and preferably, the cord delivering rotary speed is 12000 revolutions per minute.

Figure 26:
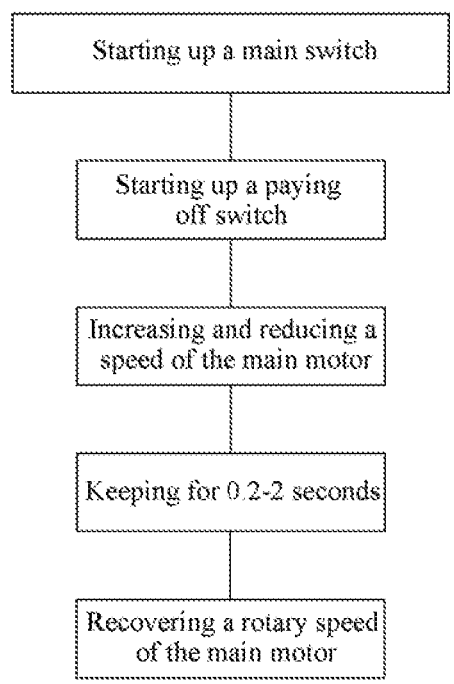
FIG. 26 is an operation flow chart of a cord delivering control of the grass trimmer in the fourth embodiment and the fifth embodiment of the invention.

Referring to FIG. 26, and an operation process of the cord delivering mechanism in the fourth and fifth embodiments is described as follows. A main switch K1 is started to enable the spool 32 and the base 28 to synchronously rotate at a working rotary speed V0; the cord delivering electronic switch K2 is started up, a speed of the main motor M is increased to or reduced to V1, to cause the spool 32 to generate a speed difference relative to the base 28, the main motor M is kept in preset time period at an increased or reduced speed V1, and then the main motor M recovers to the working speed V0, and the spool finishes cord delivering. The preset time period of the fourth and fifth embodiments is 0.2-2 seconds.

Referring to FIG. 27-FIG. 30, in a sixth embodiment of the grass trimmer of the grass trimmer of the invention, the structure of the grass trimming head is same as the fourth embodiment, and is not repeated herein. The control device comprises a control circuit electrically connected with the main motor 26, and the control circuit is used for controlling a rotary speed change during operation of the main motor 26. In the embodiment, the cord delivering speed V1 is smaller than the working rotary speed V0. The control circuit preferably adopts a brake switch circuit E2.

Figure 27:
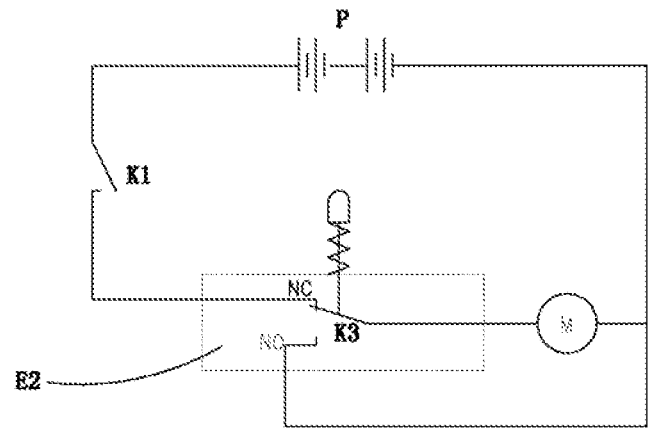
FIG. 27 to FIG. 29 are schematic diagrams of a control circuit of a grass trimmer in a sixth embodiment of the invention.

Referring to FIG. 27, the power source P powers the main switch K1, which is electrically connected with the main motor M. The brake switch circuit E2 comprises a cord delivering electronic switch k3, which is a single-pole double-throw switch, and the single-pole double-throw switch has a NC end and a NO end, which are optionally positioned in a switched on position.

Figure 28:
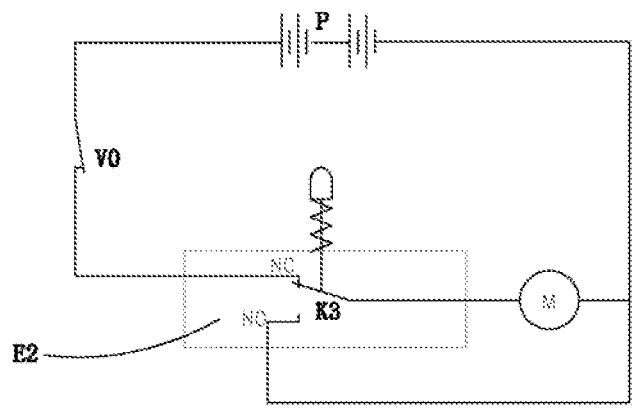

Referring to FIG. 28, in normal working of the grass trimmer, the NC end of the cord delivering electronic switch is positioned in the switched on position, and once the main switch K1 is switched on, the main motor M operates at full speed.

Figure 29:
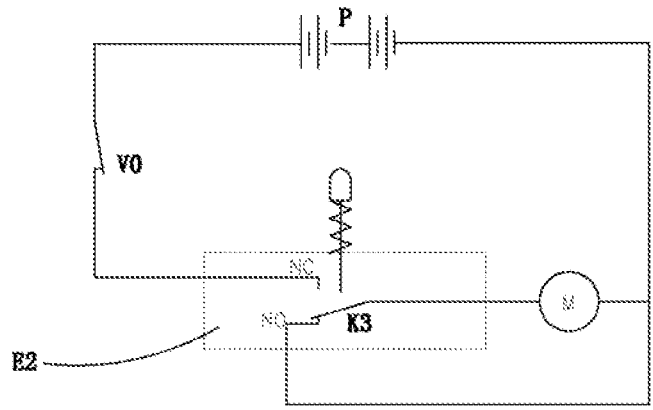

Referring to FIG. 29, during cord delivering, the NC end of the cord delivering electronic switch is switched off, the NO end is in the switched on position, the main motor is in short circuit and a rotary speed of the main motor M is reduced to 0.

Then referring to FIG. 28, the NO end of the cord delivering electronic switch is released, the NC end of the cord delivering electronic switch is positioned in the switched on position, and the main motor M recovers full speed operation.

Figure 30:
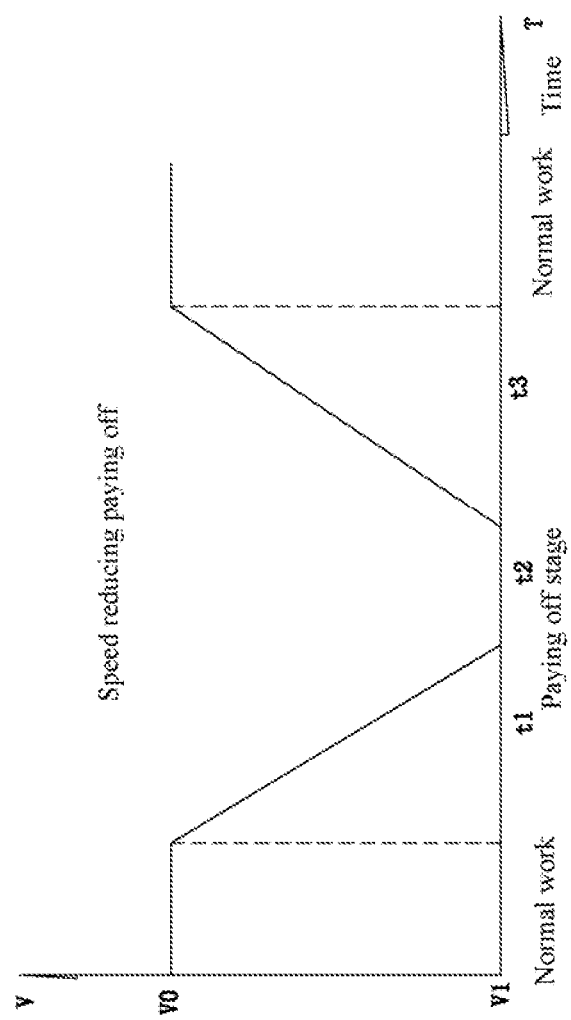
FIG. 30 is a schematic diagram of a rotary speed change of a main motor of a grass trimmer in the sixth embodiment of the invention.

FIG. 30 illustrates a change process of an operation speed V of the main motor M along with time T. In a normal working condition, the working rotary speed V0 of the main motor of the grass trimmer is between 5000-10000 revolutions per minute, and preferably adopts 8500 revolutions per minute, that is, the cord delivering speed V1 of the main motor M is reduced to 0. On a time axis T, in a t1 time period, the operation speed of the main motor M is reduced to 0 from the working rotary speed V0, and the t1 time period is smaller than 1 second; a 0 rotary speed is kept in a t2 time period, which is not fixed since an operator needs to switch on the NC end of the cord delivering electronic switch after releasing the NO end of the cord delivering electronic switch; and in a t3 time period, after the NC end of the cord delivering electronic switch is switched on, the operation speed of the main motor M recovers to the working rotary speed V0 from 0, and the t3 time period is also smaller than 1 second.

An operation process of a cord delivering mechanism of the sixth embodiment is described as follows. The main switch K1 is started to enable the spool 32 and the base 28 to synchronously rotate; the NO end of the cord delivering electronic switch is switched on, the main motor M is reduced to zero, and a speed difference is generated between the spool 32 and the base 28; and the NO end of the cord delivering electronic switch is released, the NC end of the cord delivering electronic switch is switched on, the rotary speed of the main motor recovers and the spool and the base recover synchronous rotating.

The cord delivering operation disclosed in the fourth to sixth embodiments of the grass trimmer in the invention are different from previous embodiments, and cord delivering is performed in normal working, that is, while the cutting working is not interrupted, the cord delivering electronic switch is selected to start to pay off, operation is convenient, and a structure is simple and reliable.

FIG. 31-FIG. 35 illustrate a grass trimmer 400 provided in a seventh embodiment of the invention.

The grass trimmer 400 has a structure similar with that of the grass trimmer 100 in the first embodiment, and a difference is specifically described as follows, and for the sake of description, same numbers denote same structures.

Figure 31:
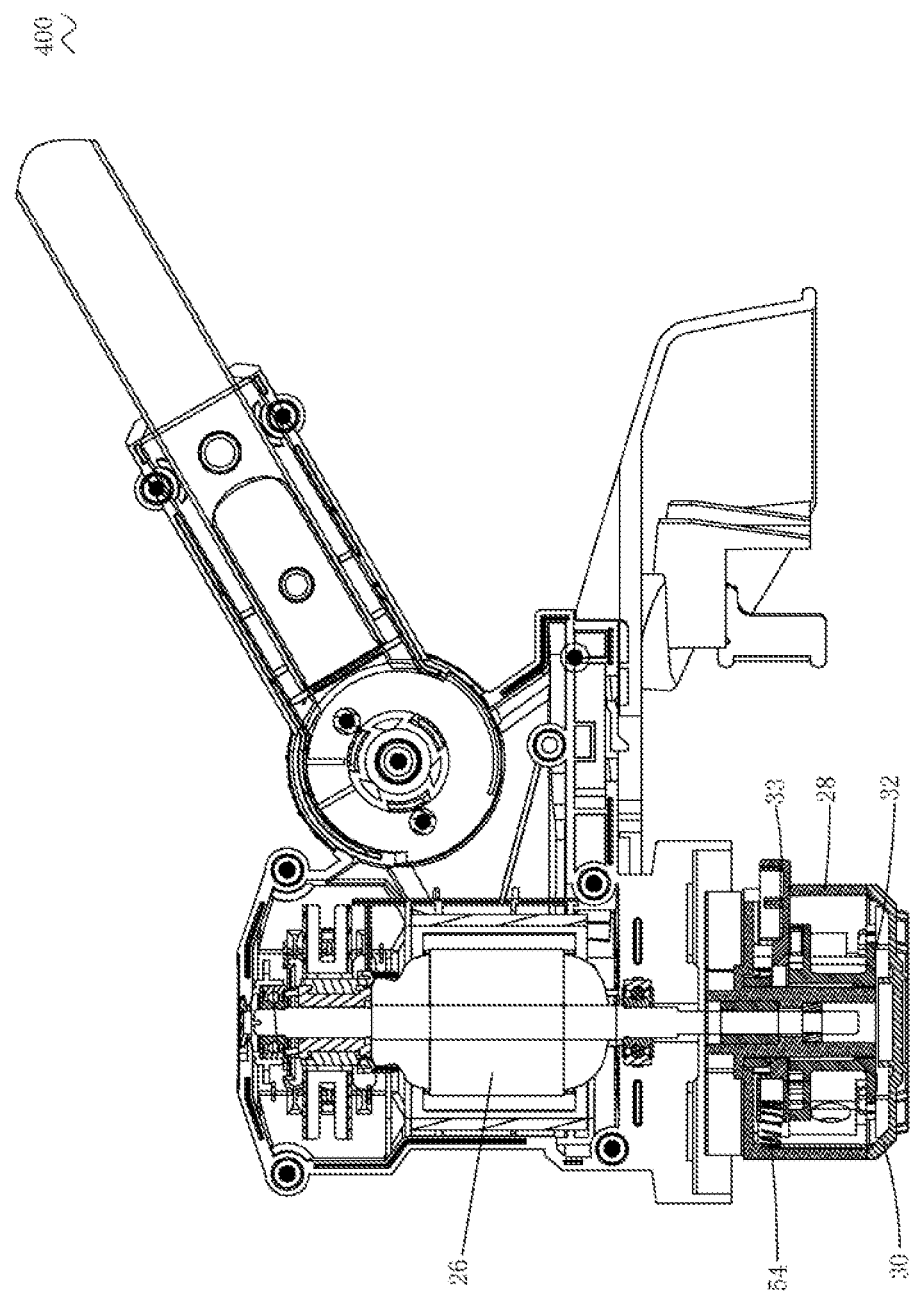
FIG. 31 is an amplified sectional schematic diagram of a head of a grass trimmer in a seventh embodiment of the invention.
Figure 32:
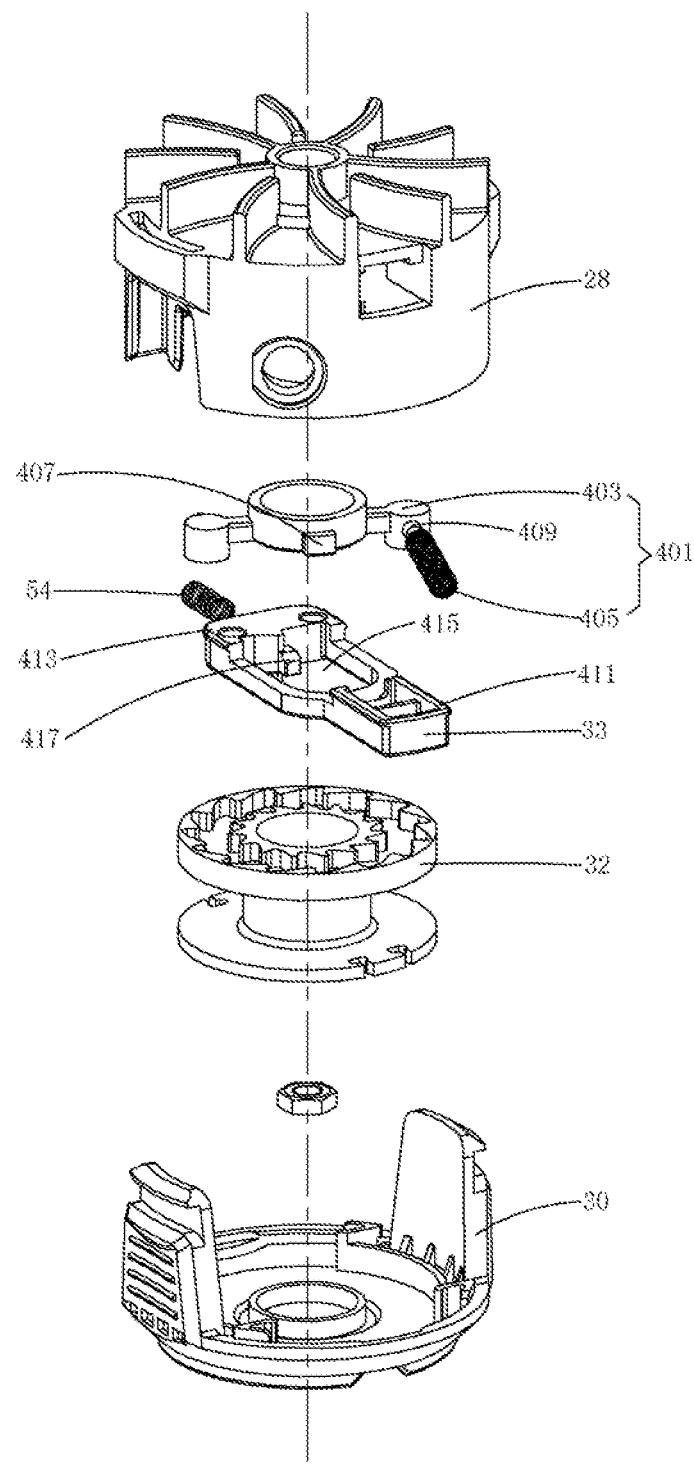
FIG. 32 is a stereoscopic disintegrated schematic diagram of a cord delivering mechanism in the head of the grass trimmer as shown in FIG. 31.

As shown in FIG. 31 and FIG. 32, same as the first embodiment, the base 28 is matched and connected with a cap 30, and a spool 32 is arranged in an inner cavity formed by the base 28 and the cap 30. A sliding block 33 is arranged between the base 28 and the spool 32, the sliding block 33 is circumferentially fixed with the base 28 to be radially movably matched and connected, in addition, a matching and connecting manner of the sliding block 33 and the spool 32 is same as the first embodiment and is not repeated in detail.

In the embodiment, when the main switch (not shown in the drawing) controls the main motor 26 to rotate, the spool 32 is positioned in a first state, at the moment, the spool 32 is static relative to the base 28, namely synchronously rotates with the base 28, at the moment the grass trimmer 400 cannot pay off. While when in a second state, the cord delivering electronic switch (not shown in the drawing) moves relative to the base 28 to generate a relative speed difference between the spool 32 and the base 28, thus realizing cord delivering. Therefore, the grass trimmer 400 controls the spool 32 to pay off by a cord delivering electronic switch independent of the main switch, cord delivering is not performed when the main switch is operated for startup and shutdown, so that the cord delivering can be realized by operating the cord delivering electronic switch according to actual needs, waste of cord delivering during startup and shutdown every time is avoided and loss of the grass trimming line is further reduced.

Specifically, the cord delivering mechanism further comprises a stopping device 401 movably arranged at the base 28, wherein the stopping device 401 comprises a first position and a second position, in a conversion process of the first process and the second process, the sliding block 33 radially moves relative to the base 28 to enable the spool 32 and the base 28 to oppositely move. A speed difference is generated between the spool 32 and the base 28, and cord delivering is realized.

Further, when the stopping device 401 is in the first position, the stopping device 401 limits the sliding block 3 from radially moving relative to the base 28, so that the spool 32 and the base 28 are kept relative rest, and cannot pay off. When the topping device 401 is in the second position, the sliding bock 33 can radially move relative to the base 28. Radial moving of the sliding block 33 relative to the base 28 can push the spool 32 to rotate for a certain angle relative to the base 28, and a speed difference is generated between the spool 32 and the base 28 to pay off.

The stopping device 401 comprises a stopping part 403 arranged at the base 28 in a pivoting manner, when the stopping part 403 is in the first position, the stopping part 403 stops the sliding block 33 to limit the radial moving of the sliding block 33 relative to the base 28, so that the spool 32 and the base 28 are kept relative rest, and cannot pay off. When the stopping part 403 is pivoted to the second position, the sliding block 33 radially moves relative to the base 28, so that the spool 32 is pushed to rotate by a certain angle relative to the base 28 and cord delivering is realized.

Preferably, a pivoting axis of the stopping part 403 and a rotary axis of the base 28 are overlapped. Therefore, a structure of the cord delivering mechanism is more compact and a size of the grass trimmer 400 is smaller. Of course, the pivoting axis of the stopping part 403 and the rotary axis of the base 28 can also be arranged in a non-overlapped manner, and preferably, can be arranged in parallel.

Same as the first embodiment, a bias press part 54 is arranged between the base 28 and the sliding block 33, and the bias press part 54 exerts a force to the sliding block 33 to enable a protruding tooth (not shown in the drawing) to keep abutting against a radial surface (not shown in the drawing).

The stopping device 401 further comprises a reset device 405 arranged between the stopping part 403 and the base 28, and the reset device 405 prompts the stopping part 403 to recover to the first position from the second position. In the embodiment, the reset device 405 is set to be a pressure spring 405. Of course, the reset device 405 can be set to be other elastic devices such as a tension spring and a torsional spring.

Figure 33:
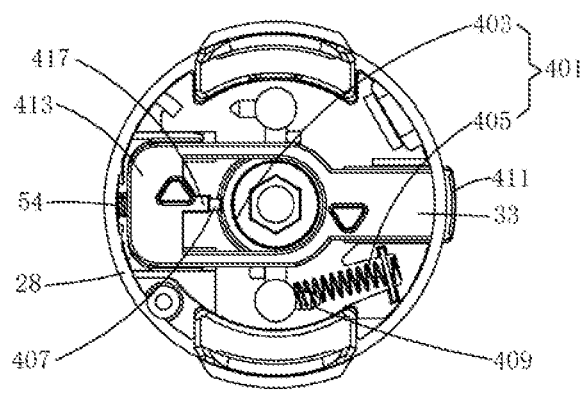
FIG. 33 to FIG. 35 are schematic diagrams of a state change process of a sliding block and a stopping device of a grass trimmer as shown in FIG. 31 in a cord delivering process controlled by the paying mechanism.

As shown in FIG. 32 and FIG. 33, particularly, the stopping part 403 has a stopping bulge 407 and a mounting part 409, the sliding block 33 has a first end part 411 capable of extending out of a peripheral part of the base 28 and a second end part 413 opposite to the first end part 411m and the second end part 413 is in the peripheral part of the base 28. The bias press part 54 is arranged between the base 28 and the second end part 413. The sliding block 33 also has a hollow part 415 and an abutting part 417, the hollow part 415 is positioned between the first end part 411 and the second end part 413, and the abutting part 417 extends to a rotary center of the base 28 from the second end part 413.

In addition, one end of the pressure spring 405 is arranged on the mounting part 409 in a penetrating manner, and the other end of the pressure spring 405 abuts against the containing set 28, and an action force direction of the pressure spring 405 to the stopping part 407 is opposite to a rotary direction of the base.

When the stopping part 403 is in the first position under an action force of the pressure spring 405, the stopping bulge 407 abuts against the abutting part 417 of the sliding block 33. When the stopping part 403 pivots to the second position from the first position, the stopping bulge 407 overcomes the action of the pressure spring 405 to be separated from the abutting part 417 of the sliding block 33, so that the sliding block 33 radially moves relative to the base 28 under the action of the bias press part 54, the sliding block 33 moves to a direction extending out of the base 28, the spool 32 is pushed (referring to FIG. 32) is rotate for a certain angle relative to the base 28, and realizes cord delivering.

As shown in FIG. 33, when the grass trimmer 400 is in a non-working state, the stopping part 403 is in a first position limiting the radially moving of the sliding block 33 relative to the base 28 under an action force of the pressure spring 405. At the moment, under the action of the action force of the bias press part 54, the abutting part 417 of the sliding block 33 keeps abutting against the stopping bulge 407 of the stopping part 403.

Figure 34:
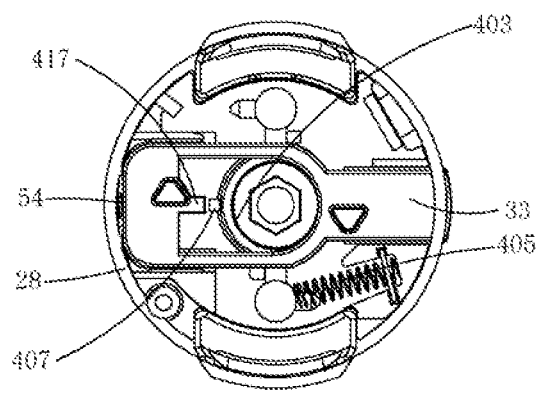

As shown in FIG. 34, the main switch is started up, at the moment, the stopping part 403 is stilled in the first position limiting the radially moving of the sliding block 33 relative to the base 28 under an action force of the pressure spring 405. When the sliding block 33 rotates along with the base 28, a centrifugal force is generated to the sliding block 33, and at the moment, the centrifugal force direction is opposite to a force exerting direction of the bias press part 54 to the sliding block. Therefore, the sliding block 33 overcomes the action of the bias press part 54 under the action of the centrifugal force, and gets away from the rotary axis of the base 28 and has a certain gap with the stopping part 403. But the stopping part 403 limits the radial moving of the sliding block to a direction extending out of the peripheral part of the base 28 relative to the base 28. The spool 32 (referring to FIG. 32) and the base keep relative rest, and the grass trimmer 400 cannot pay off. Therefore, loss of the grass trimming line is avoided.

Figure 35:
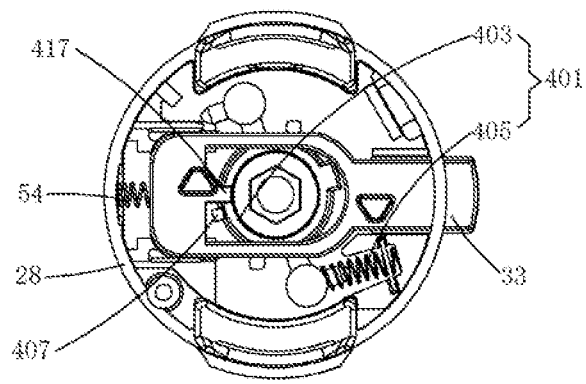

As shown in FIG. 35, when the cord delivering electronic switch is started up, since a rotary speed of the base 28 is reduced, but the base 28 has certain acceleration, and a direction of the acceleration is opposite to a rotary direction of the base 28, at the moment, the due to inertia of the stopping part 403, the stopping part 403 has a tendency of keeping an original moving state, that is, the stopping part 403 has certain inertia, and rotates to a direction opposite to the acceleration under the action of the inertia. Particularly, when the rotary speed of the base 28 is reduced, an inertia force of the stopping part 403 is larger than an action force of the pressure spring 405, thus the stopping part 403 overcomes the action force of the pressure spring 405 under the action of the inertia force, and pivots to the second position from the first position relative to the base 28. At the moment, At the moment, the stopping bulge 407 of the stopping part 403 and the abutting part 417 of the sliding block 33 are separated, since there is no stopping of the stopping part 403, and the rotary speed of the base 28 is greatly reduced, a centrifugal force of the sliding block 33 is smaller than the action force of the bias press part 54, therefore, the sliding block 33 overcomes the centrifugal force to radially move relative to the base 28 under the action force of the bias press part 54, the sliding block 33 moves to a direction extending out of the base 28, so that the spool 32 is pushed (referring to FIG. 32) to rotate for a certain angle relative to the base 28 and cord delivering is realized. Hence, the cord delivering electronic switch can be selected to pay off as required, and waste of the grass trimming line is avoided.

Referring to FIG. 34 again, when the cord delivering electronic switch is released, since the rotary speed of the base 28 is increased, a centrifugal force of the sliding block 33 is larger than the action force of the bias press part 54. At the moment, the sliding block 33 overcomes the action of the bias press part 54 under the action of the centrifugal force, and radially moves to a direction retracting to the peripheral part of the base 28 relative to the base 28, so that the spool 32 rotates for a certain angle relative to the base 28, a speed difference is generated between the spool 32 and the base 28 and cord delivering is realized. How the spool is pushed by the radial moving of the sliding block 33 to move relative to the base 28 is same as the first embodiment and is not repeated in detail.

In addition, when the cord delivering electronic switch is released, since the rotary speed of the base 28 is increased, the base 28 has certain acceleration, the direction of the acceleration is the rotary direction of the base 28, but the direction of an inertia force of the sliding block 33 is opposite to the direction of the acceleration. Thus the sliding block 33 is limited to radially move relative to the base 28, and at the moment, the grass trimmer 400 is in the normal working state.

In conclusion, the cord delivering electronic switch can be selected to pay off as required, and waste of the grass trimming line is avoided. In addition, cord delivering can be realized when the cord delivering electronic switch is released, thus improving the cord delivering efficiency.

Referring to FIG. 33 again, when the main switch is operated to shut down the grass trimmer 400, the centrifugal force of the sliding block 33 disappears, under the action of the action force of the bias press part 54, the sliding block 33 is stopped by the stopping part 403 after moving to the direction away from the bias press part 54 for a certain distance. Meanwhile, during shutdown, since an inertia force of the stopping part 403 is not enough to overcome an action force of the pressure spring 405, the stopping part 403 is kept in the first position under the action of the pressure spring 405, at the moment, the abutting part 417 of the sliding block 33 keeps abutting against the stopping bulge 407 of the stopping part 03. Therefore, the radial moving of the sliding block 33 relative to the base 28 is limited, and at the moment, the grass trimmer 400 cannot pay off. Therefore, when the main switch is operated to shut down the grass trimmer 400, cord delivering is not realized and the loss of the grass trimming line is avoided.

Figure 36:
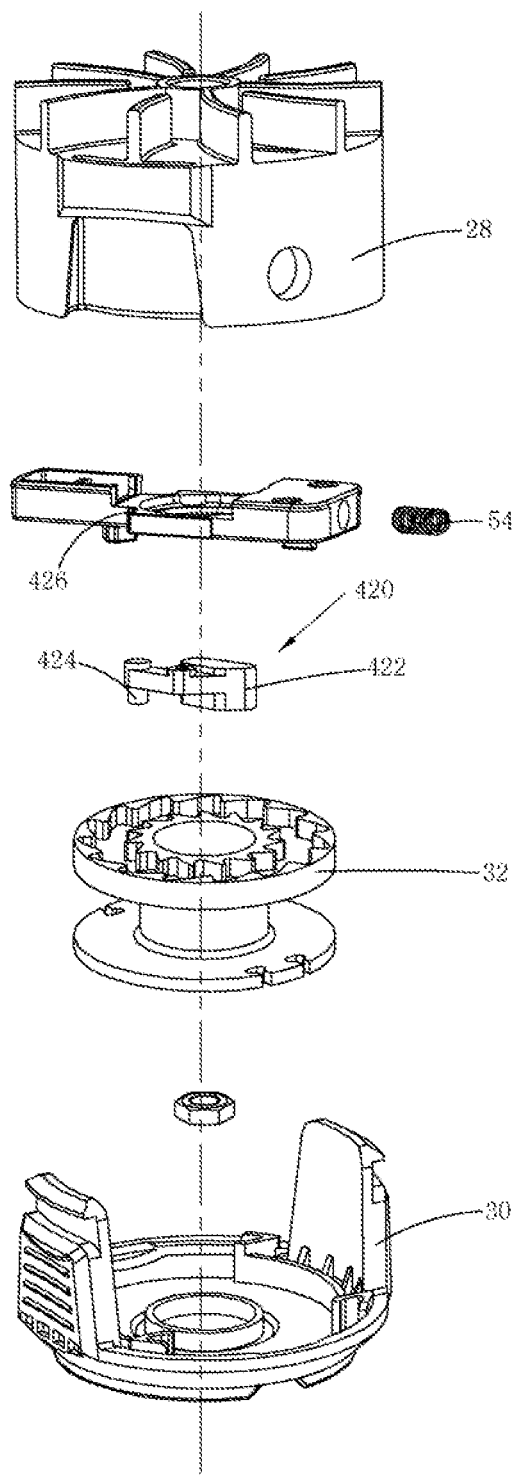
FIG. 36 is a stereoscopic disintegrated schematic diagram of a cord delivering mechanism in a head of a grass trimmer inn eighth embodiment of the invention.
Figure 37:
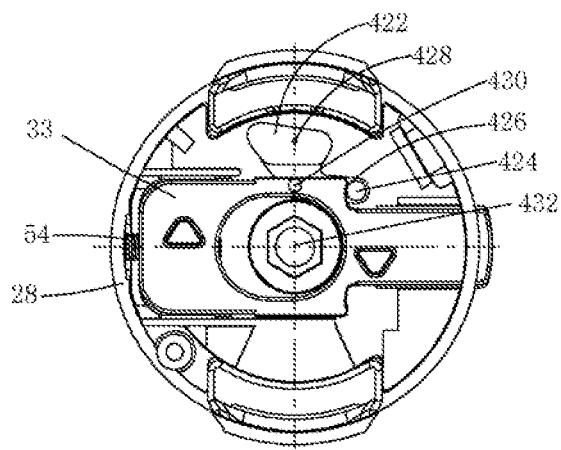
FIG. 37 to FIG. 39 are schematic diagrams of a state change process of a sliding block and a stopping device of a grass trimmer as shown in FIG. 36 in a cord delivering process controlled by the paying mechanism.
Figure 38:
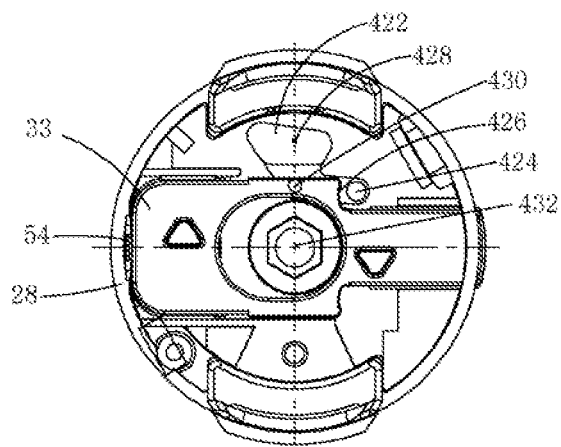

FIG. 36-FIG. 38 illustrate a grass trimmer provided by an eighth embodiment of the invention.

The grass trimmer has a structure similar to that of the grass trimmer 400 in the seventh embodiment, the difference is the stopping device in the cord delivering mechanism, and is specifically described as follows, and for the purpose of description, same numbers denote same structures.

As shown in FIG. 36, a cap 30 is matched and connected with the base 28, and a spool 32 is arranged in the inner cavity formed by the base 28 and the cap 30. A sliding block 33 is arranged between the base 28 and the ray 32, the sliding block 33 is circumferentially fixed with the base 28 to be radially movably matched and connected, and a bias press part 54 is arranged between the sliding block 33 and the base 28.

Same as the seventh embodiment, in the embodiment, when the main switch (not shown in the drawing) controls the main motor 26 to rotate, the spool 32 is in the first state, at the moment, the spool 32 is static relative to the base 28, and synchronously rotates with the base 28, and at the moment the grass trimmer 400 cannot pay off. While in the second state, the cord delivering electronic switch (not shown in the drawing) controls the spool 32 and the base 28 to relatively move so as to generate a speed difference between the spool 32 and the base 28, thus realizing cord delivering.

A stopping device 420 comprises a stopping part 422 arranged at the base 28 in a pivoting manner, when the stopping part 422 is in the first position, the stopping part 422 stops the sliding block 33 to limit the sliding block 33 from radially moving relative to the base 28, so that the spool 32 is static relative to the base 28 and cannot pay off. When the stopping part 422 pivots to the second position, the sliding block 33 radially moves relative to the base 28, thus the spool 32 is pushed to rotate for a certain angle relative to the base 28 and cord delivering is realized.

In the embodiment, a pivoting axis of the stopping part 422 is parallel with a rotary axis of the base 28.

As shown in FIG. 36-FIG. 38, particularly, the stopping part 422 has a stopping bulge 424, and the sliding block 33 has an abutting part 426. When the stopping part 422 is in the first position, the stopping bulge 424 of the stopping part 422 abuts against the abutting part 426 of the sliding block 33, the stopping part 422 stops the sliding block 33 to limit the radial moving of the sliding block relative to the base 28. When the stopping part 422 is in the second position, the stopping bulge 424 of the stopping part 422 is separated from the abutting part 426 of the sliding block 33, and the sliding block 33 can radially move relative to the base 28.

As shown in FIG. 37, when the grass trimmer is in the nonworking state, under the action of an action force of the bias press part 54, the abutting part 426 of the sliding block 33 keeps abutting against the stopping bulge 424 of the stopping part 422.

As shown in FIG. 38, the main switch is started, and the stopping part 403 and the base 28 keep synchronous rotating. In addition, when the sliding block 33 rotates along with the base 28, a centrifugal force is generated to the sliding block 33, and a direction of the centrifugal force is opposite to a force exerting direction of the bias press part 54 to the sliding block. Therefore, the sliding block 33 overcomes the action force of the bias press part 54 under the action of the centrifugal force, and gets away from a rotary axis of the base 28, and a certain gap exists between the abutting part 426 of the sliding block 33 and the stopping bulge 424 of the stopping part 422. At the moment, the spool 32 (referring to FIG. 32) and the base 28 keep relative rest, and the grass trimmer 400 cannot pay off, thus avoiding a loss of the grass trimmer.

When the stopping part 422 is in the first position, a gravity center 428 and a rotary center 428 of the stopping part 422 and a rotary center 432 of the base are approximately in the same straight line.

Figure 39:
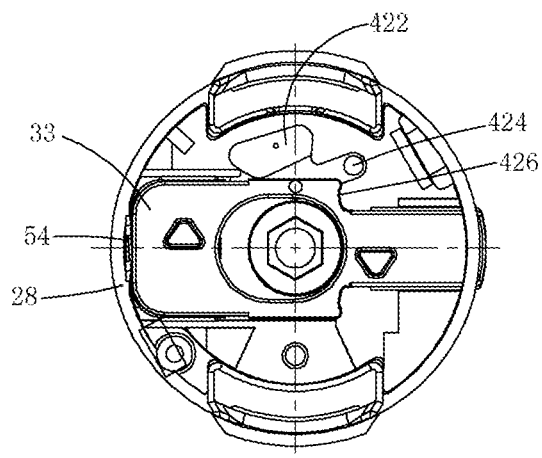

As shown in FIG. 39, when the cord delivering electronic switch is started up (not shown in the drawing), since the rotary speed of the base 28 is fast reduced, an acceleration of the base 28 reaches to a certain value, the direction of the acceleration is opposite to the rotary direction of the base 28, at the moment, inertia of the stopping part 422 enables the stopping part 422 to have a tendency of keeping an original moving state, that is, the stopping part 422 has certain inertia force and rotates to a direction opposite to the acceleration under the action of the inertia force, and the rotary angle of the stopping part 422 relative to the base 28 is enough to enable the stopping bulge 424 and an abutting part 426 of the sliding block 33, so that the stopping part 422 pivots to the second position from the first position. Specifically speaking, when the rotary speed of the base 28 is fast reduced, the stopping part 422 pivots to the second position from the first position relative to the base 28. At the moment, the stopping bulge 422 of the stopping part 403 is separated from the abutting part 426 of the sliding block 33, since there is no stopping of the stopping part 403, and the rotary speed of the base 28 is greatly reduced, a centrifugal force of the sliding block 33 is smaller than an action force of the bias press part 54. Therefore, the sliding block 33 overcomes the centrifugal force to radially move relative to the base 28 under the action of the bias press part 54, and the sliding block 33 moves to a direction extending out of the base 28, thus pushing the spool 32 (referring to FIG. 32) to rotate for a certain angle relative to the base 28 and realizing cord delivering. Thus, the cord delivering electronic switch can be selected to pay off as required and waste of the grass trimming line is avoided.

Referring to FIG. 38 again, when the cord delivering electronic switch is released, since the rotary speed of the base 28 is fast increased, the centrifugal force of the sliding block is larger than an action force of the bias press part 54. At the moment, the sliding block 33 overcomes the action force of the bias press part 54 under the action of the centrifugal force and radially moves to a direction retracting to the peripheral part of the base 28 relative to the base 28, thus pushing the spool 32 to rotate for a certain angle relative to the base 32, generating a speed difference between the spool 32 and the base 28 and realizing cord delivering. How the spool is pushed by the radial moving of the sliding block 33 to move relative to the base 28 is same as the first embodiment and is not repeated in detail.

In addition, when the cord delivering electronic switch is released, due to the action of the centrifugal force, the stopping part 422 rotates relative to the base 28, finally, the gravity center 428 of the stopping part 422 keeps the furthest distance from the rotary center 432 of the base 28, at the moment, the gravity center and the rotary center of the stopping part 422, and the rotary center 432 of the base 28 are in the same straight line, so that the stopping part 422 pivots to the first position from the second position, and at the moment, the abutting part 426 of the sliding block 33 keeps abutting against the stopping bulge 424 of the stopping part 422. Thus, the sliding block 33 is limited from radially moving relative to the base 28 and the grass trimmer 400 is in a normal working state.

In conclusion, in the embodiment, the cord delivering electronic switch can be selected to pay off as required, and waste of the grass trimming line is avoided. In addition, cord delivering can be realized when the cord delivering electronic switch is released, thus improving the cord delivering efficiency.

Referring to FIG. 37 again, when the main switch is operated to shut down the grass trimmer 400, a centrifugal force of the sliding block 33 disappears, under the action of an action force of the bias press part 54, the sliding block 33 is stopped by the stopping part 422 after radially moving for a certain distance to a direction away from the bias press part 54. Meanwhile, during shutdown, due to its inertia force, the stopping part 422 has very small rotary angle, which is not enough to enable the stopping bulge 424 to be separated from the abutting part 426, therefore, the abutting part 426 of the sliding block 33 still abuts against the stopping bulge 424 of the stopping part 422. Thus, the radial moving of the sliding block 33 relative to the base 28 is limited, and at the moment the grass trimmer 400 cannot pay off. Hence, when the main switch is operated to shut down the grass trimmer 400, cord delivering is not realized and loss of the grass trimmer is avoided.

Figure 40:
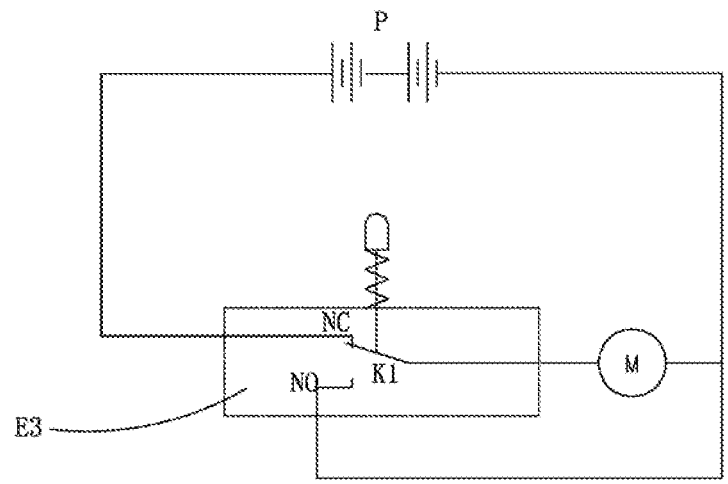
FIG. 40 to FIG. 41 are working schematic diagrams of a control circuit of a grass trimmer in a ninth embodiment of the invention.
Figure 41:
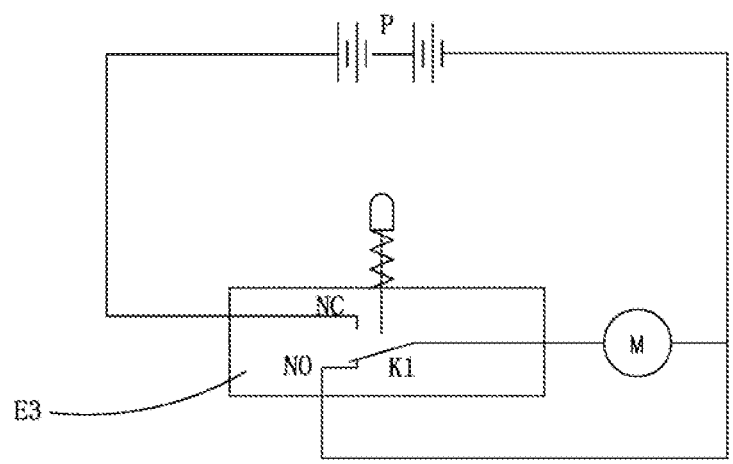
Figure 42:
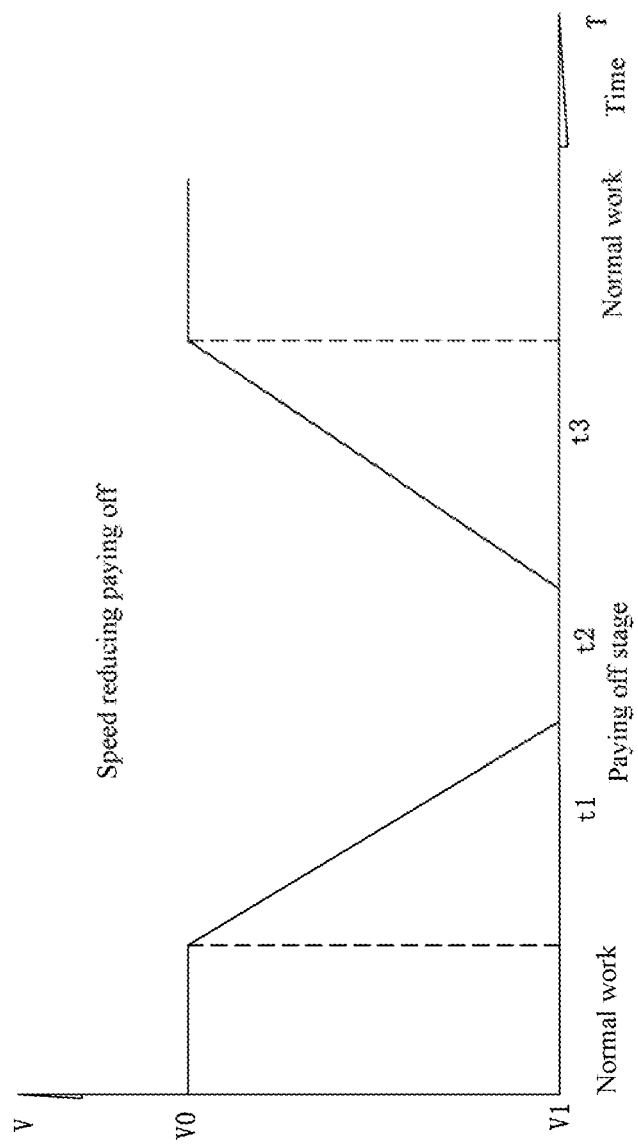
FIG. 42 is a rotary speed change of a main motor of the grass trimmer in the ninth embodiment of the invention.

Referring to FIG. 40 to FIG. 42, in a ninth embodiment of the grass trimmer in the invention, the structure of a grass trimming head is same as the fourth embodiment and is not repeated herein. The difference lies in that the control switch is a main switch, a control device comprises a control circuit electrically connected with the main motor 26, the main switch controls the control circuit, to cause the operation speed of the main motor 26 to change. In the embodiment, a cord delivering speed V1 is smaller than a working rotary speed V0. The control circuit preferably adopts a brake switch circuit E3.

Referring to FIG. 40, the power source P powers a main switch K1, which is electrically connected with the main motor M. The main switch is a single-pole double-throw switch, and the single-pole double-throw switch has a NC end and a NO end, which are optionally positioned in a switched on position.

Referring to FIG. 40, in normal working of the grass trimmer, the NC end of the main switch is positioned in the switched on position, and the main motor M operates at full speed.

Referring to FIG. 41, during cord delivering, the NC end of the cord delivering electronic switch is switched off, the NO end is in the switched on position, the main motor is in short circuit and a rotary speed of the main motor M is reduced to 0.

Referring to FIG. 40 again, the NO end of the cord delivering electronic switch is released, the NC end of the cord delivering electronic switch is positioned in the switched on position, and the main motor M recovers full speed operation.

FIG. 42 illustrates a change process of an operation speed V of the main motor M along with time T. In a normal working condition, the working rotary speed V0 of the main motor of the grass trimmer is between 5000-10000 revolutions per minute, and preferably adopts 8500 revolutions per minute. The cord delivering speed V1 is 0 revolution per minute, that is the cord delivering speed V1 of the main motor M is reduced to zero. On a time axis T, in a t1 time period, the operation speed of the main motor M is reduced to 0 from the working rotary speed V0, and the t1 time period is smaller than 1 second; a 0 rotary speed is kept in a t2 time period, which is not fixed since an operator needs to switch on the NC end of the main switch after releasing the NO end of the main switch; and in a t3 time period, after the NC end of the main switch is switched on, the operation speed of the main motor M recovers to the working rotary speed V0 from 0, and the t3 time period is also smaller than 1 second.

An operation process of a cord delivering mechanism of the ninth embodiment is described as follows. The NC end of the main switch K1 is switched on to enable the spool 32 and the base 28 to synchronously rotate; the NO end of the main switch is switched on, the main motor M is reduced to zero, and a speed difference is generated between the spool 32 and the base 28; and the NO end of the main switch is released, the NC end of the main switch is switched on, the rotary speed of the main motor recovers and the spool and the base recover synchronous rotating.

The cord delivering operation disclosed in the ninth embodiment is similar to those in the fourth to sixth embodiments, and cord delivering is performed in normal working, that is, while the cutting working is not interrupted, the cord delivering electronic switch is selected to start to pay off, operation is convenient, and a structure is simple and reliable.

Figure 43:
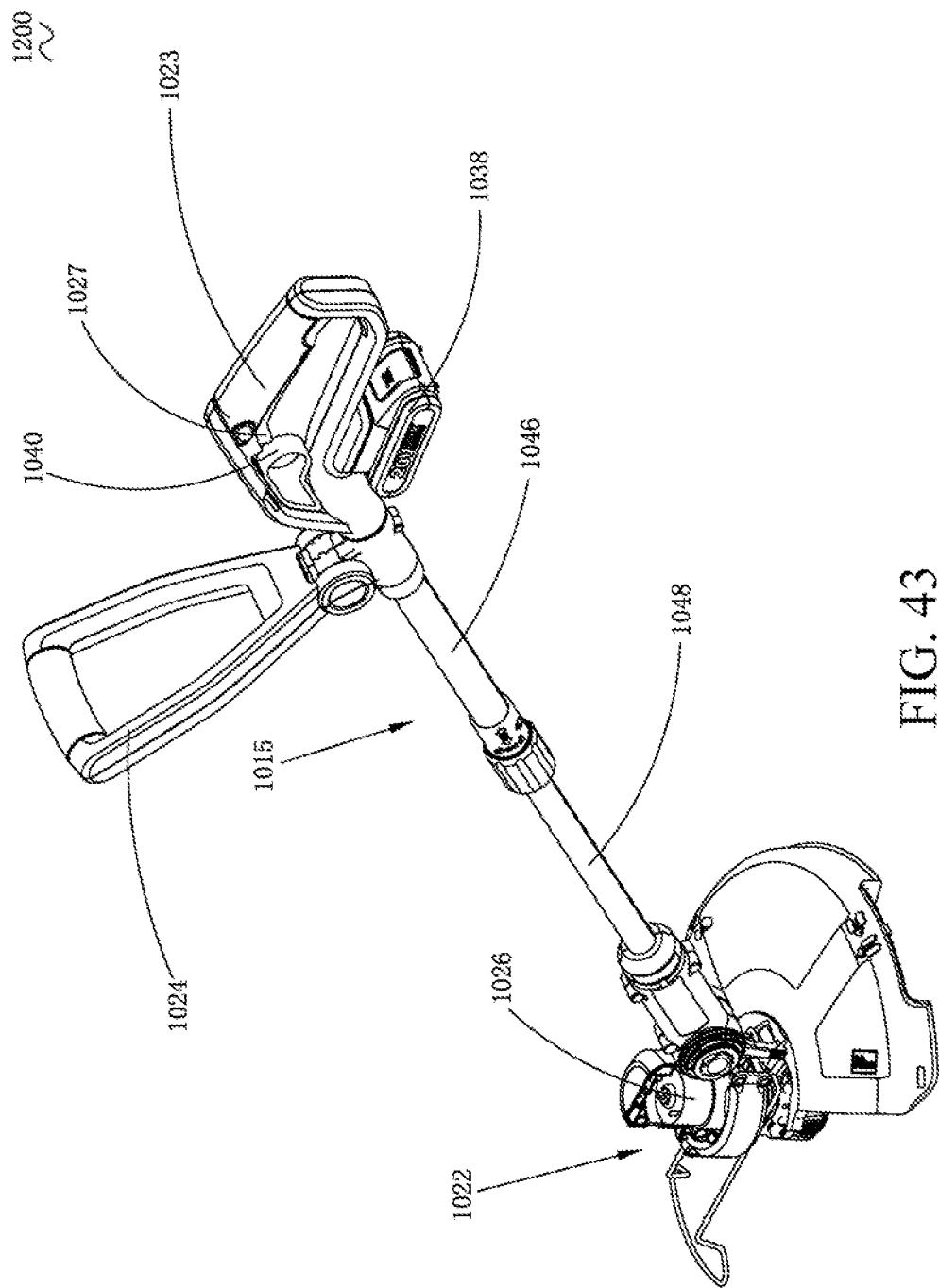
FIG. 43 is a space diagram of a grass trimmer without an housing at one side of a grass trimming head according to a tenth embodiment of the invention.
Figure 44:
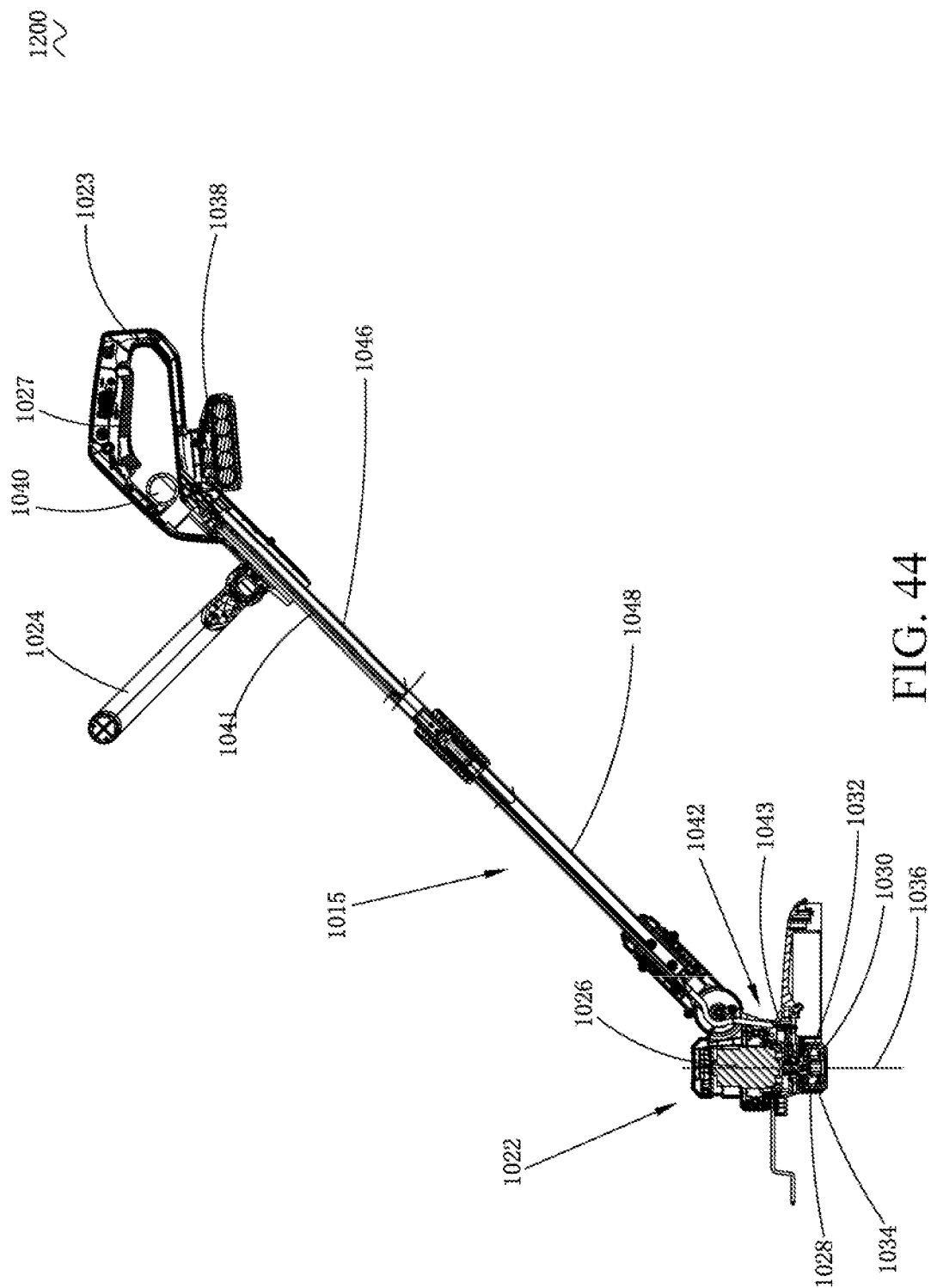
FIG. 44 is a sectional schematic diagram of a whole grass trimmer according to the tenth embodiment of the invention.
Figure 45:
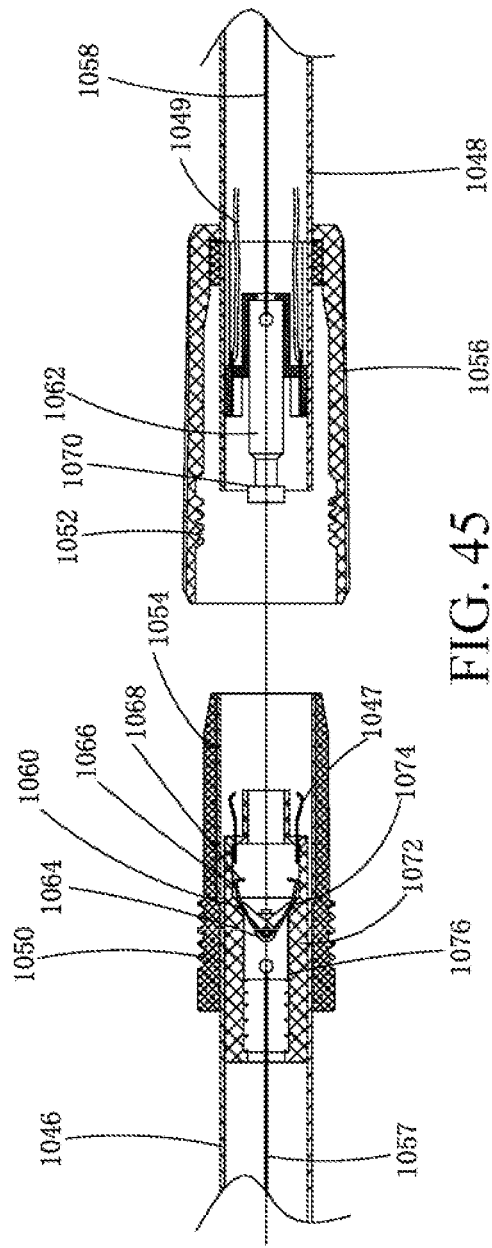
FIG. 45 is an amplified schematic diagram of a connecting position between a first extending rod and a second extending rod of the grass trimmer as shown in FIG. 44, at the moment, the first extending rod and the second are separated, and a first transmission portion and second transmission portion are separated.

As shown in FIG. 43-FIG. 44, a grass trimmer 1200 of a tenth embodiment comprise an extending rod assembly 1015, a grass trimming head 1022 arranged at one end of the extending rod assembly 1015, a handle arranged on the extending rod assembly 1015 and spaced from the grass trimming head 1022 by a certain distance, a motor 1026 driving the grass trimming head 1022 to rotate around an axis and a switch 1027 controlling the motor 1026. The grass trimming head 1022 comprises a spool 1032 for setting a grass trimming line 1034, and further, in the embodiment, comprises a base 1028 and a cap 1030 matched and connected with the base 1028, the spool 1032 is arranged between the base 1028 and the cap 1030, and the grass trimming line 1034 is wound on the spool 1032 and extends out from the base 1028.

When the grass trimmer 1200 works, the grass trimming head 1022 is driven by the motor 1026 to rotate, and drive the grass trimming line 1034 to rotate to form a cutting surface. A user lifts the grass trimmer 1a00 by the handle to enable the grass trimming line 1034 to trim grass along the cutting surface formed by rotating.

For the sake of description, the axial direction and circumferential direction and other direction-related descriptions in the specification refer to a rotary axis of the grass trimming head 1022. For example, the axial direction is an extending direction along the rotary axis of the grass trimming head 1022; and the circumferential direction is a direction around the rotary axis of the grass trimming head 1022.

In the embodiment, the motor 1026 driving the grass trimming head 1022 and the grass trimming head 1022 are coaxially arranged, preferably, an output shaft of the main motor 1026 directly drives the grass trimming head 102, that is, a rotary shaft 1036 of the grass trimming head 1022 is an output shaft of the main motor 1026, and the structure is simple and compact. The skilled in the art can conceive that the motor 1026 can also be arranged in any other place of the extending rod assembly 1015 and drives the grass trimming head 1022 to rotate by a specific transmission mechanism.

In the embodiment, a power source, specifically a pattern pack 1038, and preferably a lithium battery pack is arranged at one end of the extending rod assembly 1015 away from the grass trimming head 1022. Thereby, the DC power source and the grass trimming head 1022 are respectively arranged at two ends of the extending rod assembly 1015, and the handle is arranged in the position relative closer to the power source in the middle section of the extending rod assembly 1015, therefore the whole grass trimmer 1200 is reasonable in gravity center configuration, and an operator can save more labor when lifting the grass trimmer 1200 to work by the handle.

As shown in FIG. 43 and FIG. 44, the grass trimmer 1200 further comprises a manual cord delivering mechanism, the manual cord delivering mechanism comprises an operation part 1040 independent of the switch 1027, a transmission part 1041 controlled by the operation part 1040, and a drive device 1042 driven by the transmission part 1041 to drive the spool 1032 to release the grass trimming line 1034.

In the embodiment, the operation part 1040 is in the vicinity of a holding part of the handle. The holding part of the handle is a part held by hand of an operation on the handle. The operation part is arranged in the vicinity of the holding part of the handle, the operator can control the operation part 1040 to pay off while holding the handle without interrupting the work of the grass trimmer 1200, and operation is convenient. Of course, the operation part may also be arranged at other positions of the grass trimmer 1200.

Since the manual cord delivering mechanism is controlled by the operation part 1040 independent of the switch 1027, waste in startup and shutdown every time is avoided and loss of the grass trimming line is reduced.

Preferably, the transmission part 1041 is a flexible transmission shaft 1041, and particularly is a steel wire. Preferably, the flexible transmission shaft 1041 is basically contained in the extending rod assembly 1015, and can protect the flexible transmission shaft 1041, thus prolonging a service life of the flexible transmission shaft 1041. The expression that the flexible transmission shaft 1041 is basically contained in the extending rod assembly 1015 means that most part of the flexible transmission shaft 1041 is contained in the extending rod assembly 1015. In addition, part of the flexible transmission shaft connected with the operation part may be exposed out of the extending rod assembly, of course, such part of flexible transmission shaft can be contained in an auxiliary handle and the extending rod assembly. Those skilled in the art can conceive that other transmission parts such as other metal wires, plastic belts or braided wires can also be adopted. All technical solutions adopting similar embodiments should fall within a protective scope of the invention.

In the embodiment, the handle comprises a main handle 1023 and an auxiliary handle 1024 which are spaced for a certain distance, a switch 1027 is arranged on the main handle 1023 and the operation part 1040 is arranged on the main handle 1023. Due to such arrangement, the operator can control the grass trimmer to trim grass and pay off by operating the switch 1027 on the main handle 1023 and the operation part 1040. Of course, the main switch 1027 and the operation part 1040 can be arranged on the main handle 1023 and the auxiliary handle 1024 respectively, and operations of the switch 1027 and the operation part 40 do not interfere each other. When the operator controls the grass trimmer 1200 to work by the auxiliary handle 1024 and wants to perform cord delivering on the spool 1032, the operator only needs to controls the operation part 1040 on the auxiliary handle 1024 along with a trend without changing a working state of the grass trimmer 1200 and interrupting a grass trimming work of the grass trimmer 1200, operation is convenient, and such advantage is more obvious when the grass trimmer 1200 is in an edge trimming state. Of course the operation part 1040 can be arranged in other positions of the grass trimmer 1200, for example, arranged in a position on the extending rod assembly 1015 close to the main handle or the auxiliary handle, or arranged on the main handle and spaced from the switch by a certain distance as long as the operator can control the cord delivering electronic switch while lifting the grass trimmer 1200 to trim grass by the handle. All technical solutions similar to the embodiment should fall within a protective scope of the invention.

The drive device 1042 comprises a lever 1043 connected with the transmission part 1041 and controlled by the operation part 1040. The lever 1043 drives the spool 1032 to axially move along a rotary axis of the grass trimming head 1022 between a first state and a second state. In the first state, the spool 1032 and the base 1028 synchronously rotate; and in the second state, a rotary speed difference is generated between the spool 1032 and the base 1028.

In the first state, the coil 1032 and the base 1028 synchronously rotate, the grass trimming line 1034 wound on the spool 1032 and the base 1028 synchronously rotate, the part of the grass trimming line 34 extending out of the base 28 can trim grass, that is, trim a lawn.

In the second state, the spool 1032 and the base 1028 are separated, a rotary centrifugal force of the grass trimming line 1034 drives the spool 1032 to generate relative movement with the base 1028, thereby generating a speed difference, further the centrifugal force of the grass trimming line 1034 pulls itself to throw a part outwards to realize pay off, that is, the longer the free tail end of the grass trimming line 1034 extends out of the base 1028, the larger a grass trimming radius of the grass trimmer 1200 is.

The extending rod assembly 1015 comprises a first extending rod 1046 extending longitudinally and a second extending rod 1048 movably connected with the first extending rod 1046, the handle is arranged at the first extending rod 1046, the grass trimming head 1022 is arranged at the second extending rod 1048, both the first extending rod 1046 and the second extending rod 1048 are provided with an inner cavity, and the transmission part 1041 is basically arranged in the inner cavities of the first extending rod 1046 and the second extending rod 1048. Thus, the first extending rod 1046 and the second extending rod 1048 adopt movable connecting, when the grass trimmer 1200 is transported and stored, the second extending rod 1048 moves relative to the first extending rod 1046 to reduce the size of the grass trimmer, thus greatly reducing a packaging and storing size of the grass trimmer 1200, and reducing a packaging and transportation cost and saving a storing space.

Further referring to FIG. 45-FIG. 48, preferably, the first extending rod 1046 and the second extending rod 1048 have a first position and a second position matched and connected with each other. Thus, when the grass trimmer is used, the first extending rod 1046 and the second extending rod 1048 are matched and connected, at the moment, the operation part 1040 is operated and the transmission part 1040 drives the drive device 1042 to drive the spool to release the grass trimming line. Thus, an operation height is improved for the operator, and operation man-machine is greatly improved. When the grass trimmers requires transportation and storage, the first extending rod 1046 and the second extending rod 1048 are separated, thus, the first extending rod 1046 and the second extending rod 1048 are overlapped, thus greatly reducing a packaging and storing size of the grass trimmer 1200, and reducing a packaging and transportation cost and saving a storing space.

Further the first extending rod 1046 and the second extending rod 1048 are connected by threads, and due to such arrangement, structure is simple and cost is lower. External threads 1050 are arranged on the first extending rod 1046, and internal threads 1052 matched with the external threads 1050 are arranged on the second extending rod 1048. The internal threads 1052 are matched with the external threads 1050 to connect the first extending rod 1046 and the second extending rod 1048 together, and the internal threads 1052 are matched with the external threads 1050 are separated to separate the first extending rod 1046 and the second extending rod 1048. Correspondingly, the internal threads 1052 can be arranged on the first extending rod 1046 and the external threads 1050 capable of matching with the internal threads 1052 are arranged on the second extending rod 1048.

The first extending rod 1046 is provided with an electrode slice 1047, the second extending rod 1048 is provided with a wire 1049, and when the first extending rod 1046 and the second extending rod 1048 are matched and connected, the electrode slice 1047 and the wire 1049 are electrically connected, thus realizing electric connection between the battery pack 1038 and the moor 1026 and performing grass trimming work.

For facilitating manufacturing and mounting, a first sleeve 1054 is fixedly arranged on the first extending rod 1046, and the external threads 1050 are arranged on the first sleeve 1054. The second extending rod 1048 is rotatably provided with a second sleeve 1056, and the internal threads 1052 are arranged inside the second sleeve 1056. Thus, only the second sleeve is required to rotate relative to the second extending rod 1048, then the internal threads 1052 and the external threads 1050 can be matched to realize the connection between the first extending rod 1046 and the second extending rod 1048. The second extending rod 1048 does not rotate relative to the first extending rod, and mounting is convenient and laborsaving.

The transmission part 1041 comprises a first transmission portion 1057 and a second transmission portion 1058 movably arranged relative to the first transmission portion 1057, when the first extending rod 1046 and the second extending rod 1048 are matched and connected with each other, the first transmission portion 1057 and the second transmission portion 1058 are matched and connected with each other, and when the first extending rod 1046 and the second extending rod 1048 are separated from each other, the first transmission portion 1057 and the second transmission portion 1058 are separated from each other. Thus, when the first extending rod 1046 and the second extending rod 1048 are matched and connected with each other, the first transmission portion 1057 and the second transmission portion 1058 are matched and connected with each other, the grass trimmer trims grass, and the operation part 1040 can be operated to drive the drive device 1042 by the transmission part to drive the spool 1032 to release the grass trimming line (referring to FIG. 44). When the first extending rod 1046 and the second extending rod 1048 are separated from each other, and the first transmission portion 1057 and the second transmission portion 1058 are separated from each other, the grass trimmer is convenient to store and transport.

The manual cord delivering mechanism further comprises an adaptive device arranged between the first transmission portion 1057 and the second transmission portion 1058, the adaptive device comprises a first adapter 1060 arranged in the first extending rod 1046 and connected with the first transmission portion 1057, and a first sliding part arranged in the second extending rod 1048 and connected with the second transmission portion 1058, and the first sliding part 1062 can be matched with or separated from the first adapter 1060.

One end of the first transmission portion 1057 is matched and connected with the operation part 1040 (referring to FIG. 44) and the other end of the other end is matched and connected with the first adapter 1060. One end of the second transmission part 1058 is matched and connected with the drive device 1042 (referring to FIG. 44) and the other end is matched and connected with the first sliding part 1062.

In the embodiment, the first adapter 1060 can pivot relative to the first extending rod 1046, so as to pivot in a position matched and connected or separated from the first sliding part 1062. Of course, the first adapter 1060 can be set to move relative to the first extending rod 1046 as long as the matching and connecting or separating with the first sliding part 1062 is realized.

The first sliding part 1062 is movably arranged in the second extending rod 1048, one end of the second transmission portion 1058 is fixedly connected with the first sliding part 1062 and the other end of the second transmission portion 1058 is connected and matched with the drive device 1042.

The first adapter 1060 comprises a first end 1064 matched and connected with the first transmission portion 1057 of the transmission part and a second end 1066 opposite to the first end 1064, the second end 1066 has first bulged part 1068, the first sliding part 1062 has a first stopping part 1070, and the first bulged part 1068 is operably stopped or separated by the first stopping part 1070, thus enabling the first transmission portion 1057 and the second transmission portion 1058 to be matched and connected or separated.

The adaptive device further comprises a first actuating device arranged in the first extending rod 1046 and used for promoting the first adapter 1060 to be matched with the first sliding part 1062. The first actuating device comprises a first annular seat body 1072 fixedly arranged in the first extending rod 1046, the first annular seat body 1072 comprises a first portion 1074 and a second portion 1076 smaller than the first portion 1074 in inner diameter, when the first adapter 1060 moves to the second portion 1076 from the first portion 1074, the second portion 1076 promotes the first adapter 1060 to be matched and connected with the first sliding part 1062, thus connecting the first transmission portion 1057 and the second transmission portion 1058 together.

Figure 46:
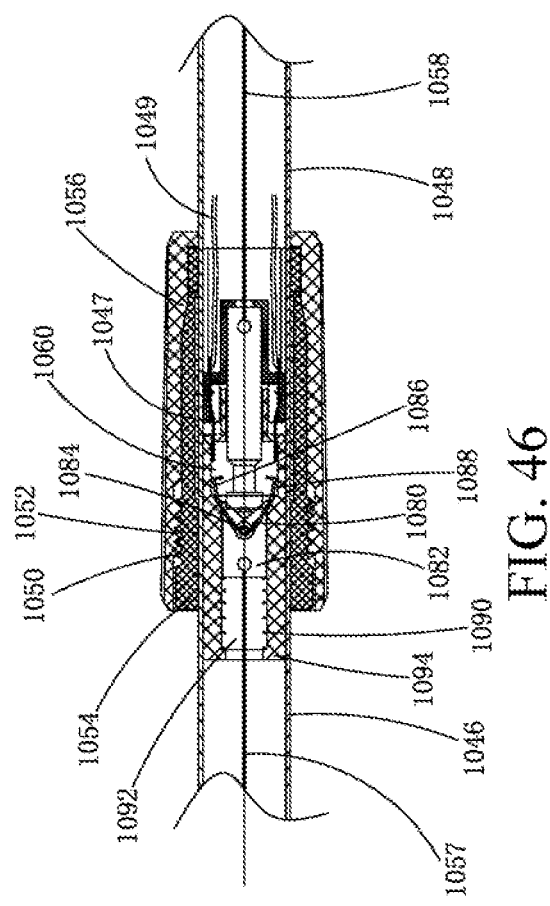
FIG. 46 is an amplified schematic diagram of a connecting position between a first extending rod and a second extending rod of the grass trimmer as shown in FIG. 44, at the moment, the first extending rod and the second are matched, a first transmission portion is in a non-pulling free state and the first transmission portion and the second transmission portion are separated.
Figure 47:
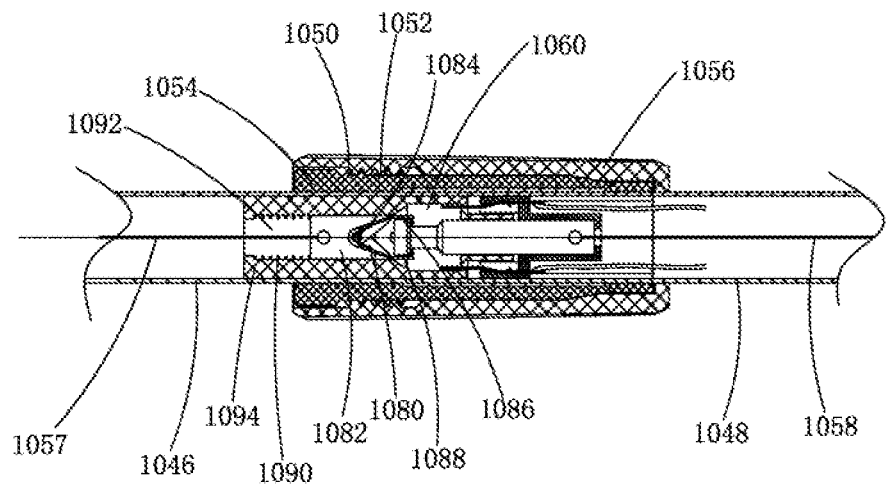
FIG. 47 is an amplified schematic diagram of a connecting position between a first extending rod and a second extending rod of the grass trimmer as shown in FIG. 44, at the moment, the first extending rod and the second are matched, a first transmission portion is in a pulled state, a second transmission portion does not move and the first transmission portion and the second transmission portion are matched and connected.
Figure 48:
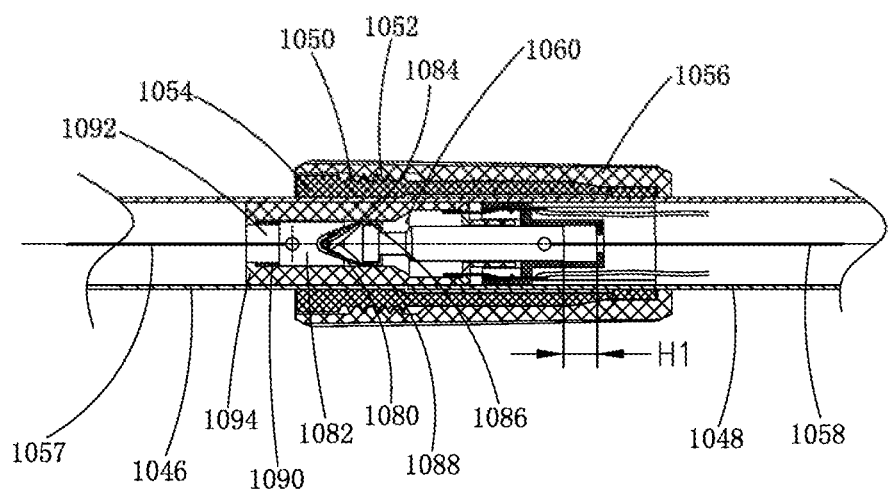
FIG. 48 is an amplified schematic diagram of a connecting position between a first extending rod and a second extending rod of the grass trimmer as shown in FIG. 44, at the moment, the first extending rod and the second are matched, a first transmission portion and a second transmission portion are matched and connected, the first transmission portion is in a pulled state and enables the second transmission portion to move a certain distance relative to the second extending rod to pay off.

In the embodiment, after the first extending rod 1046 and the second extending rod 1048 are matched and connected, the operation part 1040 is required to be operated to pull the first transmission portion 1057 to connect the first transmission portion 1057 and the second transmission portion 1058 together. As shown in FIG. 46 and FIG. 47, particularly, in a process that the operation part 1040 (referring to FIG. 44) is pulled to enable the first transmission portion 1057 to drive the first adapter 1060 to move from the first portion 1074 to the second portion 1076, since the inner diameter of the second portion 1076 is smaller than that of the first portion 1074, the first adapter 1060 is promoted to pivot to an extending axis close to the first extending rod 1046, finally, the first bulged part 1068 of the first adapter 1060 is matched and connected with the first stopping part 1070 of the first sliding part 1062, thus connecting the first transmission portion 1057 and the second transmission portion 1058 together. As shown in FIG. 48, at the moment, the first transmission portion 1057 is continuously pulled to enable the second transmission portion 1058 to move by a certain distance H1 relative to the second extending rod 1048, so that the second transmission portion 1058 drives the drive device 1042 to drive the spool 32 to release the grass trimming line (referring to FIG. 44).

Further, the electrode slice 1047 is arranged on the first annular seat body 1072, thus the structure of the grass trimmer is compact.

The adaptive device further comprises a first keeping device arranged between the first adapter 1060 and the first extending rod 1046, and the first keeping device is used for promoting the first adapter 1060 to be separated from the first sliding part 1062. Thus, repeated matching and connecting or separating can be realized between the first transmission portion 1057 and the second transmission portion 1058, and a user can further conveniently use the grass trimmer.

The first keeping unit comprises an elastic unit. The elastic unit comprises a first elastic part 1080, preferably the first elastic part is set to be a pressure spring 1080. Of course, the elastic unit can be set to be other elastic devices such as a tension spring and a torsional spring.

Further, a first sliding block 1082 is arranged between the first adapter 1060 and the first extending rod 1046, the first sliding block 1082 can move relative to the first extending rod 1046, and the first elastic part is arranged between the first adapter 1060 and the first sliding block 1082. The first transmission portion 1057 is connected with the first sliding block 1082.

As shown in FIG. 46, in the embodiment, the first adapter 1060 comprises a first adaptive part 1086 and a second adaptive part 1088, and the first sliding block 1082 is provided with a first raised column 1084. The first adaptive part 1086 and the second adaptive part 1088 are arranged on the first raised column 1084 in a pivoting manner, the torsional spring is arranged on the first raised column 1084 in a penetrating manner, one end of the torsional spring 1080 abuts against the first adaptive part 1086, and the other end of the torsional spring abuts against the second adaptive part 1088. When the first transmission portion 1057 is in a free state, the torsional spring 1080 enables the first adaptive part 1086 and the second adaptive part 1088 by a larger angle, so as to keep the first adapter 1060 and the first sliding part to be separated by a larger angle. When the first transmission portion 1057 is pulled, since the inner diameter of the second portion 1076 is smaller than that of the first portion 1074, the first adaptive part 1086 and the second adaptive part 1088 are promoted to overcome elasticity of the torsional spring 1080 and pivot to an extending axis close to the first extending rod 1046, finally, the first adapter 1060 and the first sliding part 1062 are matched and connected, to connecting the first transmission portion 1057 and the second transmission portion 1058 together.

In addition, the first adaptive part can also be set to comprise one adaptive part, at the moment, one end of the torsional spring 1080 abuts against the adaptive part, and the other end abuts against the first sliding block 1082 or the first extending rod 1046.

Of course, the first adapter 1060 can be set to be an elastic part, when the first transmission portion 1057 is pulled, since the inner diameter of the second portion 1076 is smaller than the inner diameter of the first portion 1074, the first adaptive part generates deformation to pivot to an extending axis close to the first extending rod 1046, finally, the first adapter 1060 and the first sliding part 1062 are matched and connected, so that the first transmission portion 1057 and the second transmission portion 1058 are connected together. When the first transmission portion 1057 is released to be in a free state, the first adapter 1060 recovers deformation to be separated from the first sliding part 1062. Those skilled in the art can conceive other types of first adapters 1060 as long as the adapter can be operably matched and connected or separated from the first sliding part 1062, can be adopted. All technical solutions similar to the embodiment should fall within a protection scope of the invention.

The adaptive device further comprises a first tension device arranged between the first adapter 1060 and first extending rod 1046 and used for enabling the first sliding block 1082 to move to a direction away from the operation part 1040 (referring to FIG. 44). Thus, the transmission part can effectively control the drive device 1042.

The first tension device comprises an elastic element, comprising a second elastic part 1090. Preferably, the second elastic part 1090 is set to be a pressure spring 1090 which is arranged along a longitudinal extending direction of the first extending rod 1046. Of course, the second elastic part can be set to be elastic parts such as a torsional spring, a tension spring or a rubber part.

In the embodiment, the first annular seat body 1072 comprises an inner cavity 1092 and a limiting part 1094, the pressure spring is arranged in the inner cavity 1092, one end of the pressure spring 1090 abuts against the limiting part 1094, and the other end of the pressure spring 1090 abuts against the first sliding block 1082. When the first transmission portion 1057 is in a free state, the pressure spring 1090 pushes the first sliding block 1082 to move to a direction away from the operation part 1040 (referring to FIG. 44), so as to tension the first transmission portion 1057. While when the operation part 1040 is operated, the first transmission portion 1057 is pulled to drive the first sliding block 1082 to overcome an action force of the pressure spring 1090 to move to a direction close to the operation part 1040, since the first adapter 1060 is matched and connected with the first sliding part 1062, so as to drive the second transmission portion 1058 to move relative to the second extending rod 1048, and further drive the drive device 1042 to drive the spool 1032 to pay off.

Figure 10:
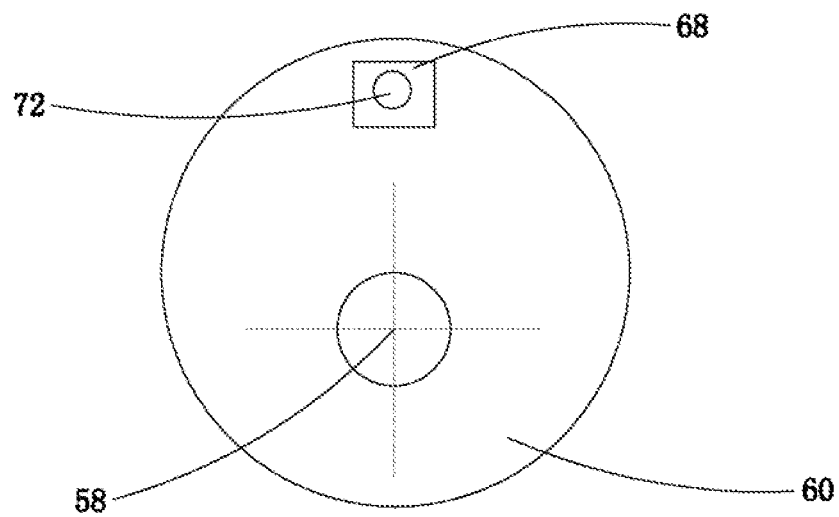
FIG. 10 is an amplified schematic diagram of a relative position between a hall element and a magnetic part on a transmission part in the head of the grass trimmer along a hatching line A-A in FIG. 2, at the moment, the hall element is close to the magnetic part.
Figure 49:
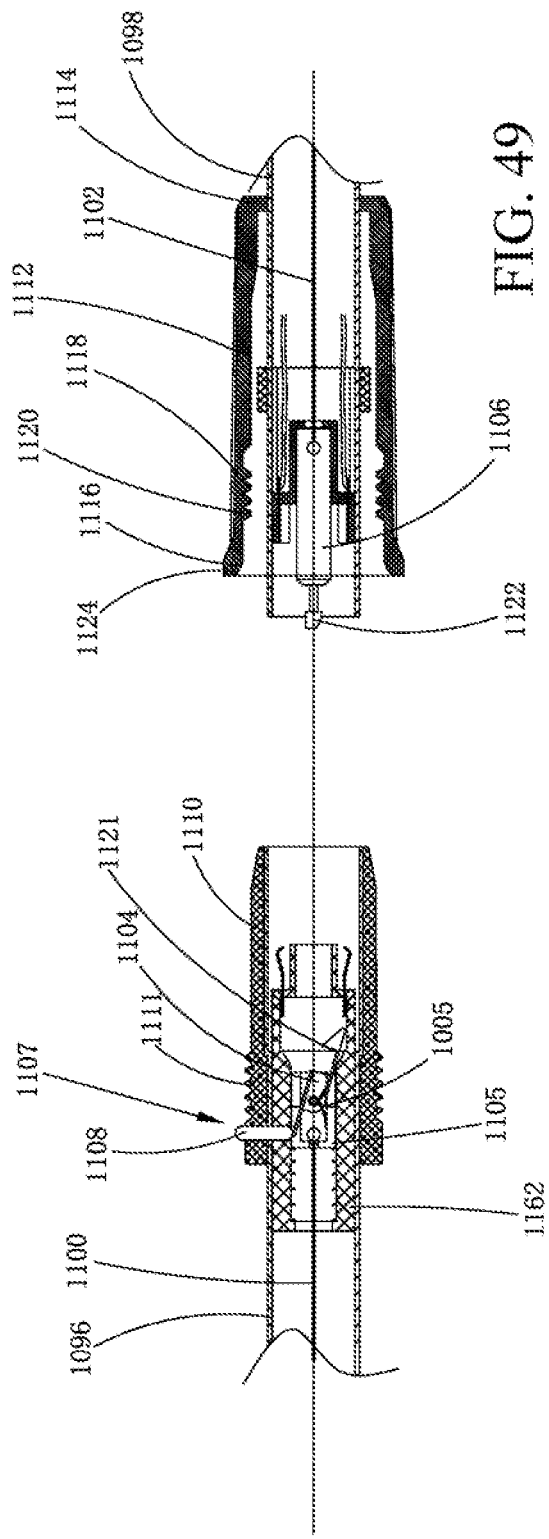
FIG. 49 is an amplified sectional view of a connecting position between a first extending rod and a second extending rod according to an eleventh embodiment of the invention, at the moment, the first extending rod and the second are separated, and a first transmission portion and a second transmission portion are separated.
Figure 50:
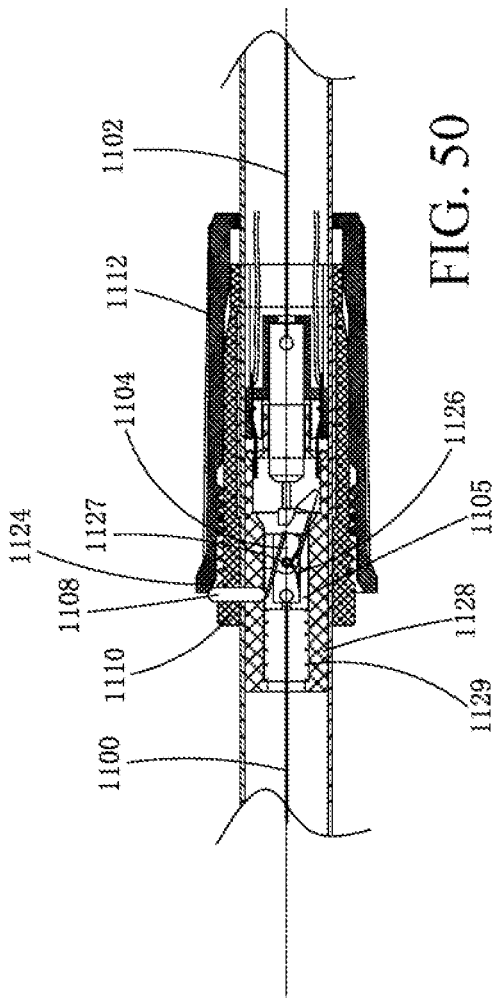
FIG. 50 is an amplified sectional view of a connecting position between a first extending rod and a second extending rod according to the eleventh embodiment of the invention, at the moment, the first extending rod and the second are partially separated, an actuator is not pushed and a first transmission portion and a second transmission portion are separated.
Figure 51:
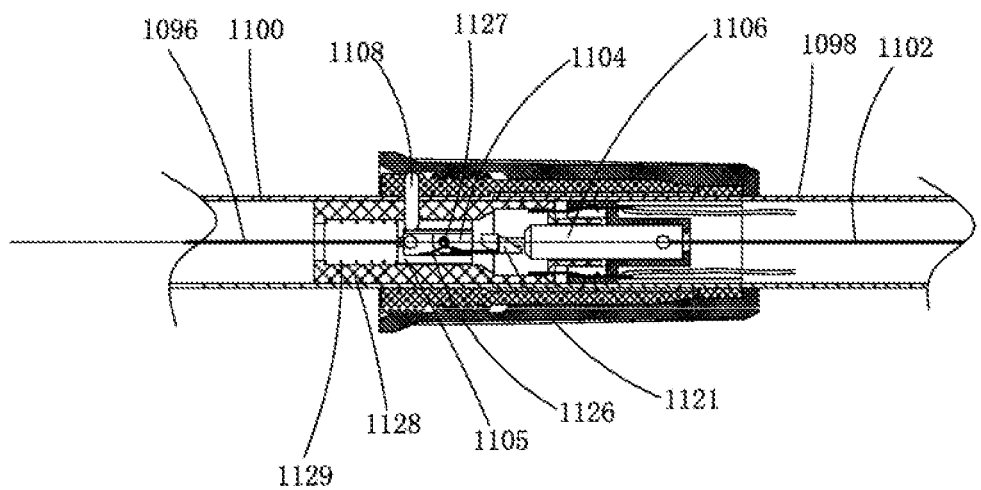
FIG. 51 is an amplified sectional view of a connecting position between a first extending rod and a second extending rod according to the eleventh embodiment of the invention, at the moment, the first extending rod and the second extending rod are totally matched and connected, an actuator is pushed, a first transmission portion and a second transmission portion are matched and connected, and the first transmission portion is in a non-pulling free state.

FIG. 49-FIG. 10 illustrate a second embodiment of the invention. In the embodiment, a manual matching and connecting first position and a mutual separating second position are arranged between the first extending rod 1096 and the second extending rod 1098, and the first extending rod 1096 and the second extending rod 1098 are connected by threads. Difference is the adaptive device between a first transmission portion 1100 and a second transmission 1102. The difference is described in detail as follows.

The first extending rod 1096 and the second extending rod 1098 are connected by threads, so that a manual matching and connecting first position and a mutual separating second position are arranged between the first extending rod 1096 and the second extending rod 1098.

In order to facilitate use, transportation and storage of the grass trimmer, when the first extending rod 1096 and the second extending rod 1098 are matched, the first transmission portion 1100 and a second transmission 1102 are matched, and when the first extending rod 1096 and the second extending rod 1098 are separated, the first transmission portion 1100 and a second transmission 1102 are separated.

A second adapter 1104 is still set to be capable of pivoting relative to the first extending rod 1096, so as to pivot in a position matched and connected with or separated from the second sliding part 1106. Of course, the second adapter 1104 can be set to move relative to the first extending rod 1096 as long as the matching and connecting or separating from the second sliding part 1106 is realized.

A second sliding block 1105 is movably arranged between the second adapter 1104 and the first extending rod 1096, one end of the first transmission portion 1100 is connected with the operation part 1040 (referring to FIG. 44), and the other end of the first transmission portion 1100 is connected with the second sliding block 1105. The second adapter 1104 pivots on the second sliding block 1105.

The adapter device similarly comprises a second actuating device arranged in the first extending rod 1096 and used for promoting the second adapter 1104 to be matched with the second sliding part 1106.

In the embodiment, the second actuating device comprises an actuator 1108 movably arranged at the first extending rod 1096 and abutting against the second adapter 1104, and a pusher 1112 arranged at the second extending rod 1098, when the first extending rod 1096 and the second extending rod 1098 are matched and connected, the pusher 1112 pushes the actuator 1108 to move, which further prompts the second adapter 1104 to be matched and connected with the second sliding part 1106 and further connect the first transmission portion 1100 and the second transmission portion 1102 together, the operation part 1040 (referring to FIG. 44) is pulled to drive the first transmission portion 1100 and the second transmission portion 1102 to move relative to the first extending rod 1096 and the second extending rod 1098, and further the drive device 1042 is driven to drive the spool 1032 to release the grass trimming line 1034 (referring to FIG. 44).

Preferably, the actuator 1108 is movably matched and connected with the first extending rod 1096. A moving direction of the actuator 1108 is vertical to an extending direction of the first extending rod 1096.

Preferably, the actuator 1112 is connected with the first extending rod 1096 to further enable the first extending rod 1096 and the second extending rod 1098 to be matched and connected, and the grass trimmer trims grass. Due to such arrangement, the pusher 108 is not only used for matching and connecting the first extending rod 1096 and the second extending rod 1098 but also used for matching and connecting the second adapter 11004 and the second sliding part 1106, so that the grass trimmer is compact in structure, lower in cost and when the first extending rod 1096 and the second extending rod 1098 are matched and connected, the matching and connecting of the second adapter 11004 and the second sliding part 1106 are realized, so that operation is very convenient and fast.

Particularly, the first extending rod 1096 is fixedly provided with a third sleeve 1110 provided with external threads 1111. One end of the actuator 1108 abuts against the second adapter 1104, and the other end of the actuator 1108 extends out of the third sleeve 1110. The pusher 1112 is rotatably arranged on the second extending rod 1098, the pusher 1112 comprises a connecting end 1114 connected with the second extending rod 1098, an opened end 116 opposite to the connecting end 1114 and a middle part 1118 connected with the connecting end 114 and the opened end 1116, the opened end 1116 and the middle part 1118 are spaced from the second extending rod 1098 by a certain distance, and the middle part 1118 is provided with internal threads 1120. Thus, the third sleeve 1110 can be inserted between the pusher 1112 and the second extending rod 1098, meanwhile, the pusher 1112 is pushed to match and connect the first extending rod 1096 and the second extending rod 1098 together.

Figure 11:
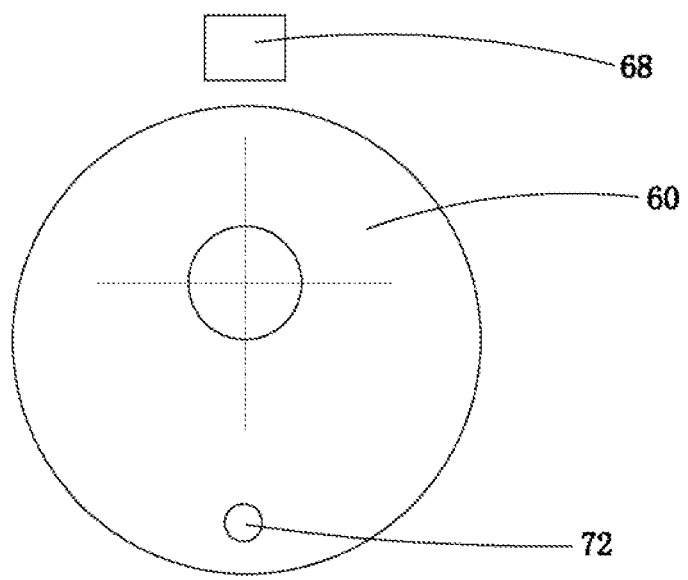
FIG. 11 is an amplified schematic diagram of a relative position between a hall element and a magnetic part on a transmission part in the head of the grass trimmer along a hatching line B-B in FIG. 3, at the moment, the hall element and the magnetic part are staggered by 180 degrees.
Figure 52:
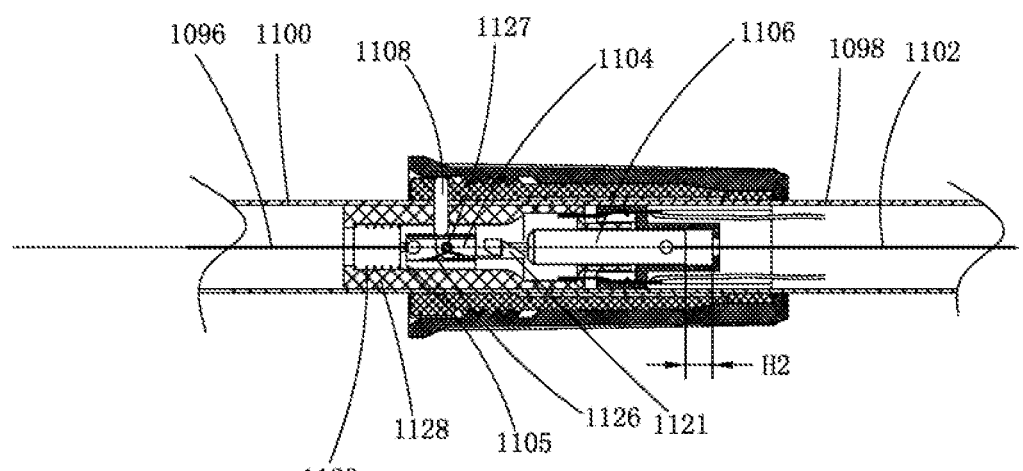
FIG. 52 is an amplified sectional view of a connecting position between a first extending rod and a second extending rod according to the eleventh embodiment of the invention, at the moment, the first extending rod and the second extending rod are totally matched and connected, a first transmission portion and a second transmission portion are matched and connected, and the first transmission portion is in a pulled state and enables the second transmission portion to move a certain distance relative to the second extending rod to pay off.

In addition, in a process that the third sleeve 1110 is inserted into the pusher 1112, the pusher 1112 can push the actuator 1108 to move to a direction vertical to an extending direction of the first extending rod 1096, since one end of the actuator 1108 abuts against the second adapter 1104, the second adapter 1104 pivots relative to the second sliding block 1105, and finally, a second bugled part on the second adapter 1104 and a second stopping part on the second sliding part 1106 are matched and connected, and the first transmission portion 1100 and the second transmission portion 1102 are connected together. As shown in FIG. 52 and FIG. 11, at the moment, the operation part 1040 is operated to pull the first transmission portion 1100 to drive the second sliding block 1105 to move for a certain distance H2 to a direction close to the operation part 1040, so that the second adapter 1104 and the second sliding block 1106 are matched and connected to drive the second transmission portion 1120 to move relative to the second extending rod 1098 and further drive the drive device 1042 to drive the spool 1032 to pay off.

The opened end 1116 of the pusher 1112 is provided with an oblique opening 1124, an inner diameter of the end surface of the oblique opening 1124 is larger than that of the middle part 1118, so that in a process of matching and connecting the third sleeve 1110 and the pusher 1112, the actuator 1108 easily enters the pusher 1112 and is pushed by the pusher 1112, so as to enable the actuator 1108 to move to a direction vertical to an extending direction of the first extending rod 1096 and move to a direction close to an extending axis of the first extending rod 1096.

The adaptive device further comprises a second keeping device arranged between the second first adapter 1104 and the first extending rod 1096, and the second keeping device is used for promoting the second adapter 1104 to be separated from the second sliding part 1106, is arranged between the second sliding block 1105 and the second adapter 1104 and comprises an elastic unit, comprising an elastic part 1126. Preferably the elastic part 1126 is set to be a torsional spring 126. Of course, the elastic part 1126 can be set to be other similar elastic devices such as a tension spring, a pressure spring or a rubber part.

The second sliding block 1105 is provided with a second raised column 1127, one end of the torsional spring 126 abuts against the second sliding block 1105, and the other end of the torsional spring 126 abuts against the second adapter 1104. Thus, when the pusher 1112 and the third sleeve 1110 are unscrewed, the torsional spring 126 prompts the second adapter 1104 to pivot to push the actuator 11008 to a direction away from an extending axis of the first extending rod 1096, finally, the second adapter 1104 is not subjected to a pushing force of the actuator 1108, the second adapter 1104 and the second sliding part 1106 are separated, further the first transmission portion 1100 and the second transmission portion 1102 are separated, and at the moment, the first extending rod 1096 and the second extending rod 1098 are also separated. Hence, a packaging size and storage size of the grass trimmer are greatly reduced and storage and transportation are facilitated.

In the embodiment, the adaptive device similar comprises a second tension device arranged used for enabling the second sliding block 1105 to drive the second adapter 1104 to move to a direction away from the operation part 1040 (referring to FIG. 44) and the second tension device is arranged between the second adapter 1104 and the first extending rod 1096. Further, a second annular seat body 1128 is fixedly arranged in the first extending rod 1096 and the tension device is arranged between the second annular seat body 1128 and the second sliding block 1105.

The second tension device comprises an elastic element, comprising an elastic part 1129, and preferably, the elastic part 1129 is set to be a pressure spring 129, which is arranged along a longitudinal extending direction of the first extending rod 1096. Of course, the above elastic part 1129 can be set to be similar parts such as a tension spring, a torsional spring or a rubber part. In addition, an action and a specific mounting manner of the tension device are similar to the first embodiment, and are not repeated herein.

Figure 53:
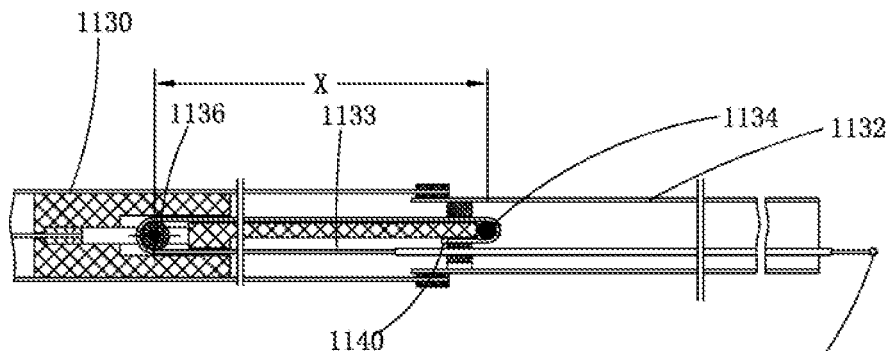
FIG. 53 is an amplified sectional view of a connecting position between a first extending rod and a second extending rod according to an twelfth embodiment of the invention, at the moment, the second extending rod is in an extending position relative to the first extending rod, and a movable pulley is in a free state.

FIG. 53 to FIG. 13 illustrate a third embodiment. In the embodiment, a first extending rod 1130 is telescopic relative to a second extending rod 1132, and a transmission part 1133 is also arranged in the inner cavities of the first extending rod 1130 and the second extending rod 1132. Of course, the first extending rod 1130 and the second extending rod 1132 can adopt other structural types besides the telescopic connecting structure, for example, detached connecting.

A telescopic adjusting mechanism is arranged between the first extending rod 1130 and the second extending rod 1132 (not shown in the drawing), and the telescopic adjusting mechanism is used for adjusting relative telescopic positions between the first extending rod 1130 and the second extending rod 1132. As known by those skilled in the art, the telescopic adjusting mechanism has many difference realizing manners, which are not repeated herein. In addition, a position locking mechanism can be arranged between the first extending rod 1130 and the second extending rod 1132 (not shown in the drawing), after adjusted to proper relative positions, the first extending rod 1130 and the second extending rod 1132 are locked by the position locking mechanism. Similarly, the position locking mechanism has many difference realizing manners and are not repeated herein.

The manual cord delivering mechanism further comprises a pulley assembly arranged in the extending rod assembly 1015 (referring to FIG. 43), and the pulley assembly is controlled by the operation part 1040 (referring to FIG. 44). The operation part 1040 is pulled to enable the pulley assembly to drive the transmission part 1133 to move, thus driving the drive device 1042 to drive the spool to pay off.

In the embodiment, the pulley assembly comprises a fixed pulley 1134 fixedly arranged at the first extending rod 1130, and a movable pulley 1136 connected with the operation part 1040, and by operating the operation part 1040, the movably pulley 1136 can move to a direction close to the operation part 1040 along an extending direction of the first extending rod, the movable pulley 1136 is closer to the operation part 1040 than the fixed pulley 1134, the transmission part 1133 sleeves outer edges of the fixed pulley 1134 and the movable pulley 1136, the transmission part 1133 comprises a fixed end 1140 fixedly connected with the second extending rod 1132 and a movable end 1142 connected with the drive device 1042 (referring to FIG. 44), and the fixed end 1140 is positioned between the fixed pulley 1134 and the movable pulley 1136. Of course, besides one fixed pulley and one movable pulley, the pulley assembly can be provided with a plurality of fixed pulleys and other pulley assembly manners as long as when the first extending rod 1130 moves relative to the second extending rod 1132, the transmission part 1133 can be tensioned.

When the movable pulley 1136 is in a free state, the first extending rod 1130 and the second extending rod 1132 are extended and retracted, and a distance between the movable pulley 1136 and the second pulley 1134 is kept constant.

Figure 54:
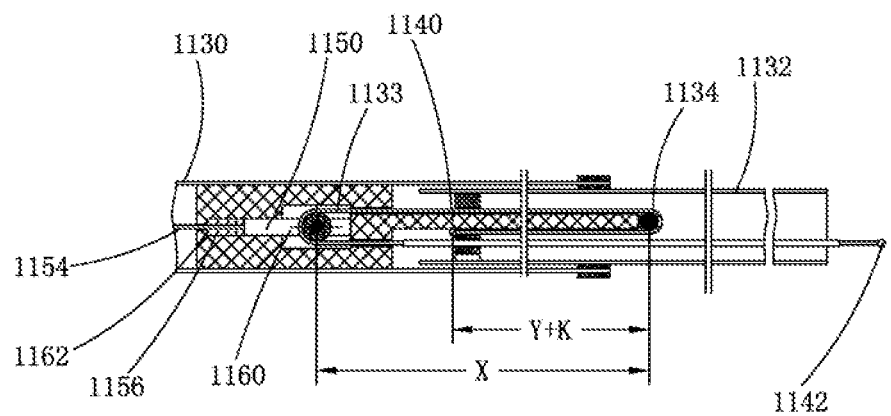
FIG. 54 is an amplified sectional view of a connecting position between a first extending rod and a second extending rod according to the twelfth embodiment of the invention, at the moment, the second extending rod is in a retracting position relative to the first extending rod, and a movable pulley is in a free state.

The retracting of the second extending rod 1132 relative to the first extending rod 1130 is taken as an example for description in detail, as shown in FIG. 53, the fixed pulley 1136 is in the free state, when the second extending rod 1132 is in a extending position relative to the first extending rod 1130, if a distance between the axis of the movable pulley 1136 to the axis of the fixed pulley 1134 along a longitudinal extending direction of the first extending rod 1130 is X, and a distance between the fixed end 1140 to the axis of the fixed pulley 1134 along the longitudinal extending direction of the first extending rod 1130 is Y, as shown in FIG. 54, the second extending rod 1132 is in the retracting position relative to the first extending rod 1130, the second extending rod 1132 drives the fixed end 1140 to move relative to the fixed pulley 1134 fixedly arranged at the first extending rod 1130, a distance between the fixed end 1140 to the axis of the fixed pulley 1134 along the longitudinal extending direction of the first extending rod 1130 is Y+K, that is to say, a moving distance of the fixed end 1140 relative to the fixed pulley axis of the fixed pulley 1134 along the longitudinal extending direction of the first extending rod 1130 is K, at the moment, the retracting distance of the second extending rod 1132 relative to the first extending rod 1130 is also K, so that the transmission part 1133 is in a tension state always. Therefore, when the grass trimmer is stored and transported, the second extending rod 1132 is retracted relative to the first extending rod 1130, the transmission part 1133 is always in a tension state, and is convenient to transport and store. No matter the second extending rod 1132 is in any retracting or extending position relative to the first extending rod 1130, the transmission part 1133 is always in the tension state, operation is more convenient, an operator does not need to move the second extending rod 1132 to whatever position relative to the first extending rod 1130 when confirming to use or store the grass trimmer.

An extending process of the second extending rod 1132 relative to the first extending rod 1130 is opposite to above process, namely in a process of extending to a position in FIG. 53 from a retracting position in FIG. 54, the transmission part 1133 is always in the tension state, therefore, when the movable pulley 1136 is pulled, the transmission part 1133 drives the drive device 1042 to drive the spool 1032 to release the grass trimming line 1034 (referring to FIG. 44) thus realizing manual cord delivering.

The movable pulley 1136 is connected to the operation part (referring to FIG. 44), and the movable pulley 1136 can move along a longitudinal extending direction of the first extending rod 1130. When the operation part 1040 is operated, the movable pulley 1136 can move to a direction away from the fixed pulley 1134 along a longitudinal extending direction of the first extending rod 1130, and drives a movable end 1142 of the transmission part 1133 to move to a direction close to the first extending rod 130, and the movable end 1142 of the transmission part 1133 also moves along the longitudinal extending direction of the first extending rod 1130. Specifically, if the movable pulley 1136 moves for a distance L to a direction away from the fixed pulley 1134, the movable end 1142 of the transmission part 1133 is driven to move for a distance 2L to a direction close to the first extending rod 1130. Thus, since the movable end 1142 is connected to the drive device 1042 (referring to FIG. 43), the transmission part 1133 can drive the drive device 1042 to drive the spool 1032 to release the grass trimming line 1034 (referring to FIG. 43), thus realizing manual cord delivering.

Preferably, the fixed pulley 1134 is smaller than the movable pulley 1136 in diameter. Thus, an occupation space of the manual cord delivering mechanism can be reduced and the structure of the grass trimmer is more compact.

One of outer edge tangential lines 1146 between the fixed pulley 1134 and the movable pulley 1136 is parallel with an extending direction of the first extending rod 1130. Thus, no matter when the second extending rod 1032 extends or retracts relative to the first extending rod 1130 or when the movable pulley 1136 is pulled to perform manual cord delivering on the grass trimmer, transmission of the transmission part 1133 is more smooth and laborsaving.

Figure 55:
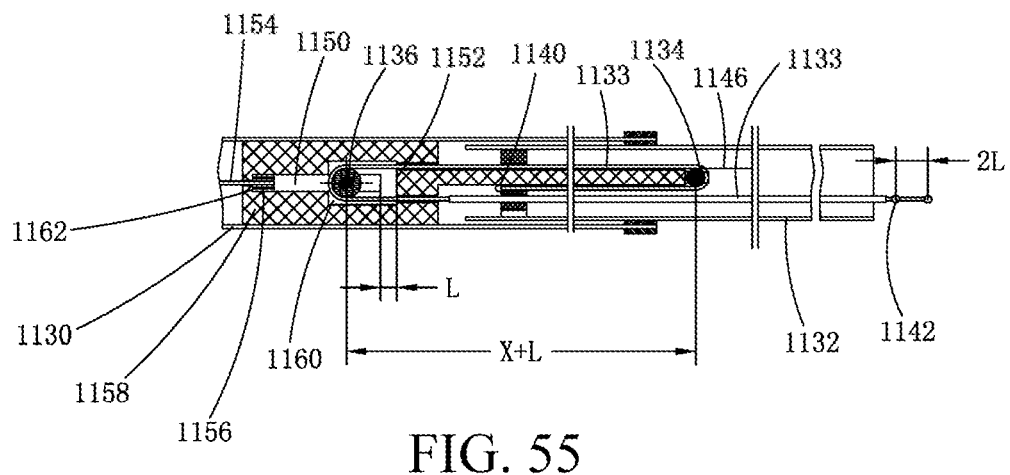
FIG. 55 is an amplified sectional view of a connecting position between a first extending rod and a second extending rod according to the twelfth embodiment of the invention, at the moment, the second extending rod is in a retracting position relative to the first extending rod, a movable pulley is in a pulled state, and a transmission part is driven to move a certain distance relative to the second extending rod to pay off.

As shown in FIG. 54, the manual cord delivering mechanism further comprises a reset device 1148 arranged between the movable pulley 1136 and the first extending rod 1130, when the movable pulley 1136 is not operated, a distance between the movable pulley 1136 and the fixed pulley 1134 is kept to be X always, at the moment, the position of the movable pulley 1136 relative to the fixed pulley 1134 is defined as an initial position. Further referring to FIG. 55, when the movable pulley 1136 is operated to move for a distance L to a direction away from the fixed pulley 1134 along the longitudinal extending direction of the first extending rod 1130, at the moment, the distance between the movable pulley 1136 and the fixed pulley 1134 is X+L, the movable pulley 1136 is in a cord delivering position, then the movable pulley 1136 is released and is reset to the initial position as shown in FIG. 54 under the action of the reset device 1148. Thus, the spool 1032 of the grass trimmer can repeatedly release the grass trimming line 1034 (referring to FIG. 44).

Further, the first extending rod 1130 is movably provided with a movable pulley bracket 1150, the movable pulley 1136 is arranged on the movable pulley bracket 1150 and the first extending rod 1130 is fixedly provided with a limiting portion 1152. When the movable pulley 1136 is in a free state, the reset device 1148 resets the movable pulley 1136 to the initial position. At the moment, one end of the movable pulley bracket 1150 is matched and connected with the limiting portion 1152, and the other end of the movable pulley bracket 1150 is matched and connected with the reset device 1148. The movable pulley bracket 1150 is connected with the operation part 1040, thus by operating the operation part 1040, the movable pulley 1136 is driven to move to a direction away from the limiting portion 1152 by the movable pulley bracket 1150, thus pulling the transmission part 1133 to enable the drive device 1042 to drive the spool 1032 to release the grass trimming line 1034 (referring to FIG. 44).

In the embodiment, the movable pulley bracket 1150 is connected with the operation part 1040 by a control part 1154. Preferably, the control part 1154 is a flexible part. Of course, other non-flexible manners can also be arranged as long as a force is transmitted to the movable pulley bracket 1150 to enable the movable pulley bracket 1150 to move along a longitudinal extending direction of the first extending rod 1130.

The reset device 1148 comprises an elastic part 1156. Preferably, the elastic part 1156 is set to be a pressure spring 156 arranged along the longitudinal extending direction of the first extending rod 1130. Of course, the elastic part 1156 can be set to be other similar elastic devices such as a tension spring, a torsional spring or a rubber part.

One end of the pressure spring 156 abuts against the first sliding block 1130, and the other end of the pressure spring 156 abuts against the movable pulley bracket 1150. Further, a mounting seat 1158 is fixedly arranged in the first extending rod 1130, and the mounting seat 1158 has a cavity 1160 and an abutting part 1162. The movable pulley 1150 is movably arranged n the cavity 1160, the limiting portion 1152 is arranged at the mounting seat 1158, one end of the pressure spring abuts against the abutting part 1162 and the movable pulley 1150 is between the pressure spring 156 and the limiting portion 1152.

In the embodiment, no matter in an extending position or a retracting position, the first extending rod 1096 and the second extending rod 1098 are always in a matching and connected state, the transmission part 1133 is always in a tension state, and matched and connected with the operation part 1040 and the drive device 1042 (referring to FIG. 44), therefore, when the grass trimmer is used, the second extending rod 1098 is in the extending position relative to the first extending rod 1096, at the moment, the operation part 1040 is operated to enable the movable end 1142 of the transmission part to move to a direction close to the operation part 1040 relative to the second extending rod 1098, thus driving drive device 1042 to drive the spool 1032 to release the grass trimming line 1034 (referring to FIG. 44); and when the second extending rod 1098 is in the retracting relative to the first extending rod 1096, a storage space and packaging size of the grass trimmer are greatly reduced. Therefore, loss of the grass trimmer is reduced and the packaging size is smaller.

Those skilled in the art can conceive that the invention can has other realizing manners as long as an adopted technical essence is same as or similar with the invention, or any changes or substitutions made based on the invention should fall within a protective scope of the invention.

What is claimed is:

1. A grass trimmer, comprising an extending rod extending longitudinally, a housing arranged at one end of the extending rod, a handle arranged on the extending rod and spaced from the housing by a distance, a grass trimming head connected to the housing, a main motor driving the grass trimming head to rotate around an axis, and a main switch controlling the main motor, the grass trimming head comprising an accommodating base, a cap matched and connected to the accommodating base, and a spool arranged between the accommodating base and the cap, and the spool having a first state static relative to the accommodating base, wherein the grass trimmer further comprises a cord delivering mechanism, the cord delivering mechanism comprises a cord delivering electronic switch independent of the main switch and a control device, the cord delivering electronic switch operably electrically controls the control device to enable the spool to be in a second state capable of generating a rotary speed difference relative to the accommodating base, the control device comprises a control circuit electrically connected to the main motor, and the control circuit is used for controlling the main motor to be converted between a working speed and a cord delivering speed, and the working speed is different from the cord delivering speed.

2. The grass trimmer according to claim 1, wherein when the main switch is started up, the control circuit controls the main motor to be at a working speed, to enable the spool to be in the first state; and when the main switch is started up and the cord delivering electronic switch is started up, the control circuit controls the main motor to be converted from the working speed to the cord delivering speed, to enable the spool to be in the second state, and the cord delivering electronic switch is released to convert the main motor from the cord delivering speed back to the working speed.

3. The grass trimmer according to claim 2, wherein a time during which the control device controls the main motor to be converted from the working speed to the cord delivering speed is less than 1 second.

4. The grass trimmer according to claim 2, wherein a time during which the control device controls the main motor to be converted from the cord delivering speed back to the working speed is less than 1 second.

5. The grass trimmer according to claim 1, wherein when the main switch is started up, the control circuit controls the main motor to be at a working speed, to enable the spool to be in the first state; and when the main switch is started up and the cord delivering electronic switch is started up, the control circuit controls the main motor to be converted from the working speed to the cord delivering speed, to enable the spool to be in the second state, and after the cord delivering speed is kept for preset duration, the control circuit controls the main motor to be converted from the cord delivering speed back to the working speed.

6. The grass trimmer according to claim 5, wherein the preset duration of keeping the cord delivering speed is 0.2 s to 2 s.

7. The grass trimmer according to claim 5, wherein a time during which the control device controls the main motor to be converted from the working speed to the cord delivering speed is less than 1 second.

8. The grass trimmer according to claim 5, wherein a time during which the control device controls the main motor to be converted from the cord delivering speed back to the working speed is less than 1 second.

9. The grass trimmer according to claim 1, wherein when the main switch is started up and the cord delivering electronic switch is started up, the control circuit controls the main motor to short circuit.

10. The grass trimmer according to claim 1, wherein when the main switch is started up and the cord delivering electronic switch is started up, the control circuit controls an operating speed of the main motor to decrease to zero.

11. The grass trimmer according to claim 1, wherein the cord delivering speed is less than the working speed.

12. The grass trimmer according to claim 11, wherein the cord delivering speed is less than 3500 r/min.

13. The grass trimmer according to claim 11, wherein the cord delivering speed is zero.

14. The grass trimmer according to claim 1, wherein the cord delivering speed is greater than the working speed.

15. The grass trimmer according to claim 14, wherein a range of a working rotary speed of the main motor is 5000 r/min to 10000 r/min, and a set range of the cord delivering speed is 11000 r/min to 15000 r/min.

16. The grass trimmer according to claim 1, wherein the control circuit is a PWM modulation circuit.

17. The grass trimmer according to claim 1, wherein the cord delivering electronic switch is a single-pole double-throw switch, the single-pole double-throw switch is selectively in a first switching on position and a second switching on position, the main switch is started up, the spool and the accommodating base synchronously rotate, and then the single-pole double-throw switch is in the first switching on position; the single-pole double-throw switch is started up and is converted to the second switching on position from the first switching on position to generate a speed difference between the spool and the accommodating base; and the single-pole double-throw switch is released and recovers to the first switching on position from the second switching on position to generate a speed difference between the spool and the accommodating base, and after preset time, the spool and the accommodating base recover synchronous rotating.

18. A cord delivering method for the grass trimmer according to claim 17, the cord delivering method comprising the following operation steps: starting up the main switch to enable the spool and the accommodating base to synchronously rotate; and starting up the cord delivering electronic switch to generate a speed difference between the spool and the accommodating base.

19. A cord delivering method for the grass trimmer according to claim 17, the cord delivering method comprising the following operation steps: starting up the main switch to enable the spool and the accommodating base to synchronously rotate; and starting up the cord delivering electronic switch to generate a speed difference between the spool and the accommodating base, wherein after preset time, the spool and the accommodating base recover synchronous rotating.

20. A cord delivering method for the grass trimmer according to claim 1, the cord delivering method comprising the following operation steps: starting up the main switch to enable the spool and the accommodating base to synchronously rotate; and starting up the cord delivering electronic switch to generate a speed difference between the spool and the accommodating base.

21. The cord delivering method for the grass trimmer according to claim 20, wherein the operation steps further comprise: releasing the cord delivering electronic switch.

22. A cord delivering method for the grass trimmer according to claim 1, the cord delivering method comprising the following operation steps: starting up the main switch to enable the spool and the accommodating base to synchronously rotate; and starting up the cord delivering electronic switch to generate a speed difference between the spool and the accommodating base, wherein after preset time, the spool and the accommodating base recover synchronous rotating.

* * * * *